(12) United States Patent
Saito et al.

(10) Patent No.: US 7,218,643 B1
(45) Date of Patent: May 15, 2007

(54) RELAY DEVICE AND COMMUNICATION DEVICE REALIZING CONTENTS PROTECTION PROCEDURE OVER NETWORKS

(75) Inventors: Takeshi Saito, Tokyo (JP); Yoshiaki Takabatake, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 09/404,547

(22) Filed: Sep. 24, 1999

(30) Foreign Application Priority Data

| Sep. 30, 1998 | (JP) | ............................... P10-292824 |
| Jul. 23, 1999 | (JP) | ............................... P11-209836 |

(51) Int. Cl.
*H04J 3/16* (2006.01)
*G06F 15/16* (2006.01)
*H04L 9/00* (2006.01)

(52) U.S. Cl. ...................... 370/466; 370/465; 370/467; 370/395.52; 709/249; 709/230; 713/153

(58) Field of Classification Search .................. 705/57; 455/14; 370/465–467, 315.54; 709/217, 709/218, 223, 227, 230, 238, 237, 248, 252, 709/253, 249; 713/153; 380/201, 270; 725/31, 725/81, 149

See application file for complete search history.

(56) References Cited

U.S. PATENT DOCUMENTS

| 5,175,765 | A | * | 12/1992 | Perlman ...................... 713/162 |
| 5,428,771 | A | * | 6/1995 | Daniels et al. .............. 709/246 |
| 5,623,601 | A | * | 4/1997 | Vu .............................. 713/201 |
| 5,640,456 | A | * | 6/1997 | Adams et al. .............. 713/153 |
| 5,778,189 | A | * | 7/1998 | Kimura et al. ............. 709/236 |
| 5,781,550 | A | * | 7/1998 | Templin et al. ............. 370/401 |
| 6,005,874 | A | * | 12/1999 | Sharpe ........................ 713/153 |
| 6,073,197 | A | * | 6/2000 | Stewart ....................... 709/232 |

(Continued)

FOREIGN PATENT DOCUMENTS

| EP | 837579 A2 * | 4/1998 |
| EP | 874498 A2 * | 10/1998 |
| JP | 10-145420 | 5/1998 |
| JP | 10-154996 | 6/1998 |
| JP | 10-178421 | 6/1998 |
| JP | 10-198694 | 7/1998 |

OTHER PUBLICATIONS

Takashi Sato, Philips Research Briarcliff, "A Solution to wireless connections in a multi-bus network", Jun. 9, 1998, pp. 1-8.*

(Continued)

*Primary Examiner*—Ario Etienne
*Assistant Examiner*—Gregory G. Todd
(74) *Attorney, Agent, or Firm*—Oblon, Spivak, McClelland, Maier & Neustadt, P.C.

(57) ABSTRACT

A relay device and a communication device capable of realizing the contents protection procedure between devices that are not connected to the same network are disclosed. A relay device and a communication device are so configured that between a device/service/sub-unit on the second network and a device on the first network which are a pair that is carrying out transmission or reception of contents to be protected, a device on the first network or a device/service/sub-unit on the second network can carry out the contents protection procedure while recognizing the target of the contents protection procedure as the relay device, so that there is no need for a device on the first network or a device/service/sub-unit on the second network to account for the other network that is connected via the relay device.

13 Claims, 68 Drawing Sheets

U.S. PATENT DOCUMENTS

| | | | | |
|---|---|---|---|---|
| 6,092,191 | A | * | 7/2000 | Shimbo et al. ............. 709/229 |
| 6,108,345 | A | * | 8/2000 | Zhang ........................ 370/445 |
| 6,115,392 | A | * | 9/2000 | Nomura ...................... 370/466 |
| 6,349,352 | B1 | * | 2/2002 | Lea ............................... 707/1 |
| 6,400,729 | B1 | * | 6/2002 | Shimadoi et al. ........... 370/466 |
| 6,785,812 | B1 | * | 8/2004 | Botham et al. ............. 713/168 |

OTHER PUBLICATIONS

"5C Digital Transmission content protection white paper," Hitachi, Ltd., Intel Co., Matsushita Electric Industrial, Co., Ltd., Sony Co. and Toshiba Co., Jul. 14, 1998, pp. 1-15.*

Cavaiani et al, Mutual authenticating protocol with key distribution in client/server environment, Apr. 1996, ACM, Crossroads, v2, n4, pp. 17-22.*

Takashi Sato, Philips Research Briarcliff, "A Solution to Wireless Connections in Multi-Bus Network," Jun. 9, 1998, pp. 1-8.

"5C Digital Transmission Content Protection White Paper," Hitachi, Ltd., Intel Coporation, Matsushita Electric Industrial, Co., Ltd., Sony Corporation and Toshiba Corporation, Jul. 14, 1998, 15 pgs.

T. Yamaguchi, et al., The Institute of Electronics, Information and Communications Engineers, Technical Report of IEICE, OFS93-32, pp. 13-18, "A Design for Lan Cipher Communications", Jan. 1994 (with English Abstract).

T. Saito, et al., The Institute of Electronics, Information and Communications Engineers, Technical Report of IEICE, IN97-128, pp. 57-64, "Homenetwork Architecture Considering Digital Home Appliances", Nov. 1997 (with English Abstract).

* cited by examiner receive authentication request device certificate

FIG.16

| SUBSTANCE ON 1394 BUS SIDE | FORM OF PROXY SERVICE PROVIDED BY RELAY NODE WITH RESPECT TO RADIO SECTION SIDE | |
|---|---|---|
| VIDEO TRANSMISSION FUNCTION OF TRANSMISSION NODE 101 (VIDEO TRANSMISSION SUB-UNIT) (SUB-UNIT ID=0) (AUTHENTICATION FORMAT) IS PRESENT | VIDEO TRANSMISSION SUB-UNIT (SUB-UNIT ID=0) (AUTHENTICATION FORMAT) IS PRESENT | |
| ..... | ............ | |

FIG.38

| SOURCE ADDRESS |
|---|
| DESTINATION ADDRESS |
| DATA |

FIG.39

| DESTINATION NODE = RADIO NODE |
|---|
| SOURCE NODE = RELAY NODE |
| CONTROL CONTENT = DATA RECEPTION |
| SID TO BE USED = $\alpha$ |
| DATA DESTINATION = MPEG DECODING/DISPLAY SUB-UNIT (SUB-UNIT ID=0) |
| DATA SOURCE = VIDEO TRANSMISSION SUB-UNIT (SUB-UNIT ID=0) |

FIG.54
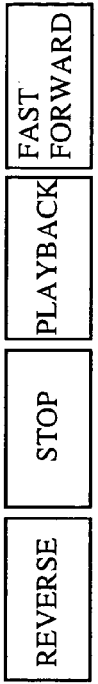
(a)
PANEL AT PANEL SUB-UNIT
OF TRANSMISSION NODE
VTR CONTROL DISPLAY — REVERSE | STOP | PLAYBACK | FAST FORWARD
PRODUCED IN SIMILAR CONFIGURATION AS MUCH AS POSSIBLE
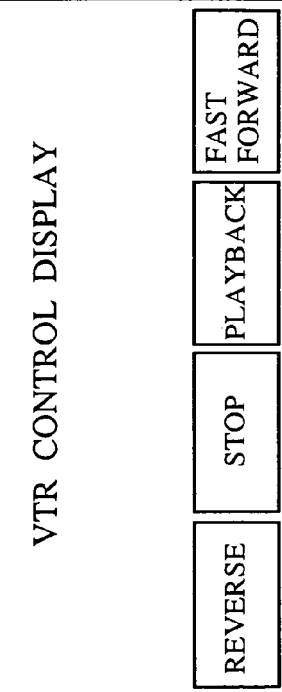
(b)
HOME PAGE FOR TRANSMISSION NODE CONTROL
VTR CONTROL PAGE — REVERSE | STOP | PLAYBACK | FAST FORWARD

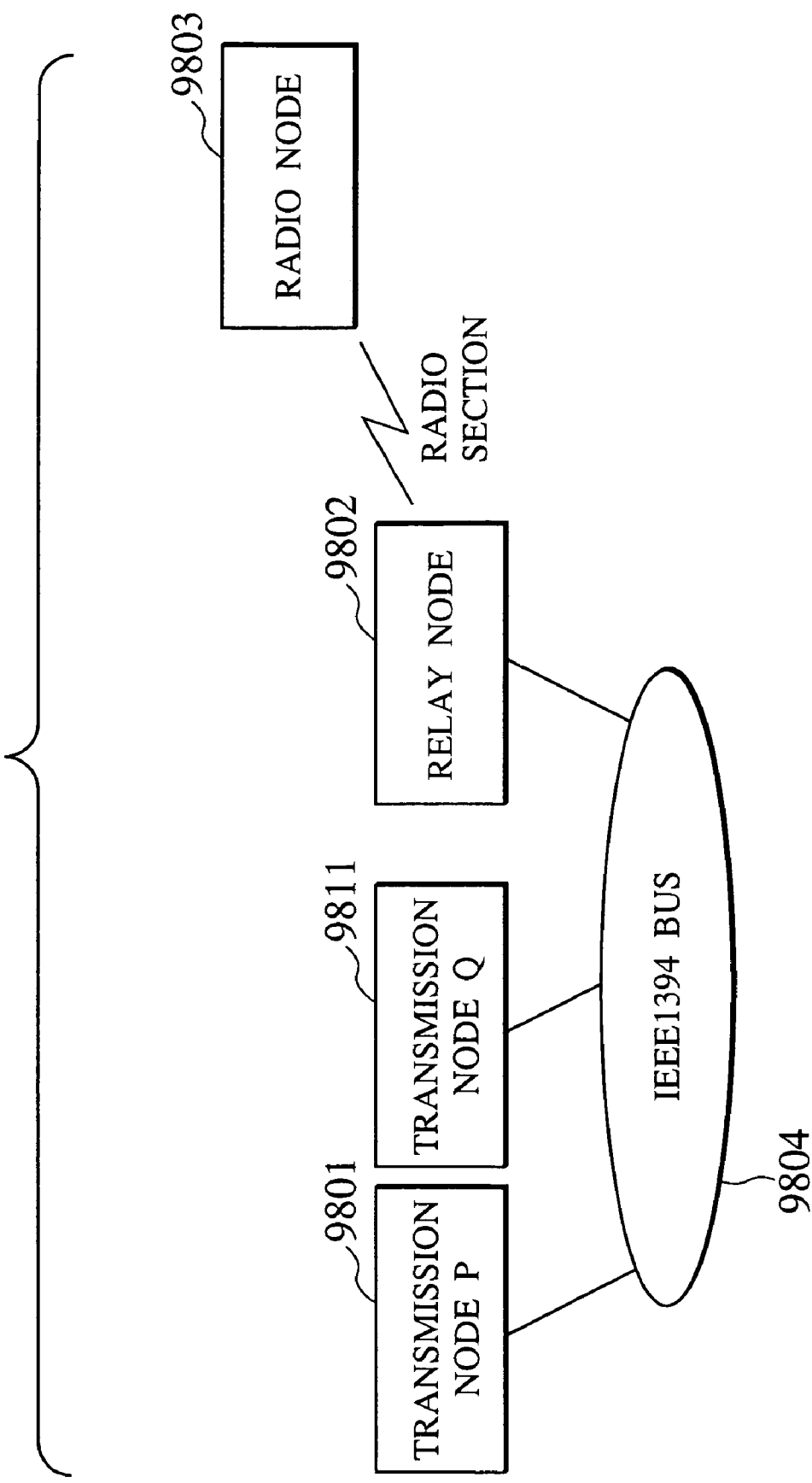

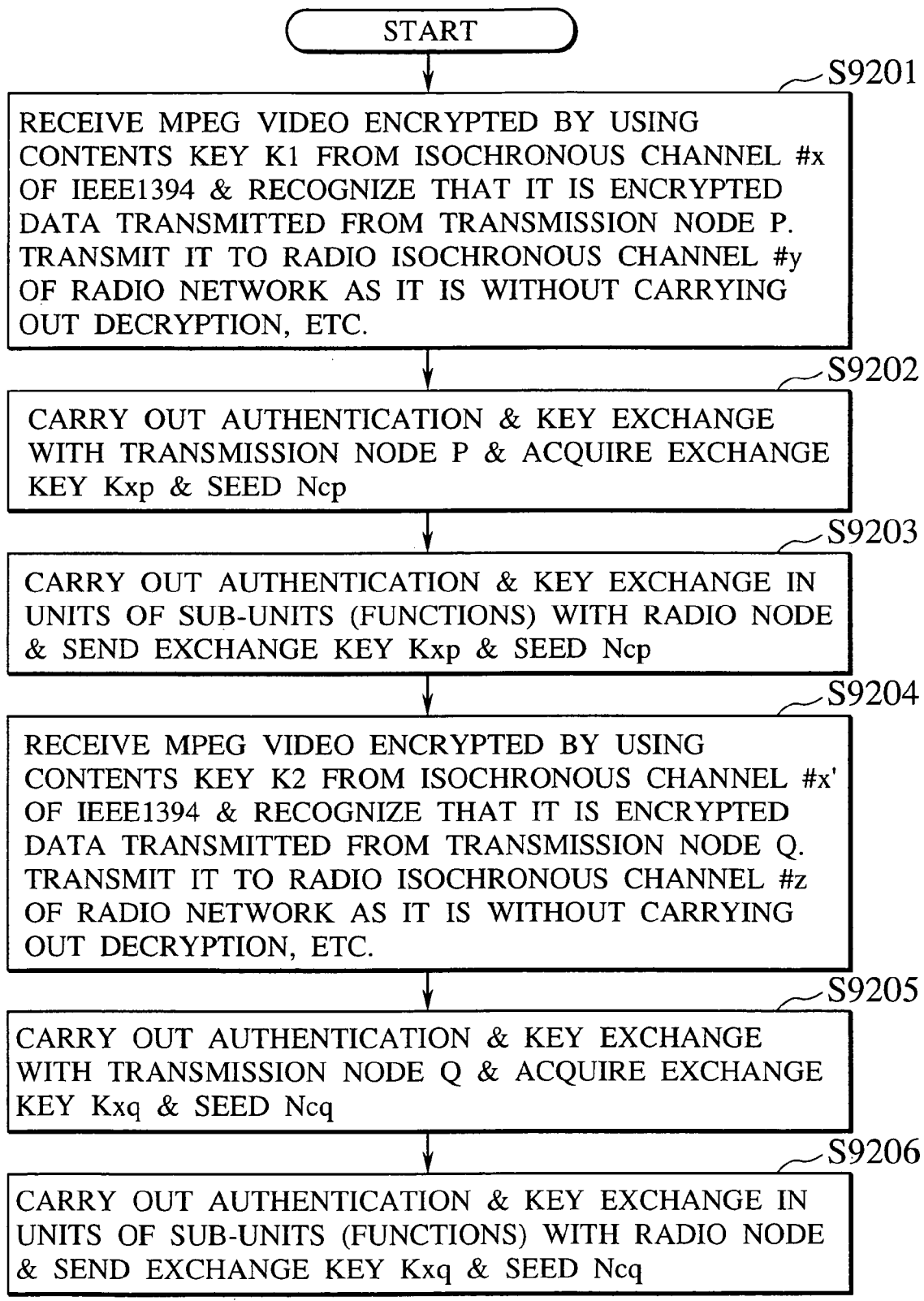

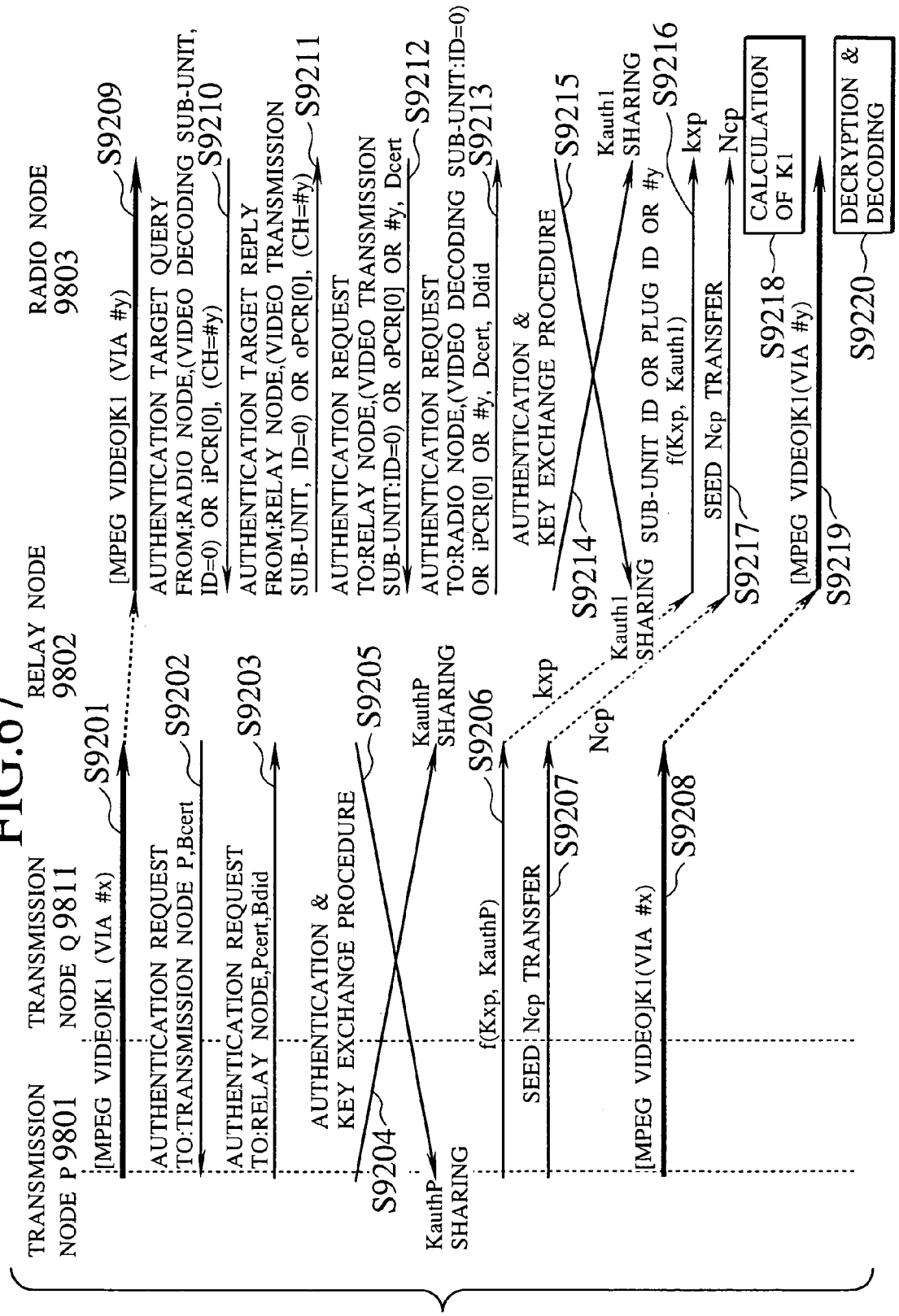

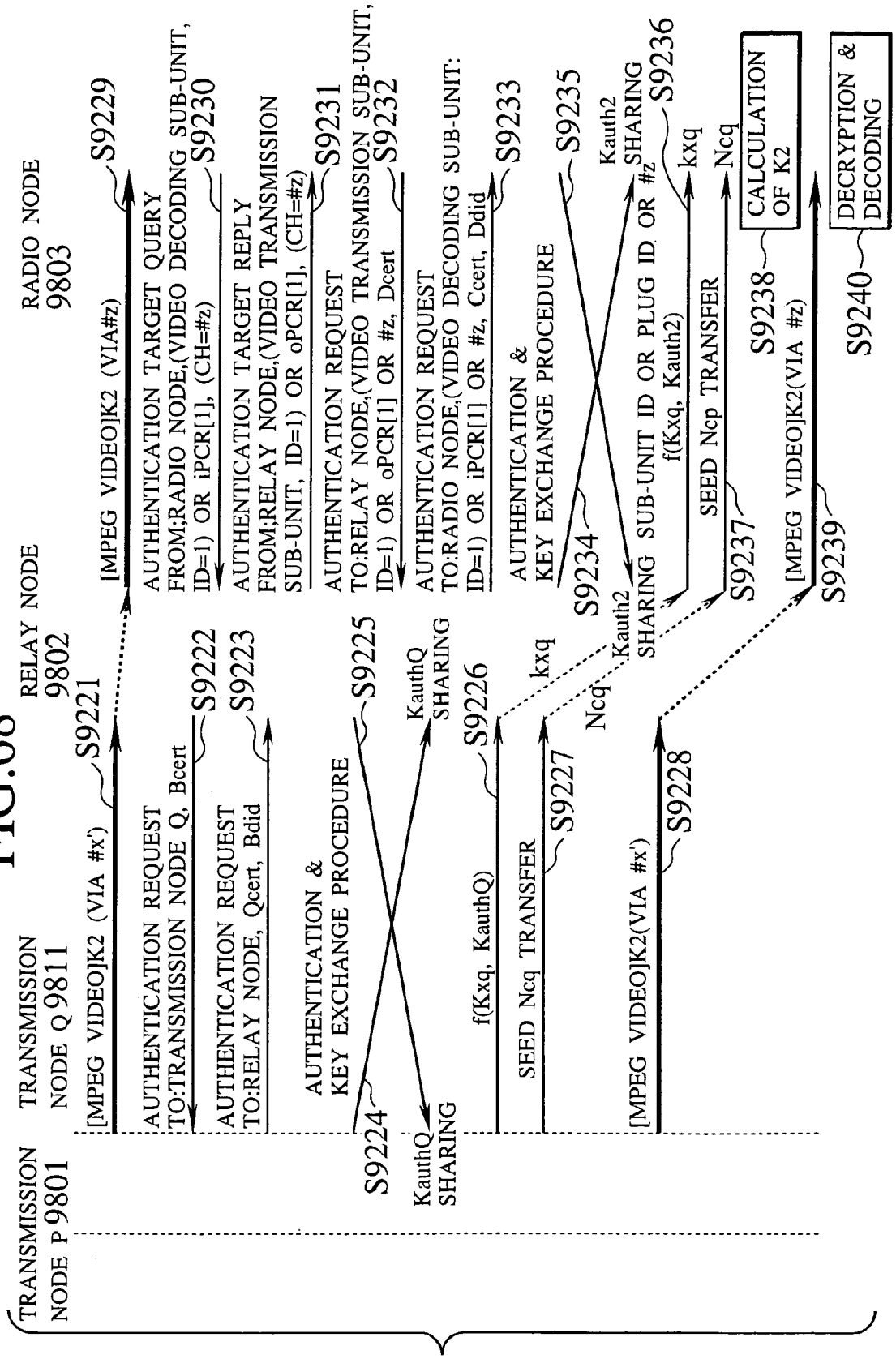

RELAY DEVICE AND COMMUNICATION DEVICE REALIZING CONTENTS PROTECTION PROCEDURE OVER NETWORKS

BACKGROUND OF THE INVENTION

1. Field of the Invention

The present invention relates to a relay device for relaying data transfer between networks such as IEEE 1394 buses and radio networks, and a communication device for carrying out communications through a network such as IEEE 1394 bus and radio network.

2. Description of the Background Art

In recent years, the so called "digitalization of home AV environment" is attracting much attentions as exemplified by the beginning of the digital broadcasting and the sales of digital AV instruments. Digital AV data have some excellent characteristics including the fact that various compression schemes are applicable, the fact that they can be processed as multimedia data, the fact that they are not degraded no matter how many times they are playbacked, etc., so that they are expected to have even wider use in future.

However, this digital AV technique has another aspect that "an illegal copy of contents can be made easily". Namely, for any digital contents, it is in principle possible to produce a copy with the same quality as the original, that will not degrade at all forever, by making "bit copy" so that the so called "illegal copy" problem arises.

Some techniques for preventing this "illegal copy" are currently discussed, including "1394CP Content Protection system Specification" that is discussed by the CPTWG (Copy Protection Technique Working Group). In this technique, for contents (such as MPEG data for example) to be transferred between nodes connected to the IEEE 1394 bus, the authentication between the transmitting and receiving nodes is carried out in advance so as to enable the sharing of an encryption key (contents key), and the contents are subsequently transferred by encrypting the contents such that the contents cannot be read by anyone except for those who have carried out the authentication procedure. In this way, a node that has not carried out the authentication procedure cannot ascertain the value of the contents key so that even if the transferred data (encrypted data) are obtained by such a node, the encrypted data cannot be decrypted by such a node. By making a rule that nodes that can participate in the authentication are only those nodes that are permitted by a prescribed authentication authority, it is possible to prevent an illegal node from acquiring the encryption key so that it is possible to prevent the illegal copy.

The IEEE 1394 bus is a network system having some very excellent characteristics including the fact that its speed is 100 Mbps at least, the fact that the network itself is equipped with an automatic configuration recognition function, the fact that it has a QOS transfer function, etc., so that it has been established as the de facto standard of a network for home digital AV use.

However, because of these characteristics, the IEEE 1394 also give rise to various constraints in the case of "connecting the IEEE 1394 with other networks". For example, in the case of connecting the IEEE 1394 bus with a radio network or a public network, it is impossible to directly extend the IEEE 1394 protocol to the radio network or the public network, because these networks are not as fast as over 100 Mbps in general and the automatic configuration recognition function of the IEEE 1394 cannot be directly extended to these networks so easily. For this reason, There are some propositions including a method in which a protocol conversion gateway is provided between the IEEE 1394 and the other network such as radio network or public network so as to interconnect them, and a method using the so called proxy server for providing services on one network as services on the other network.

In the case of attempting to apply these methods to the 1394 copy protection described above, currently the copy protection technique is defined only for the IEEE 1394 bus and currently there is no technique for extending this copy protection technique to the case of "connecting the IEEE 1394 with the other network".

SUMMARY OF THE INVENTION

It is therefore an object of the present invention to provide a relay device and a communication device capable of extending the copy protection technique to not just the IEEE 1394 but also the other network that is interconnected with the IEEE 1394.

It is another object of the present invention to provide a relay device and a communication device capable of realizing the contents protection procedure between devices that are not connected to the same network.

According to one aspect of the present invention there is provided a relay device, comprising: a first interface unit connected to a first network; a second interface unit connected to a second network; a proxy configuration unit for disclosing a device/service/sub-unit on the second network as an own device/service/sub-unit provided on the relay device with respect to a first network side; a control command reception unit for receiving control command signals destined to the own device/service/sub-unit from the first network side; a control command transmission unit for transmitting signals corresponding to the control command signals received by the control command reception unit, to the device/service/sub-unit on the second network; a contents protection information reception unit for receiving contents protection information destined to the own device/service/sub-unit, from a device on the first network; and a contents protection information transfer unit for transferring the contents protection information received by the contents protection information reception unit to the device/service/sub-unit on the second network, without making any change in the contents protection information.

According to another aspect of the present invention there is provided a relay device, comprising: a first interface unit connected to a first network; a second interface unit connected to a second network; a proxy configuration unit for disclosing each device/service/sub-unit on the first network or the second network as an own device/service/sub-unit provided on the relay device with respect to respective another network side; a control command reception unit for receiving control command signals destined to the own device/service/sub-unit from a side of one network to which the own device/service/sub-unit is disclosed by the proxy configuration unit; a control command transmission unit for transmitting signals corresponding to the control command signals received by the control command reception unit, to said each device/service/sub-unit on another network different from said one network; a contents protection information reception unit for receiving contents protection information destined to the own device/service/sub-unit from a device on the first network or the second network; a contents protection information transfer unit for transferring the contents protection information received by the contents protection information reception unit to said each device/service/sub-unit on said another network, without making any change in the contents protection information; a contents reception unit for receiving contents destined to the own device/service/sub-unit and protected by a contents key obtained from the contents protection information, from a device on the first network or the second network; and a contents transfer unit for transferring the contents received by the contents reception unit to said each device/service/sub-unit on said another network, without making any change in the contents.

In this relay device, the contents protection information can be information related to a contents protection procedure including an authentication and/or a key exchange between one device/service/sub-unit on the first network and another device/service/sub-unit on the second network.

According to this aspect of the present invention, between "a device/service/sub-unit on the second network that is provided by the proxy configuration unit" and "a device on the first network" which are a pair that is carrying out transmission or reception of contents to be protected, for example, "a device on the first network" or "a device/service/sub-unit on the second network that is provided by the proxy configuration unit" can carry out the contents protection procedure while recognizing the target of the contents protection procedure as this relay device, so that there is no need for "a device on the first network" or "a device/service/sub-unit on the second network that is provided by the proxy configuration unit" to account for the other network that is connected via the relay device. Also, the relay device actually relays this procedure without changing its content, so that this contents protection procedure can be carried out directly between "a device/service/sub-unit on the second network that is provided by the proxy configuration unit" and "a device on the first network".

Also, according to this aspect of the present invention, the contents to be protected can be delivered to the receiving side without changing their protection format, so that the contents can be delivered end-to-end in the protected form.

According to another aspect of the present invention there is provided a relay device, comprising: a first interface unit connected to a first network; a second interface unit connected to a second network; a proxy configuration unit for disclosing each device/service/sub-unit on the first network or the second network as an own device/service/sub-unit provided on the relay device with respect to respective another network side; a control command reception unit for receiving control command signals destined to the own device/service/sub-unit from a side of one network to which the own device/service/sub-unit is disclosed by the proxy configuration unit; a control command transmission unit for transmitting signals corresponding to the control command signals received by the control command reception unit, to said each device/service/sub-unit on another network different from said one network; a first contents protection unit for carrying out a contents protection procedure with respect to one device/service/sub-unit on the first network; a second contents protection unit for carrying out the contents protection procedure with respect to another device/service/sub-unit on the second network; a contents reception unit for receiving contents destined to the own device/service/sub-unit and encrypted according to one of the first and second contents protection units; and a contents transfer unit for transferring the contents received by the contents reception unit to said each device/service/sub-unit on said another network, by encrypting the contents according to another one of the first and second contents protection units.

According to this aspect of the present invention, between "a device/service/sub-unit on the second network" and "a device on the first network" which are a pair that is carrying out transmission or reception of contents to be protected, for example, "a device on the first network" or "a device/service/sub-unit on the second network" can carry out the contents protection procedure while recognizing the target of the contents protection procedure as this relay device, so that there is no need for "a device on the first network" or "a device/service/sub-unit on the second network" to account for the other network that is connected via the relay device. Also, the relay device terminates each contents protection procedure so that the contents protection procedure is carried out separately between "a device/service/sub-unit on the second network" and the relay device, and between the relay device and "a device on the first network", for example, and therefore it becomes possible to carry out the contents protection end-to-end.

Also, according to this aspect of the present invention, data to be transferred are encrypted throughout the entire route between "a device on the first network" or "a device/service/sub-unit on the second network", so that it becomes possible to prevent the illegal copy or the like.

In this relay device, the first contents protection unit and the second contents protection unit can use different encryption schemes or identical encryption scheme based on different key information.

Also, in this relay device, the contents reception unit and the contents transmission unit can be sealed within a single LSI. In this way, even though the non-encrypted contents data will flow between the decryption unit and the encryption unit, but it becomes possible to prevent the illegal copy by eavesdropping the contents data from there, by attaching a probe individually, for example.

Also, in this relay device, a first key information used in the contents protection procedure in the first contents protection unit and a second key information used in the contents protection procedure in the second contents protection unit can be set to be identical. In this way, the information notified from one network regarding a key of the encrypted data that are transferred to another network (key, seed, etc.) can be directly transferred to another network such that it becomes possible for a device on another network to reproduce the encryption key, so that there is no need for the decryption function and the re-encryption function between the contents reception unit and the contents transmission unit, and therefore it becomes possible to realize a considerable reduction of a cost and a faster processing speed for the relay device.

Also, in this relay device, the contents protection procedure in said another one of the first and second contents protection units can be carried out in units of contents/services/sub-units, using a prescribed key information. In this way, it becomes possible to define a plurality of encryption keys between the relay device and a device on another network side, so that it becomes possible to transfer the encrypted data simultaneously, and it becomes possible to deal with the case where a plurality of encrypted data are transferred from a device on one network or the case where there are a plurality of devices on one network.

Also, this relay device can further comprise a configuration information reception unit for receiving a configuration information from one device/service/sub-unit on the first network or the second network, the configuration information indicating at least a presence or absence of an authentication format for said one device/service/sub-unit; and a configuration recognition unit for recognizing a configuration of said one device/service/sub-unit according to the configuration information received by the configuration information reception unit. In this way, the proxy services to be configured by the proxy configuration unit can be configured automatically, so that it becomes possible to realize the procedure up to the contents protection procedure in a plug-and-play fashion.

According to another aspect of the present invention there is provided a relay device, comprising: a first interface unit connected to a first network; a second interface unit connected to a second network; a first contents protection unit for carrying out a contents protection procedure with respect to one device/service/sub-unit on the first network; a second contents protection unit for carrying out the contents protection procedure with respect to another device/service/sub-unit on the second network; a contents reception unit for receiving contents destined to an own device/service/sub-unit on the relay device and encrypted according to one of the first and second contents protection units, from a device on one of the first network and the second network; and a contents transmission unit for transmitting the contents received by the contents reception unit to a device/service/sub-unit on another one of the first network and the second network, by encrypting the contents according to another one of the first and second contents protection units; wherein a first key information used in the contents protection procedure in the first contents protection unit and a second key information used in the contents protection procedure in the second contents protection unit are set to be identical.

According to another aspect of the present invention there is provided a communication device, comprising: an interface unit connected to a network; a copy protection processing unit for carrying out a prescribed contents protection procedure including at least an authentication procedure and/or a key exchange procedure, with respect to another device/service/sub-unit on the network; a contents transmission unit for transmitting encrypted contents to which an address of the communication device is attached, either through a virtual channel on the network or by further attaching an identifier by which the encrypted contents can be uniquely identified by the communication device, to another device on the network; a reception unit for receiving a query regarding a service/sub-unit/plug that is transferring the encrypted contents either through the virtual channel or by attaching the identifier, from said another device on the network; and a notification unit for notifying a service/sub-unit/plug that is transferring the encrypted contents, to said another device on the network in response to the query.

According to another aspect of the present invention there is provided a communication device, comprising: an interface unit connected to a network; a copy protection processing unit for carrying out a prescribed contents protection procedure including at least an authentication procedure and/or a key exchange procedure, with respect to another device/service/sub-unit on the network; a contents reception unit for receiving encrypted contents to which an address of another device on the network is attached, either through a virtual channel on the network or in a form having an identifier by which the encrypted contents can be uniquely identified by said another device further attached thereto, from said another device; a transmission unit for transmitting a query regarding a service/sub-unit/plug that is transferring the encrypted contents either through the virtual channel or by attaching the identifier, to said another device on the network; and a reception unit for receiving a notification regarding a service/sub-unit/plug that is transferring the encrypted contents, from said another device in response to the query.

According to this aspect of the present invention, it becomes possible to specify a sub-unit or a plug that is transmitting or receiving the encrypted data that are transferred through a specific virtual channel, and it becomes possible to explicitly indicate that the authentication and key exchange regarding data transmitted or received from this sub-unit (or plug) should be carried out in the subsequent authentication and key exchange, so that it becomes possible to define a plurality of keys simultaneously even between the same nodes and therefore the exchange of a plurality of encrypted data becomes possible.

Else, according to this aspect of the present invention, it becomes possible to specify a sub-unit or a plug that is transmitting or receiving the encrypted data that are transferred with a specific identifier attached thereto, and it becomes possible to explicitly indicate that the authentication and key exchange regarding data transmitted or received from this sub-unit (or plug) should be carried out in the subsequent authentication and key exchange, so that it becomes possible to define a plurality of keys simultaneously even between the same nodes and therefore the exchange of a plurality of encrypted data becomes possible.

According to another aspect of the present invention there is provided a communication device, comprising: an interface unit connected to a network; a contents transfer unit for transmitting or receiving encrypted contents with respect to another device on the network, through a flow identified by a set of a source address, a source port, a destination address, and a destination port; and a copy protection processing unit for carrying out a prescribed contents protection procedure including at least an authentication procedure and/or a key exchange procedure with respect to said another device, using a prescribed logical port, in units of the flow.

In this communication device, an identifier of the flow can be attached to information exchanged in at least a part of procedures included in the prescribed contents protection procedure.

According to this aspect of the present invention, it becomes possible to define different keys for different flows, and it becomes possible to explicitly indicate that the authentication and key exchange regarding data transmitted or received from this sub-unit (or plug) should be carried out in the subsequent authentication and key exchange, so that it becomes possible to define a plurality of keys simultaneously even between the same nodes and therefore the exchange of a plurality of encrypted data becomes possible.

According to another aspect of the present invention there is provided a communication device, comprising: an interface unit connected to a network; a copy protection processing unit for carrying out a prescribed contents protection procedure including at least an authentication procedure and/or a key exchange procedure, with respect to another device on the network; and a contents transmission and reception unit for transmitting or receiving encrypted contents to which an address of a transmitting side device is attached, either through a virtual channel on the network or in a form having an identifier by which the encrypted contents can be uniquely identified by said transmitting side device further attached thereto, with respect to said another device; wherein at least one of an identifier of a service, a sub-unit, a virtual channel, or a plug that carries out exchange of the encrypted contents, and an identifier by which the encrypted contents can be uniquely identified by said transmitting side device, is attached to information exchanged in at least a part of procedures included in the prescribed contents protection procedure.

According to this aspect of the present invention, it becomes possible to explicitly indicate that the authentication and key exchange regarding data transmitted or received from this sub-unit, plug, or virtual channel should be carried out in the authentication and key exchange, so that it becomes possible to define a plurality of keys simultaneously even between the same nodes and therefore the exchange of a plurality of encrypted data becomes possible.

Else, according to this aspect of the present invention, it becomes possible to explicitly indicate that the authentication and key exchange regarding data transmitted or received from this sub-unit or plug, or with the specific identifier attached thereto should be carried out in the authentication and key exchange, so that it becomes possible to define a plurality of keys simultaneously even between the same nodes and therefore the exchange of a plurality of encrypted data becomes possible.

According to another aspect of the present invention there is provided a relay device, comprising: a first interface unit connected to a first network; a second interface unit connected to a second network; a first copy protection processing unit for carrying out a prescribed contents protection procedure including at least an authentication procedure and a key exchange procedure, with respect to one device/service/sub-unit on the first network; a second copy protection processing unit for carrying out the prescribed contents protection procedure including at least an authentication procedure and a key exchange procedure, with respect to another device/service/sub-unit on the second network; a contents reception unit for receiving encrypted data containing specific contents from the first interface unit; a decryption unit for decrypting the encrypted data receiving by the contents reception unit, by using a contents protection key provided by the first copy protection processing unit, to obtain decrypted data; a conversion unit for converting the decrypted data into converted data in another coding format; an encryption unit for encrypting the converted data, by using a contents protection key provided by the second copy protection processing unit, to obtain re-encrypted data; and a contents transmission unit for transferring the re-encrypted data to the second interface unit.

According to this aspect of the present invention, in the case where it is required to transfer data to the second network in a data format different from the original data, as in the case where data to be transmitted through the first network are contents to be protected and the communication bandwidths of the first network and the second network are largely different, the conversion of the data format can be carried out by the conversion unit while the data to be transferred are encrypted throughout the entire route between a device on the first network to a device/service/sub-unit on the second network, so that it becomes possible to prevent the illegal copy or the like at both sections (in both data formats).

This relay device can further comprise a proxy configuration unit for disclosing one device/service/sub-unit on the second network as one own device/service/sub-unit provided on the relay device with respect to a first network side, and transmitting to said one device/service/sub-unit on the second network an information having a content according to information destined to said one own device/service/sub-unit that is received from a device on the first network side, while also disclosing another device/service/sub-unit on the first network as another own device/service/sub-unit provided on the relay device with respect to a second network side, and transmitting to said another device/service/sub-unit on the first network an information having a content according to information destined to said another own device/service/sub-unit that is received from a device on the second network side, such that when the prescribed contents protection procedure between a device on one network among the first and second networks and a device/service/sub-unit on another network among the first and second networks is to be carried out, the proxy configuration unit carries out the prescribed contents protection procedure with the device on said one network by using one of the first and second copy protection processing units, while carrying out the prescribed contents protection procedure with the device/service/sub-unit on said another network by using another one of the first and second copy protection processing units.

According to this aspect of the present invention, between "a device/service/sub-unit on another network" and "a device on one network" which are a pair that is carrying out transmission or reception of contents to be protected, "a device on one network" or "a device/service/sub-unit on another network" can carry out the contents protection procedure while recognizing the target of the contents protection procedure as this relay device, so that there is no need for "a device on one network" or "a device/service/sub-unit on another network" to account for the other network that is connected via the relay device. Also, the relay device actually terminates each contents protection procedure so that the contents protection procedure is carried out separately between "a device/service/sub-unit on another network" and the relay device, and between the relay device and "a device on one network", and therefore it becomes possible to carry out the contents protection end-to-end.

According to another aspect of the present invention there is provided a relay device, comprising: a first interface unit connected to a first network; a second interface unit connected to a second network; a first contents protection unit for carrying out a contents protection procedure with respect to one device/service/sub-unit on the first network; a second contents protection unit for carrying out the contents protection procedure with respect to another device/service/sub-unit on the second network; a contents reception unit for receiving contents destined to an own device/service/sub-unit on the relay device and encrypted according to one of the first and second contents protection units, from a device on one of the first network and the second networks; and a contents transmission unit for transmitting the contents received by the contents reception unit to a device/service/sub-unit on another one of the first network and the second network, by encrypting the contents according to another one of the first and second contents protection units; wherein said one of the first and second contents protection units carries out an authentication and/or a key exchange with a device/service/sub-unit on said one of the first network and the second network by referring to a relationship between the contents reception unit and the contents transmission unit, when there is a request for a procedure of the authentication and/or the key exchange with respect to said another one of the first and second contents protection units.

Other features and advantages of the present invention will become apparent from the following description taken in conjunction with the accompanying drawings.

BRIEF DESCRIPTION OF THE DRAWINGS

FIG. 16 is another diagram showing an exemplary form of a proxy table used in the first embodiment of the present invention.

FIG. 38 is a diagram showing an exemplary format of a radio frame used in the second embodiment of the present invention.

FIG. 39 is a diagram showing an exemplary format of a radio node control packet used in the second embodiment of the present invention.

FIG. 54 is a diagram showing exemplary forms of a panel of a transmission node and a home page for transmission node control of a home gateway used in the third embodiment of the present invention.

FIG. 65 is a schematic diagram showing an exemplary overall configuration of a network according to the fifth embodiment of the present invention.

FIG. 66 is a flow chart showing an exemplary operation procedure of a relay node according to the fifth embodiment of the present invention.

FIG. 67 is a sequence chart showing an exemplary overall sequence in the fifth embodiment of the present invention.

FIG. 68 is another sequence chart showing an exemplary overall sequence in the fifth embodiment of the present invention.

DETAILED DESCRIPTION OF THE PREFERRED EMBODIMENTS

First Embodiment

Referring now to FIG. 1 to FIG. 19, the first embodiment of a relay device and a communication device according to the present invention will be described in detail.

Figure 1:
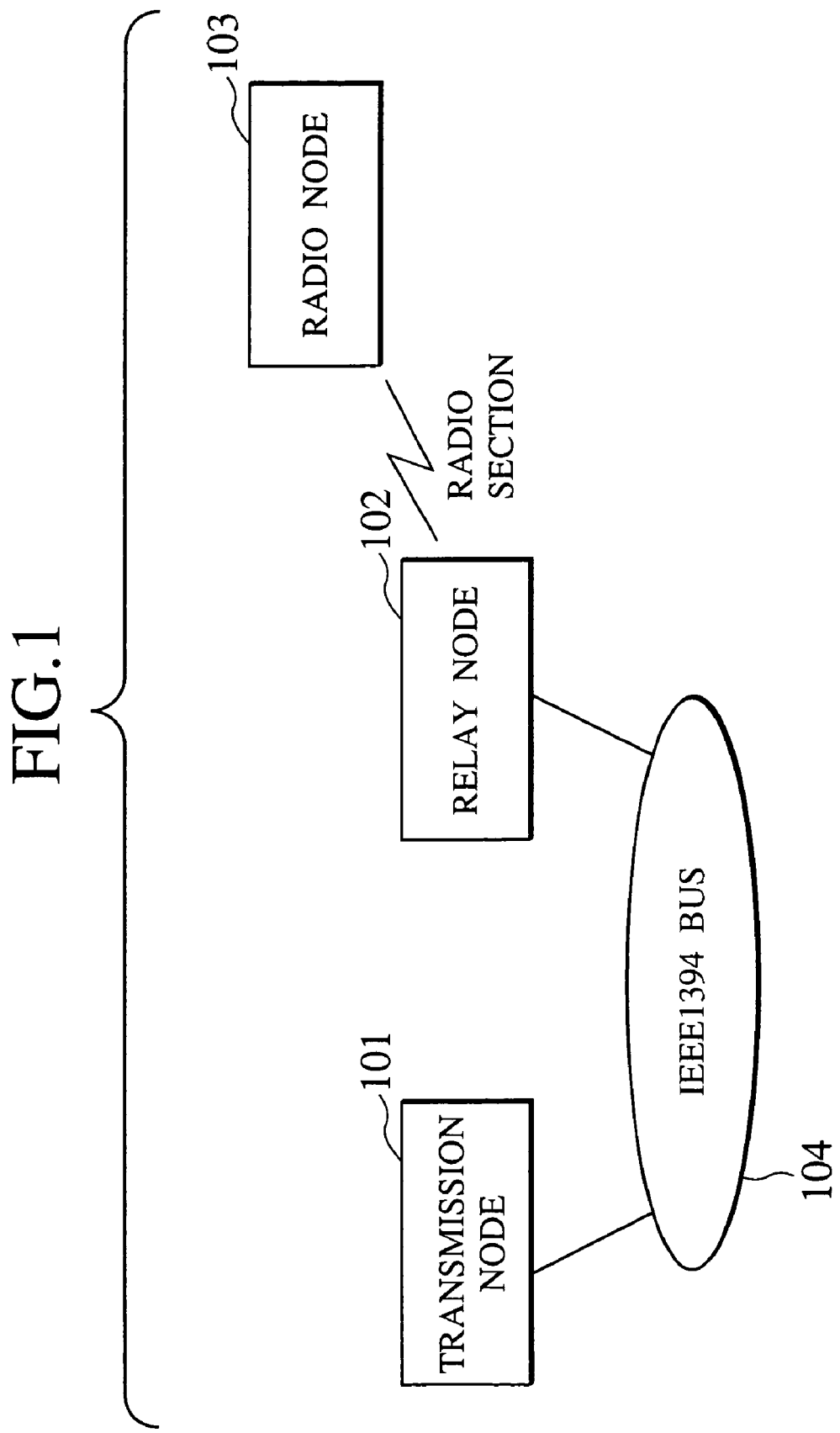
FIG. 1 is a schematic diagram showing an exemplary overall configuration of a network according to the first embodiment of the present invention.

FIG. 1 shows an exemplary overall configuration of a home network at some home. To this home network, three nodes including a transmission node 101, a relay node 102, and a radio node 103 are connected, where the transmission node 101 and the relay node 102 are connected to a (wire) IEEE 1394 bus 104 while the relay node 102 and the radio node 103 are connected to a radio network. Note however that it is made possible to carry out communications among these three nodes by the method described below.

In this embodiment, the exemplary case where MPEG video transmitted from the transmission node 101 is relayed at the relay node 102 and transmitted to the radio node 103 via the radio section will be described. In this exemplary case, encryption of the MPEG video data transferred between the transmission node 101 and the radio node 103 for the purpose of copyright protection (illegal copy prevention) will be considered.

Note that FIG. 1 shows three nodes, but any nodes other than these three nodes may also be connected (this also applies to all the other embodiments described below).

Figure 2:
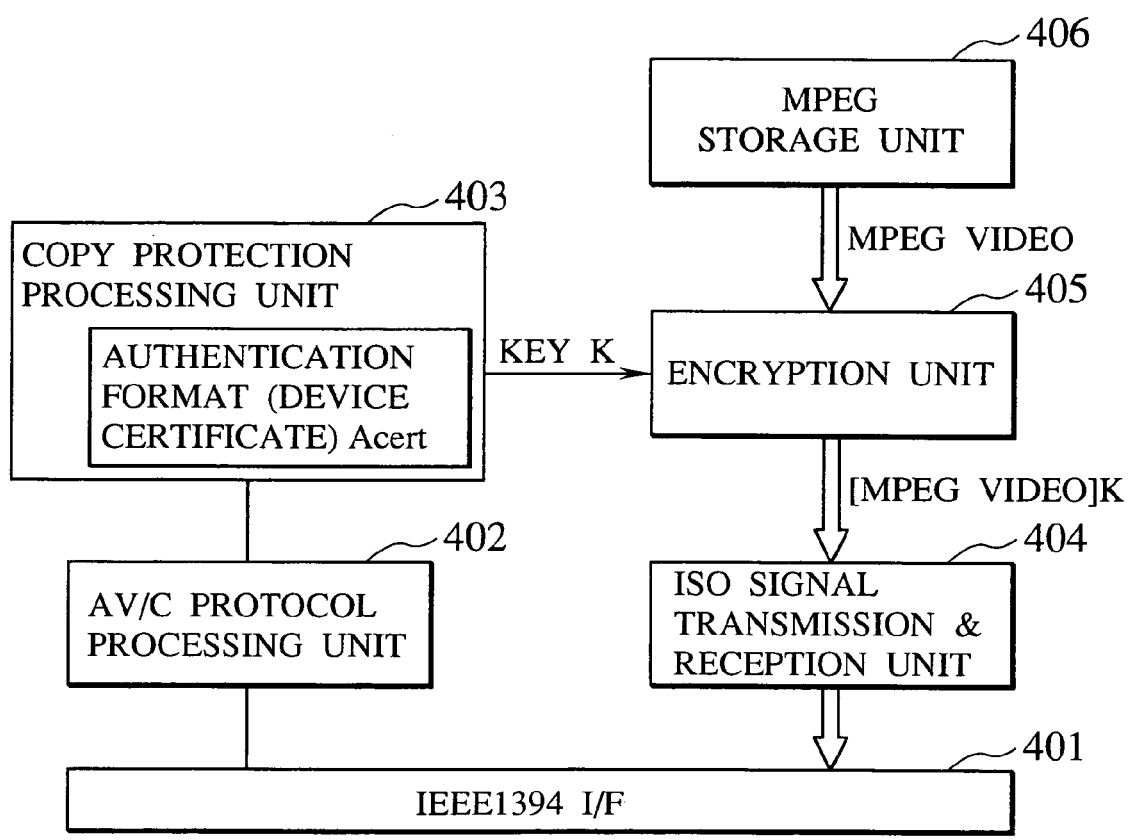
FIG. 2 is a block diagram showing an exemplary internal configuration of a transmission node in the network of FIG. 1.

FIG. 2 shows an exemplary internal configuration of the transmission node 101.

The transmission node 101 is a device for storing the MPEG video data therein, which transmits the MPEG video data through the IEEE 1394 bus 104 according to the need. The transmission node 101 has a function for encrypting the MPEG video data to be transmitted whenever necessary, in order to prevent the illegal copying on the IEEE 1394 bus at a time of transmission. In addition, the transmission node 101 also has a function for carrying out exchange of authentication data, encryption key, etc., with a receiving node of the MPEG video data.

As shown in FIG. 2, this transmission node 101 comprises an IEEE 1394 interface 401, an AV/C protocol processing unit 402 for carrying out AV/C protocol processing, a copy protection processing unit 403 for carrying out processing regarding the copy protection within the AV/C protocol, an ISO signal transmission and reception unit 404 for transmitting and receiving data to be exchanged through isochronous channels among data transmitted and received through the IEEE 1394, an MPEG storage unit 406 for storing MPEG video data, and an encryption unit 405 for encrypting the MPEG video data by using an encryption key K given from the copy protection unit 403, and sending the encrypted MPEG video data to the ISO signal transmission and reception unit 404. Here, the copy protection unit 403 has an authentication format (device certificate) Acert.

Figure 3:
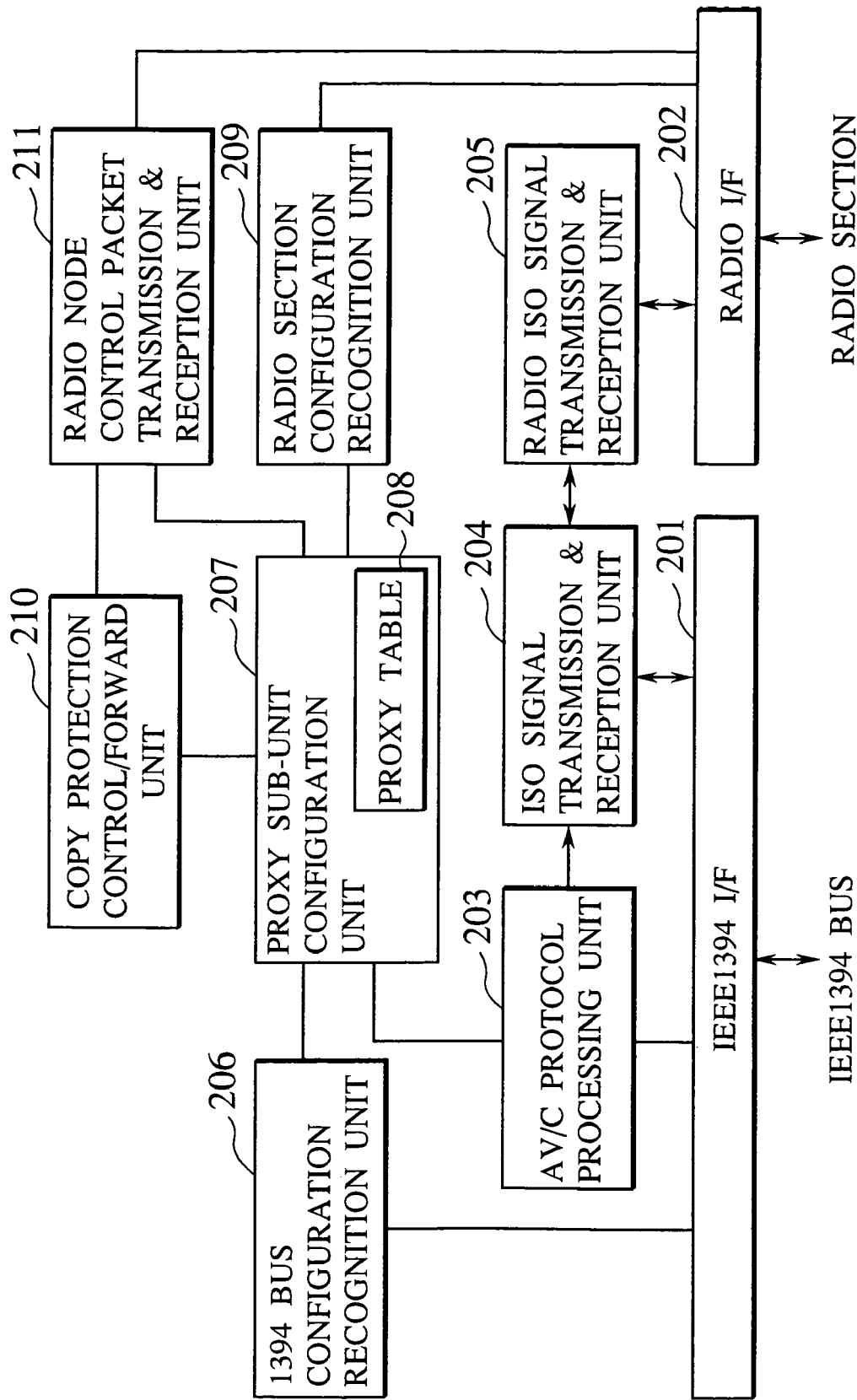
FIG. 3 is a block diagram showing an exemplary internal configuration of a relay node in the network of FIG. 1.

Next, FIG. 3 shows an exemplary internal configuration of the relay node 102.

The relay node 102 has a function for forwarding data (MPEG video data) received from the IEEE 1394 bus side to the radio section side, a function for providing functions of the radio node as a proxy server of the radio node with respect to a node on the IEEE 1394 bus side, and a function for providing functions of a node on the IEEE 1394 bus side as a proxy server of a node on the IEEE 1394 bus side (the transmission node 101 in this embodiment) with respect to a node on the radio section side.

As shown in FIG. 3, this relay node 102 comprises an IEEE 1394 interface 201, a radio interface 202, an AV/C protocol processing unit 203, an ISO signal transmission and reception unit 204, a radio ISO signal transmission and reception unit 205 for transmitting and receiving signals of isochronous channels on the radio section side, a 1394 bus configuration recognition unit 206 having a function for collecting a configuration information of a node on the IEEE 1394 bus and advertising the own configuration information (such as information regarding functions that are provided by the own device) on the IEEE 1394, a proxy sub-unit configuration unit 207 for disclosing a node and services (sub-units) on the radio section side with respect to the IEEE 1394 bus side as a proxy, accepting commands and the like for a node and services on the radio section side as a proxy and transmitting them to the radio section side by applying a protocol conversion according to the need, or disclosing a node and services (sub-units) on the IEEE 1394 side with respect to the radio section side as a proxy, accepting commands and the like for a node and services on the IEEE 1394 side as a proxy and transmitting them to the IEEE 1394 side by applying a protocol conversion according to the need, a radio section configuration recognition unit 209 having a function for collecting a configuration information of a node on the radio section and advertising the own configuration information (such as information regarding functions that are provided by the own device) on the radio section, a copy protection control/forward unit 210 for carrying out processing regarding the copy protection and transparently forwarding information to be exchanged regarding the copy protection processing across the 1394 bus and the radio section, and a radio node control packet transmission and reception unit 211 for transmitting and receiving control packets to be exchanged in the radio section.

Figure 4:
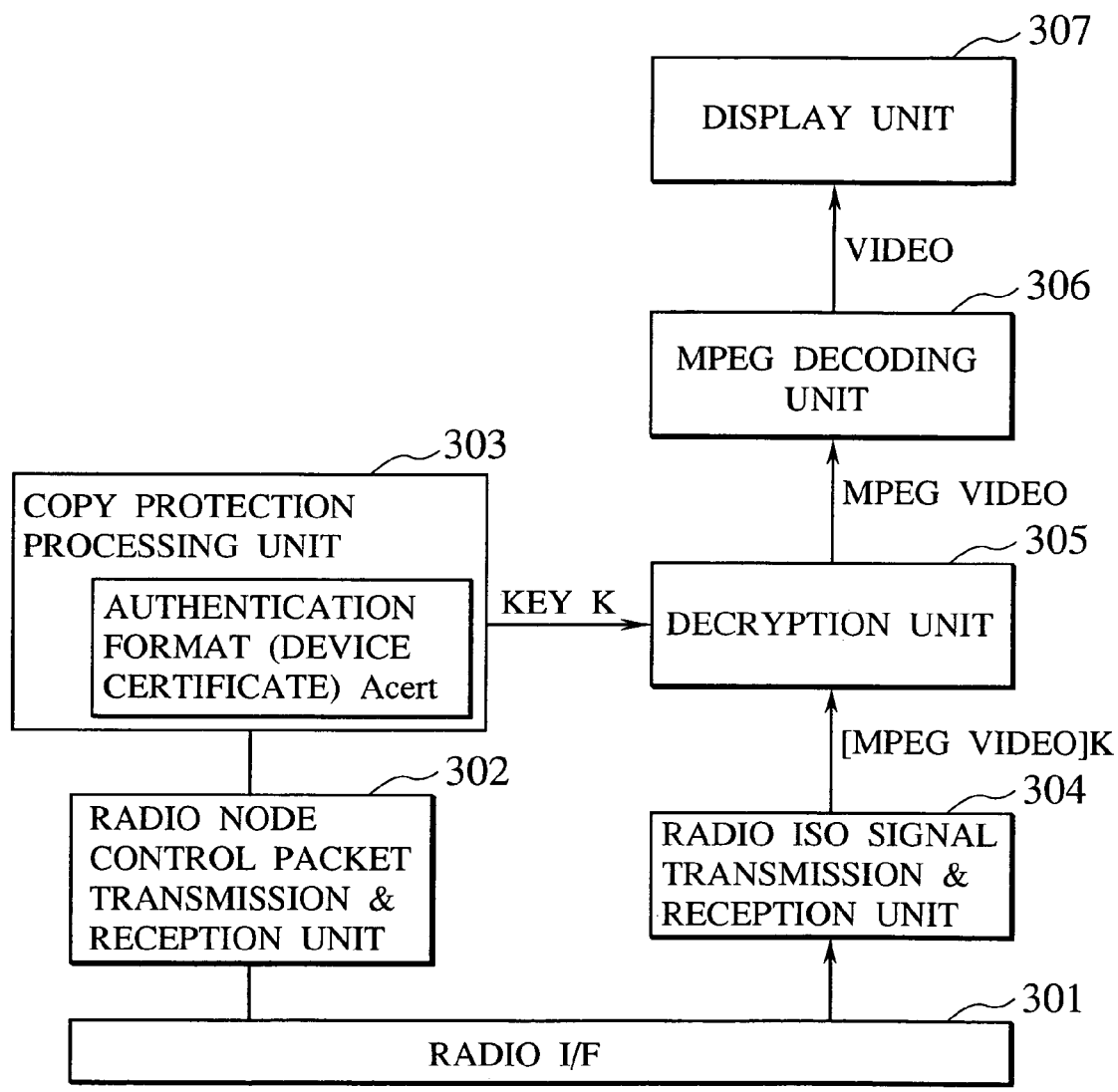
FIG. 4 is a block diagram showing an exemplary internal configuration of a radio node in the network of FIG. 1.

Next, FIG. 4 shows an exemplary internal configuration of the radio node 103.

In the radio section, there is no need to have the so called IEEE 1394 protocol (physical layer protocol, link layer protocol, etc.) activated, and arbitrary radio protocol such as the IEEE 802.11, radio LAN, etc., can be used, but in this embodiment, it is assumed that a radio network having the so called QOS function (isochronous communication function) is to be used. Note however that this embodiment is not limited to the case where the QOS function is required in the radio section.

In order for the radio node 103 that is not the so called IEEE 1394 node to carry out communications with a node (the transmission node 101 in this embodiment) connected to the IEEE 1394 bus, the relay node 102 emulates a node and functions (sub-units) on the IEEE 1394 bus as mentioned above. Namely, from a viewpoint of the radio node 103, the relay node 102 functions as the so called proxy server for a node and functions on the IEEE 1394 bus side. The radio node 103 carries out communications by regarding these node and functions on the IEEE 1394 side as functions of the relay node 102 but in reality the relay node 102 carries out the necessary protocol conversion and data transfer.

As shown in FIG. 4, this radio node 103 comprises a radio interface 301, a radio node control packet transmission and reception unit 302, a copy protection processing unit 303, a radio ISO signal transmission and reception unit 304, a decryption unit 305 for decrypting the received encrypted stream (MPEG video, etc.) by using the contents key K given from the copy protection unit 303, an MPEG decoding unit 306, and a display unit 307 for displaying video.

As will be described below, the copy protection unit 303 of the radio node 103 has an authentication format (device certificate) Bcert, which is issued by the same issuance organization that issued the authentication format Acert of (the video transmission sub-unit of) the transmission node 101.

Figure 6:
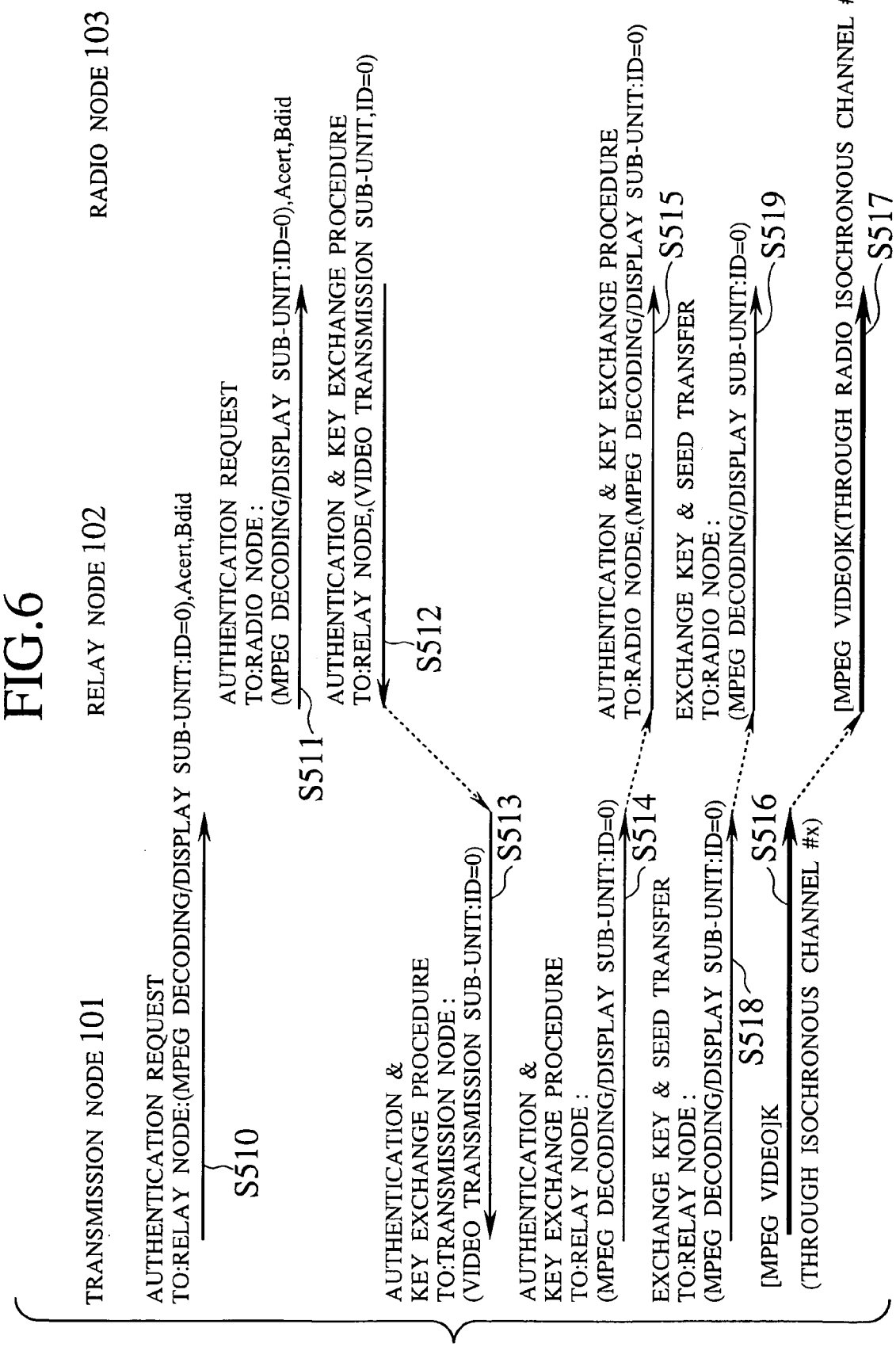
FIG. 6 is another sequence chart showing an exemplary overall sequence in the first embodiment of the present invention.
Figure 7:
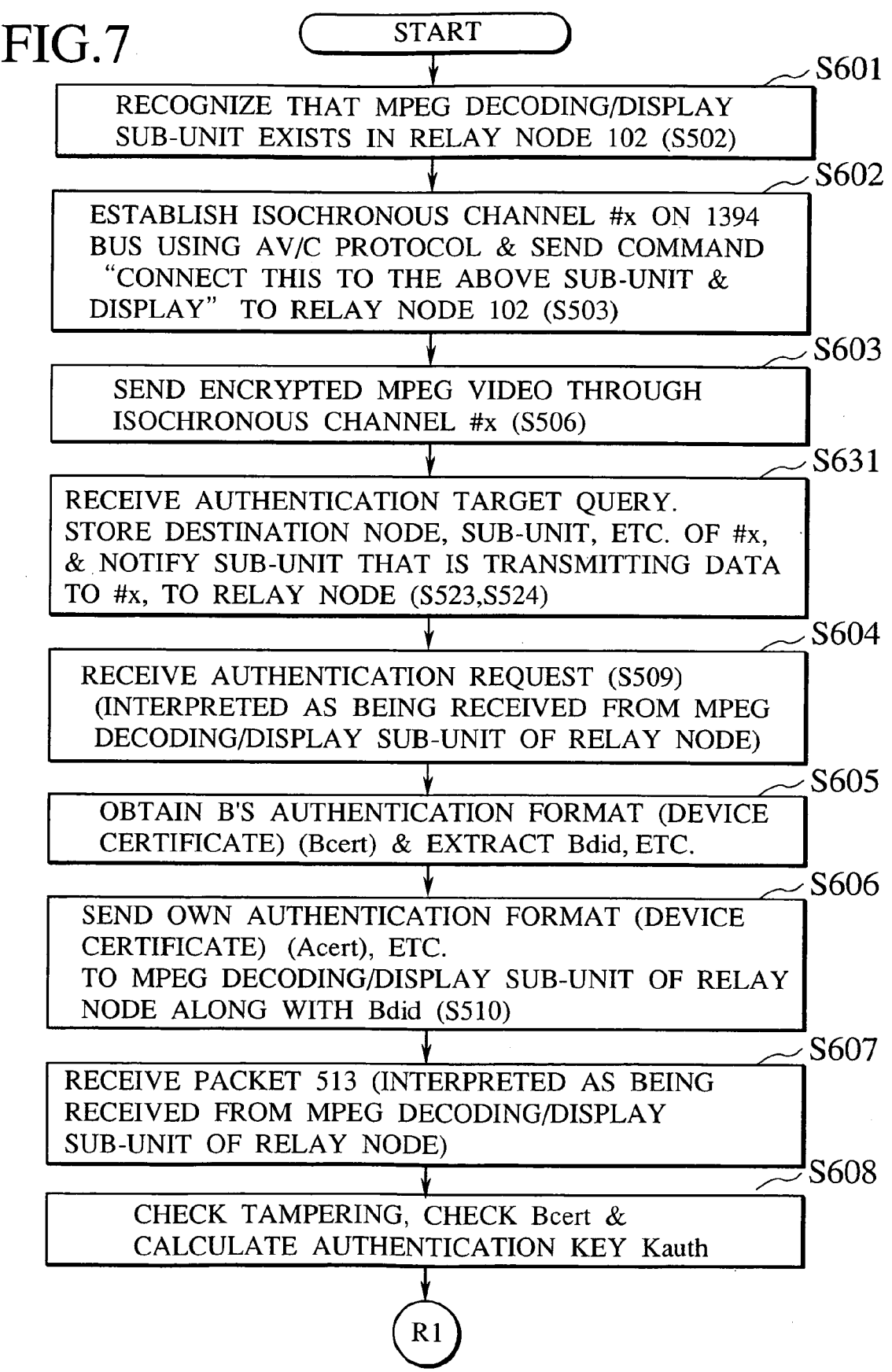
FIG. 7 is a flow chart showing an exemplary operation procedure of a transmission node according to the first embodiment of the present invention.
Figure 8:
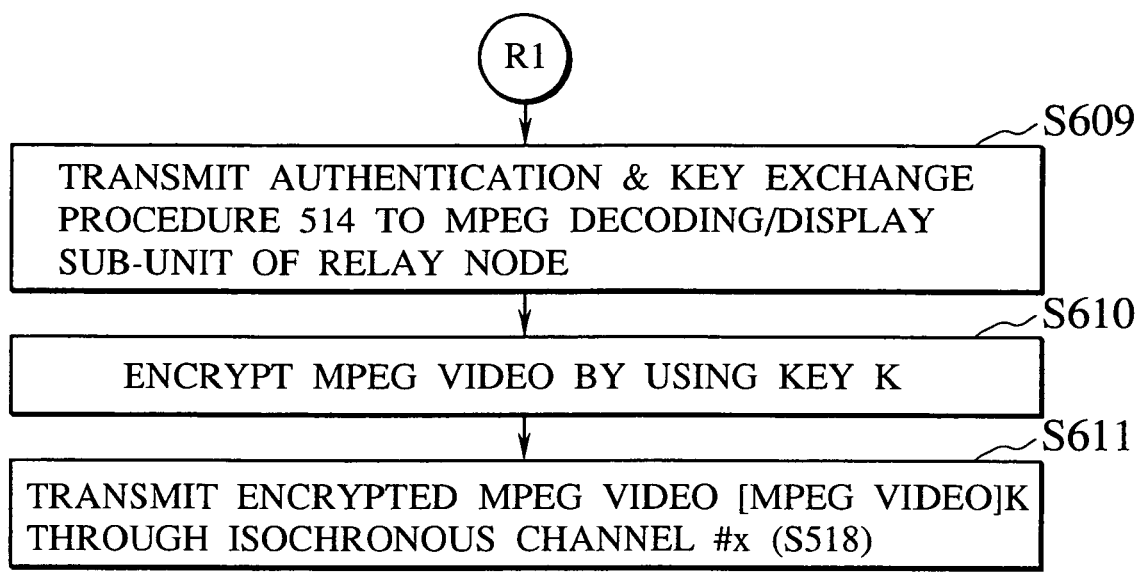
FIG. 8 is another flow chart showing an exemplary operation procedure of a transmission node according to the first embodiment of the present invention.
Figure 9:
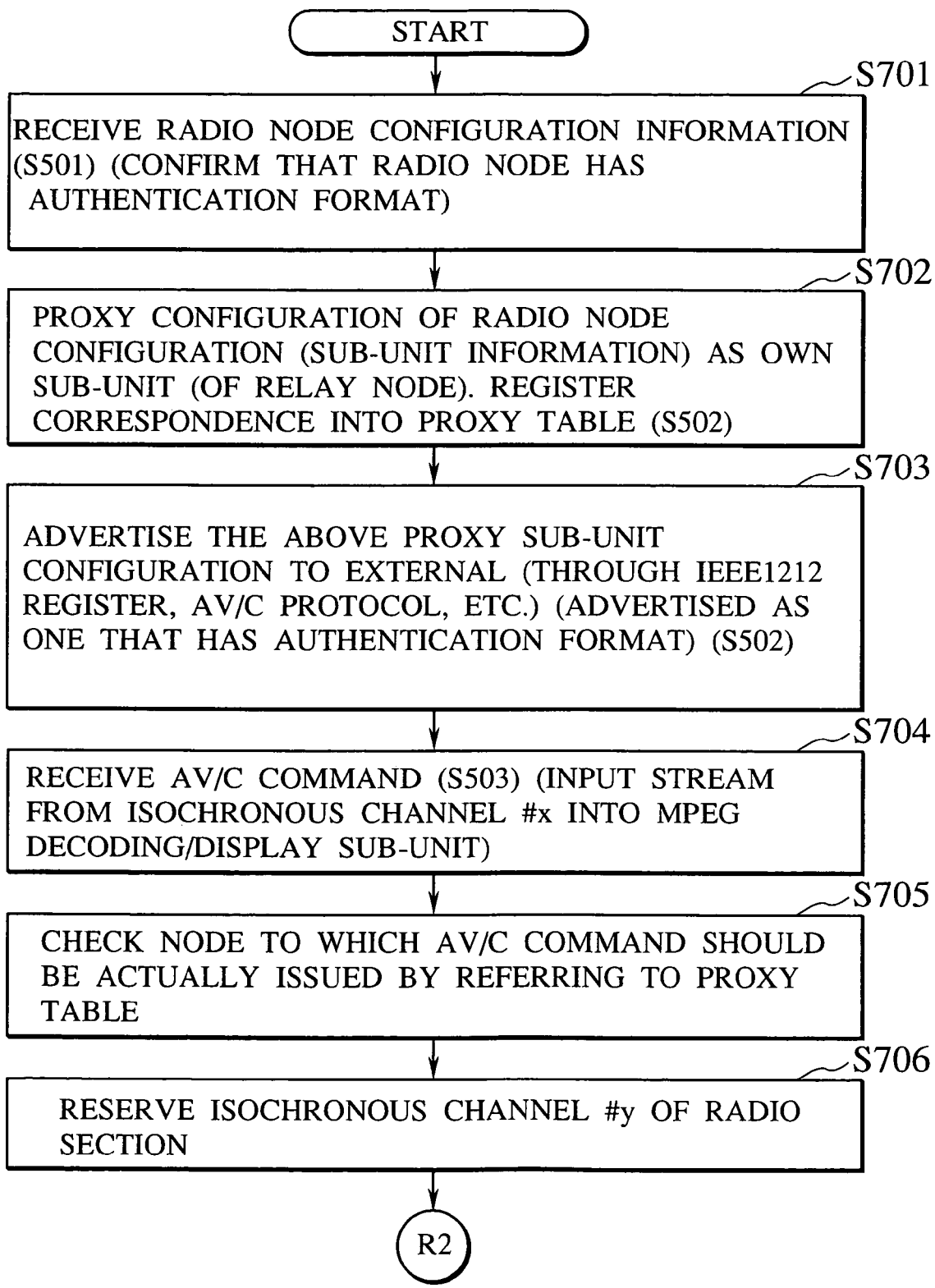
FIG. 9 is a flow chart showing an exemplary operation procedure of a relay node according to the first embodiment of the present invention.
Figure 10:
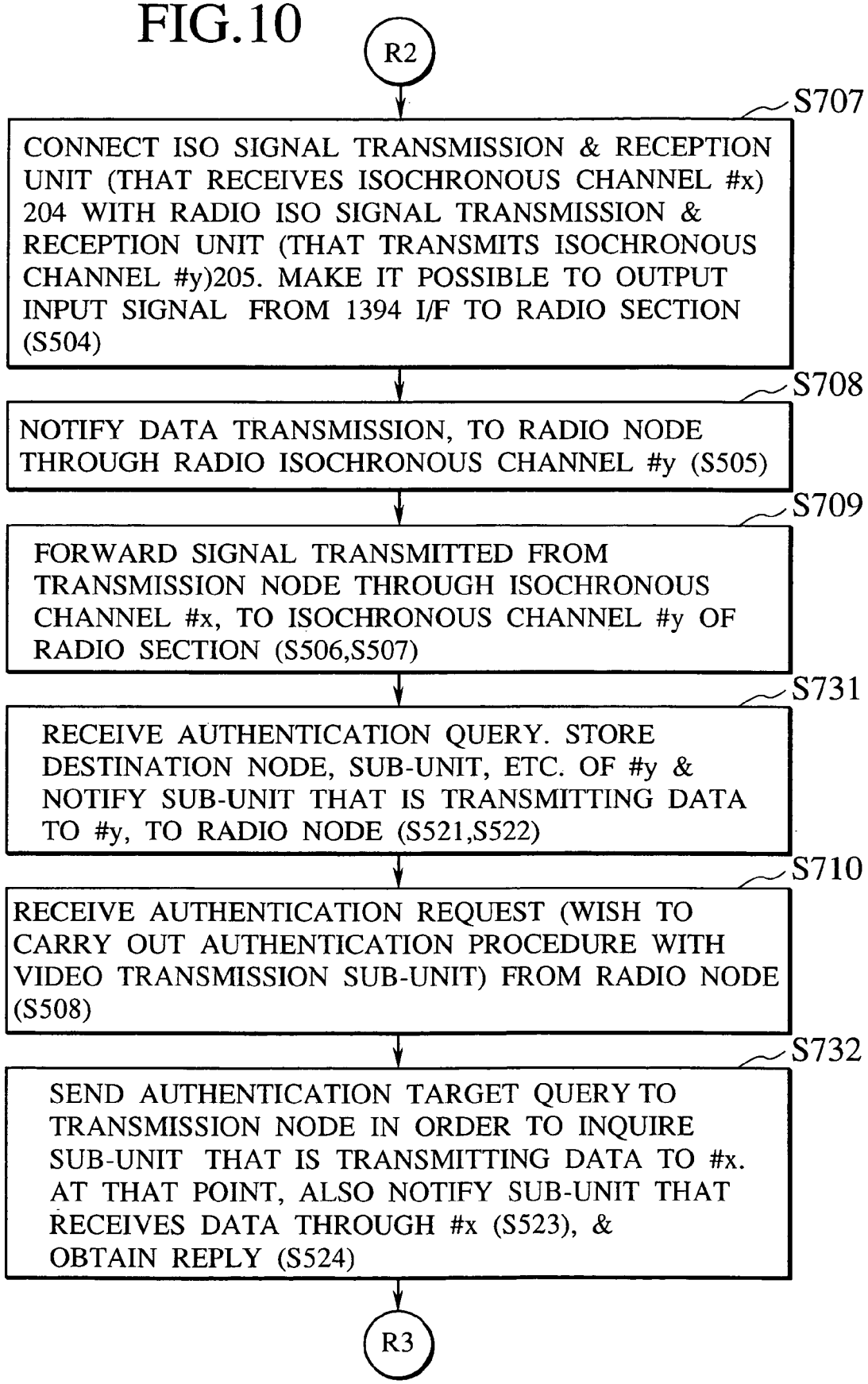
FIG. 10 is another flow chart showing an exemplary operation procedure of a relay node according to the first embodiment of the present invention.
Figure 11:
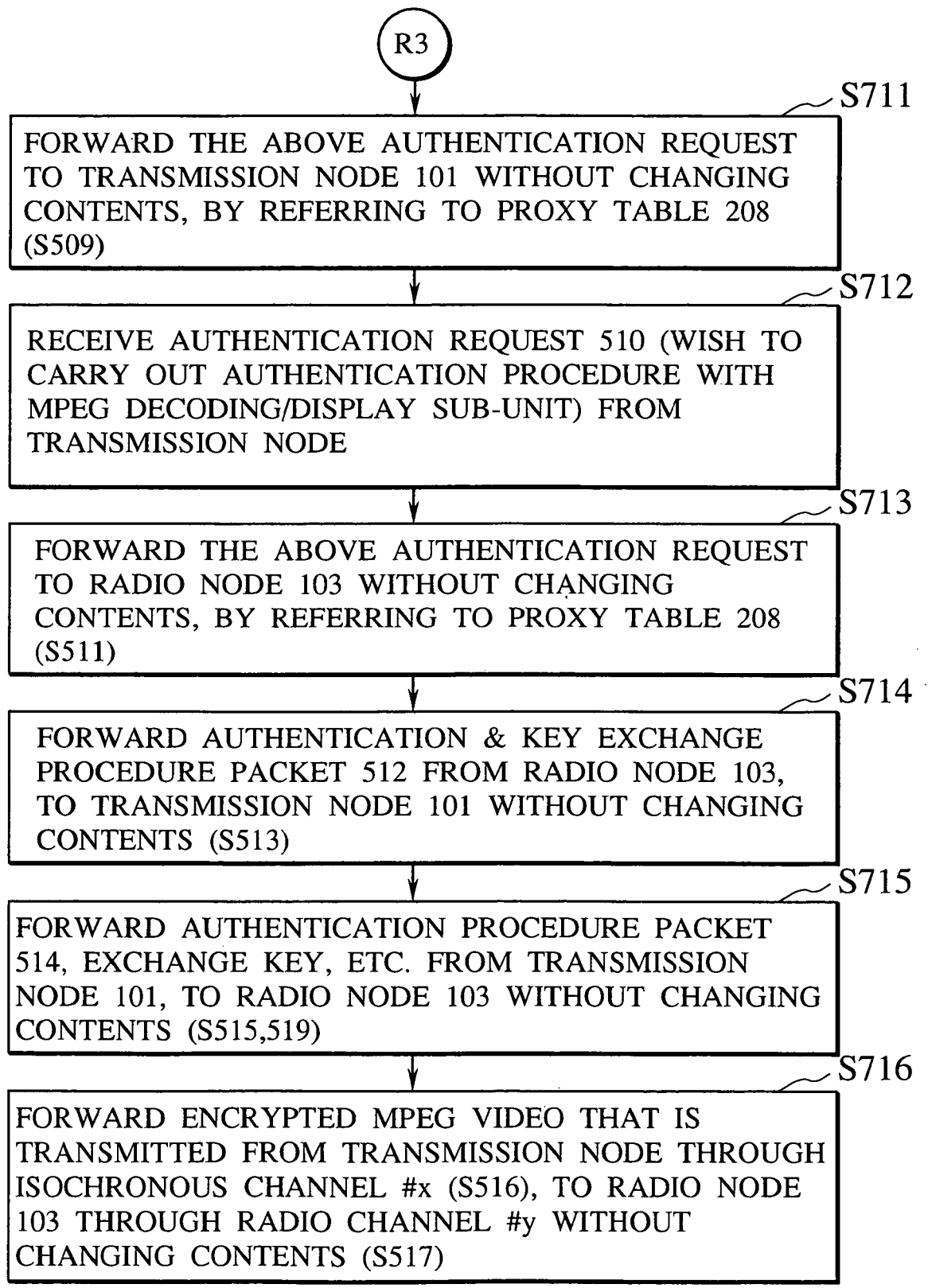
FIG. 11 is another flow chart showing an exemplary operation procedure of a relay node according to the first embodiment of the present invention.
Figure 12:
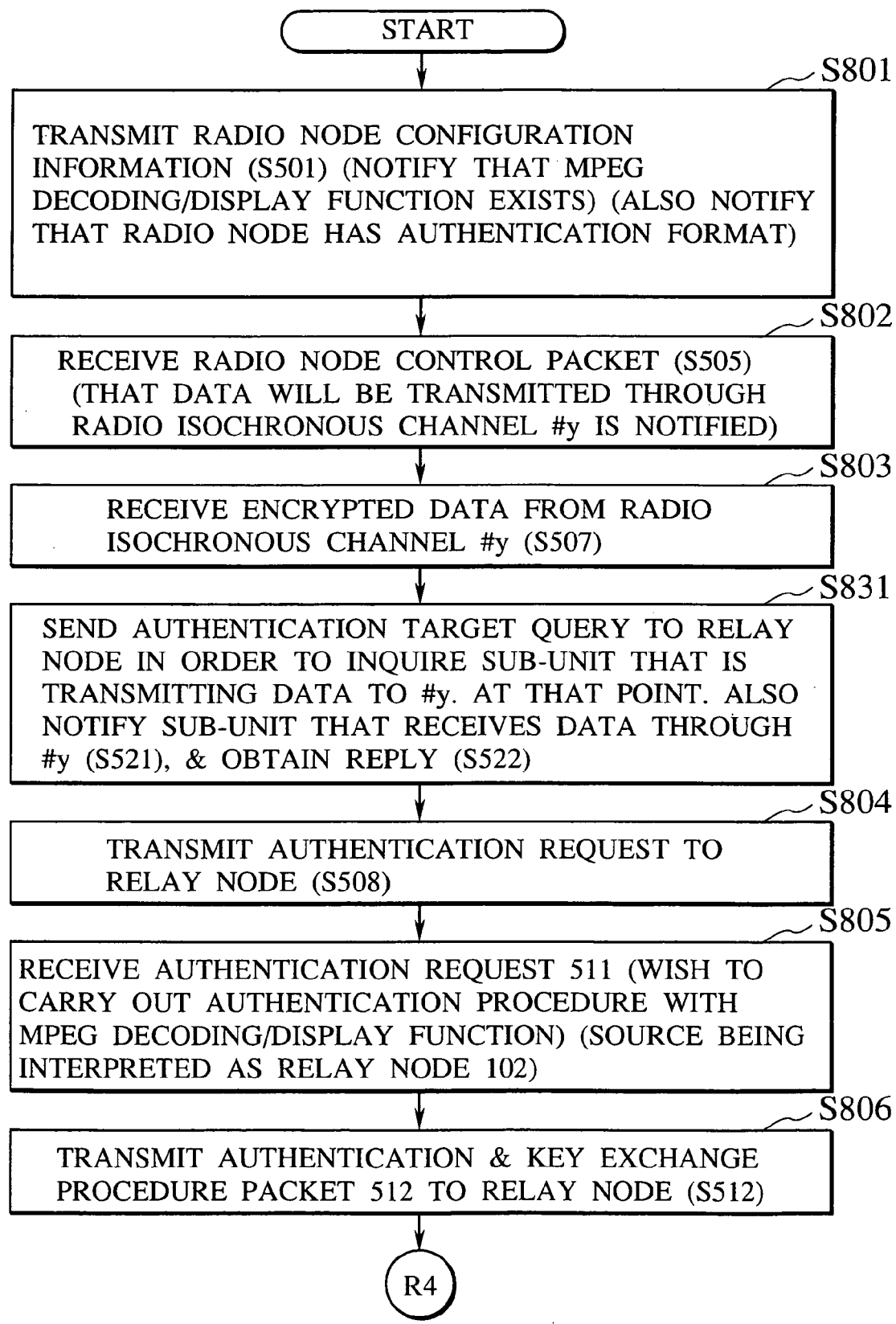
FIG. 12 is a flow chart showing an exemplary operation procedure of a radio node according to the first embodiment of the present invention.
Figure 13:
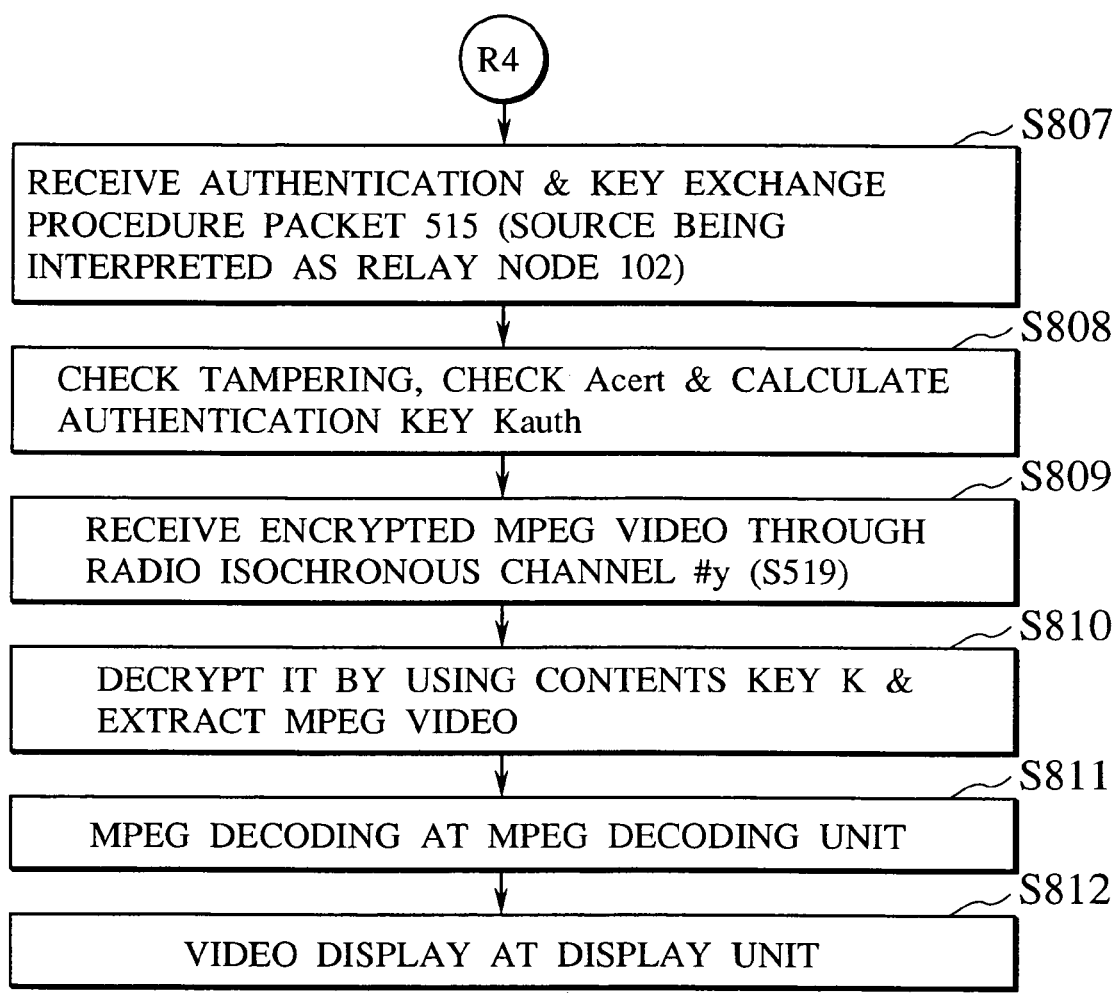
FIG. 13 is another flow chart showing an exemplary operation procedure of a radio node according to the first embodiment of the present invention.

Next, the actual operation sequence for the entire MPEG video transmission after applying the copy protection will be described with references to an exemplary overall sequence shown in FIGS. 5 and 6, an exemplary flow chart for the transmission node 101 shown in FIGS. 7 and 8, an exemplary flow chart for the relay node 102 shown in FIGS. 9, 10 and 11, and an exemplary flow chart for the radio node 103 shown in FIGS. 12 and 13.

First, the radio node 103 notifies the own configuration information to the relay node 102 (step S501). This notification may be carried out by providing an IEEE 1212 register within the radio node and registering the own configuration information therein. The configuration information indicates that the own node (radio node) has the MPEG decoding/display function, the authentication format (device certificate) for the authentication and key exchange purpose, etc. Here, the fact that this authentication format (device certificate) is a format defined by the specific copy protection organization, or the fact that it is the authentication format (device certificate) for the copy protection of the IEEE 1394, may also be notified at the same time.

Now, the authentication will be described briefly.

When contents (data) such as movies or TV programs for which the copyright should be taken into consideration are to be transferred on the network, these contents should be protected by the encryption, because the illegal copy would become possible if these data are eavesdropped on the network during data transfer. As a measure against the eavesdropping, the encryption of data to be transferred is effective.

Another problem is whether there is a possibility of transmitting data to someone untrustworthy. For example, even in the case of transmitting data in an encrypted form, data should not be transmitted in a form that enables the cryptoanalysis in the case where the destination node (which has a key for decrypting the encryption) is a malicious one (that has an intention to make the illegal copy). The authentication is the measure against this problem. Namely, it is a mechanism which verifies that the receiving side is someone who does not commit any illegal act, before giving a key for decrypting the encryption to the receiving side (and the key for decrypting the encryption is given only to the receiving side node for which the above fact is verified).

More specifically, data called "authentication format (device certificate)" are given in advance to those nodes (or sub-units) that are verified as "a node (or sub-unit) that does not commit any illegal act" by the authentication organization in advance. The fact that a node (or sub-unit) has this "authentication format (device certificate)" in a correct form implies that this node (or sub-unit) can be regarded as trustworthy (one that does not commit any illegal act). For this reason, the exchange of the authentication format (device certificate) is carried out between the transmitting and receiving nodes (or sub-units) prior to the above described data transfer, and the key for decrypting the encryption (or data that is a seed for generating the key) is notified only in the case where the authentication format (device certificate) is verified as being in a correct form, and data encrypted by using that key are transferred on the network.

Now, the radio node 103 is given such an authentication format (device certificate) from the authentication organization in advance, and has a "right to receive/playback encrypted data in appropriate form" Here, the authentication format (device certificate) possessed by the radio node 103 is assumed to be "Bcert".

Figure 5:
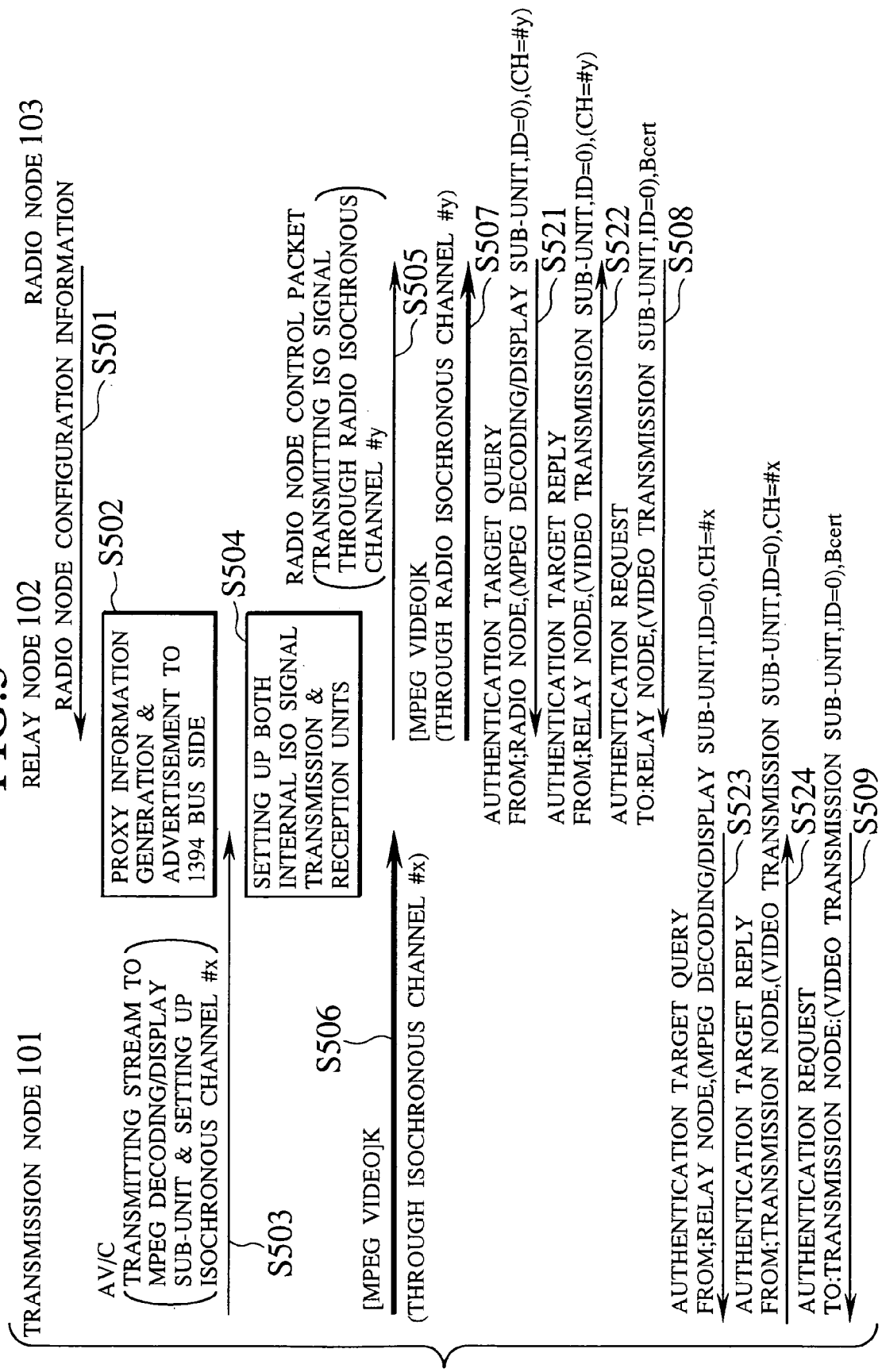
FIG. 5 is a sequence chart showing an exemplary overall sequence in the first embodiment of the present invention.
Figure 14:
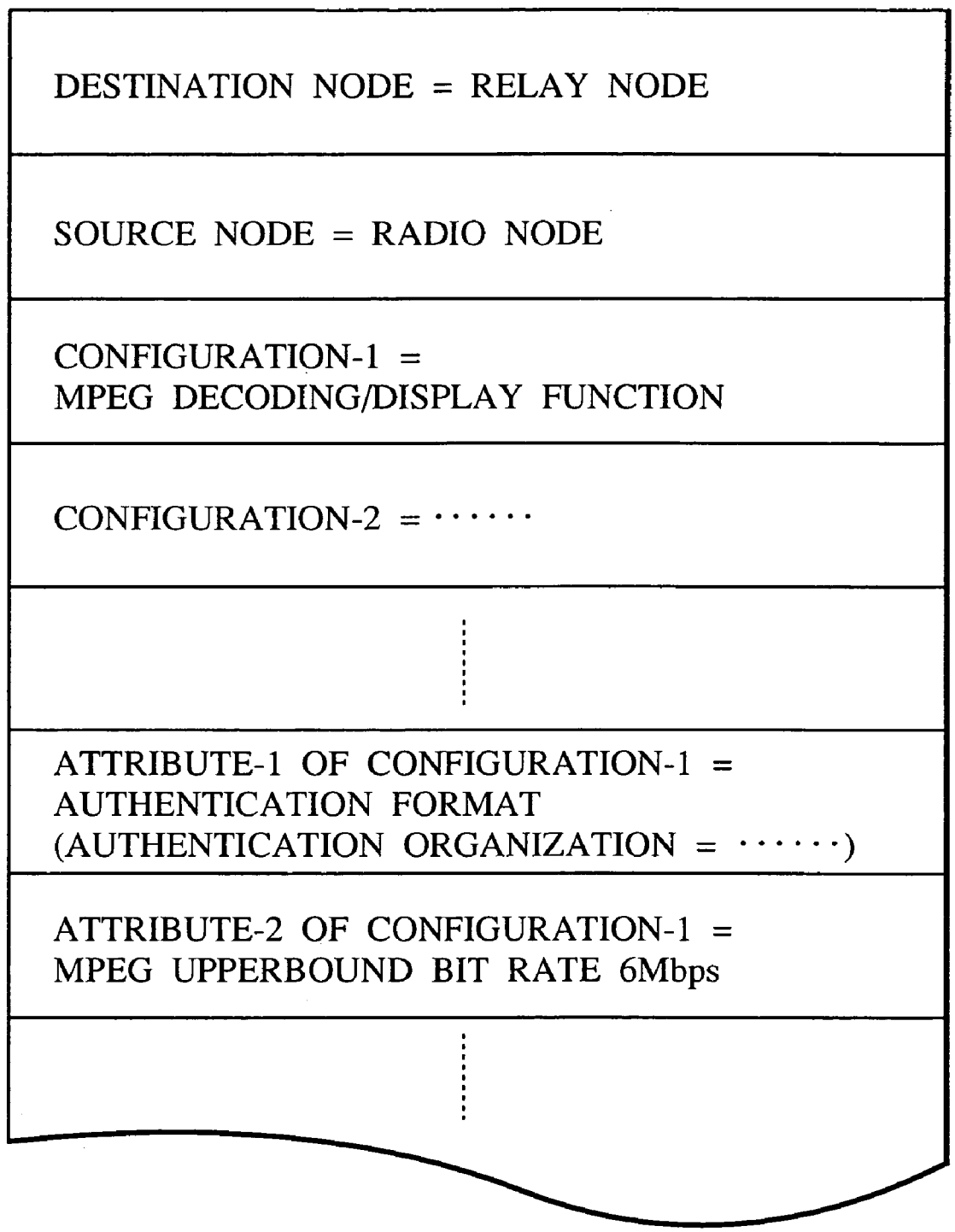
FIG. 14 is a diagram showing an exemplary format of a radio node configuration information packet used in the first embodiment of the present invention.

The radio node 103 may add the fact that the own node has the authentication format (device certificate), to the configuration information at a time of notifying the own configuration information at the step S501 of FIG. 5 (step S801). For example, as shown in FIG. 14, the configuration information may contain information that this radio node 103 has the MPEG decoding/display function, that this function has the authentication format (device certificate), that this authentication format (device certificate) is issued by so and so issuance organization, etc.

Note that, as a method by which the relay node 102 recognizes the configuration of the radio node 103, it is also possible to use a method in which the relay node 102 transmits a packet for inquiring the configuration to the radio node 103, and the radio node 103 responds to this query, instead of the above described method.

Now, the relay node 102 that received this configuration information checks that the radio node 103 has the authentication format (device certificate) and the MPEG decoding/display function (step S701).

In order to notify that the radio node 103 has the MPEG decoding/display function to a node on the IEEE 1394 bus side, the relay node 102 advertises this MPEG decoding/display function as the own sub-unit of the relay node 102 to the IEEE 1394 bus side (step S502). More specifically, the relay node 102 registers that "the own node has the MPEG decoding/display function" in the IEEE 1212 register, or returns a reply indicating that the own node has the MPEG decoding/display sub-unit upon receiving a query regarding the sub-unit configuration by the AV/C protocol (such that a node connected to the IEEE 1394 recognizes that this function exists in the relay node 102).

To this end, the relay node 102 has a proxy table 208 inside the proxy sub-unit configuration unit 207. The proxy table 208 is a table registering the correspondence between a form in which the relay node 102 is advertising as a proxy and its actual substance, as shown in FIGS. 15 and 16.

Figure 15:
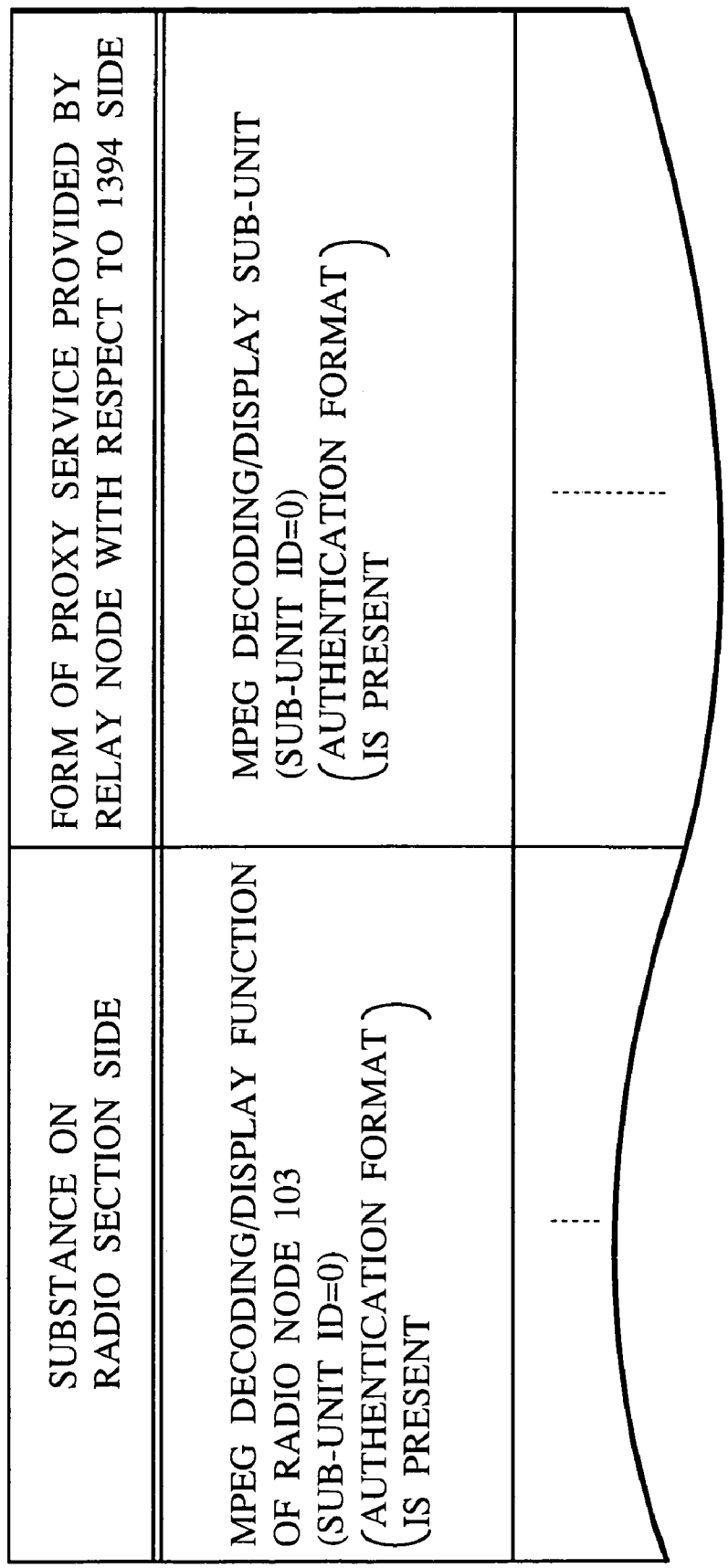
FIG. 15 is a diagram showing an exemplary form of a proxy table used in the first embodiment of the present invention.

Here, the MPEG decoding/display function of the radio node 103 is advertised as the sub-unit of the relay node, as shown in FIG. 15 (steps S702, S703).

Figure 17:
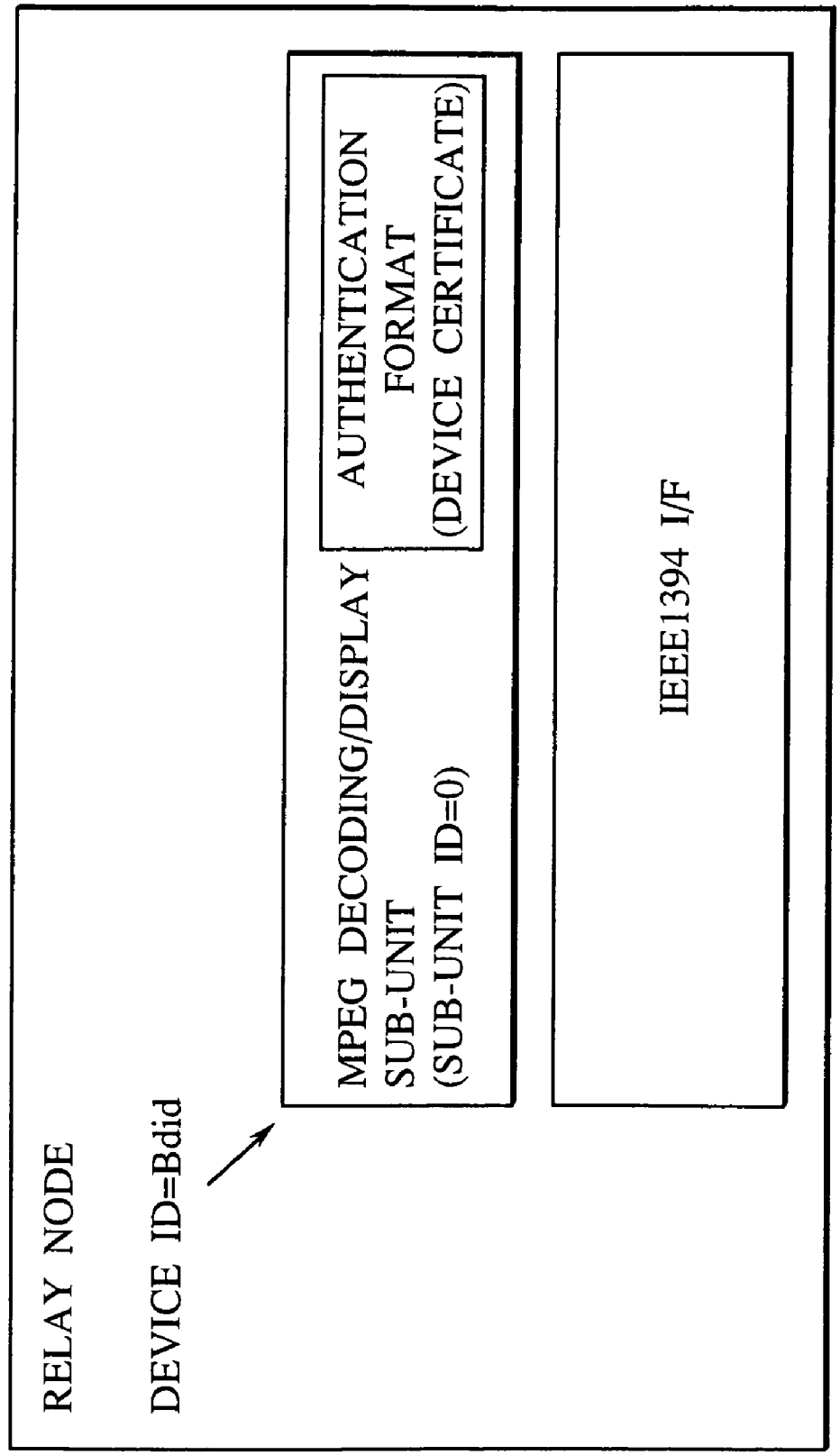
FIG. 17 is a diagram showing an internal configuration of a relay node as seen from a transmission node in the network of FIG. 1.

As a result, the structure of the relay node 102 as seen from the transmission node 101 appears as shown in FIG. 17 (step S601).

Figure 18:
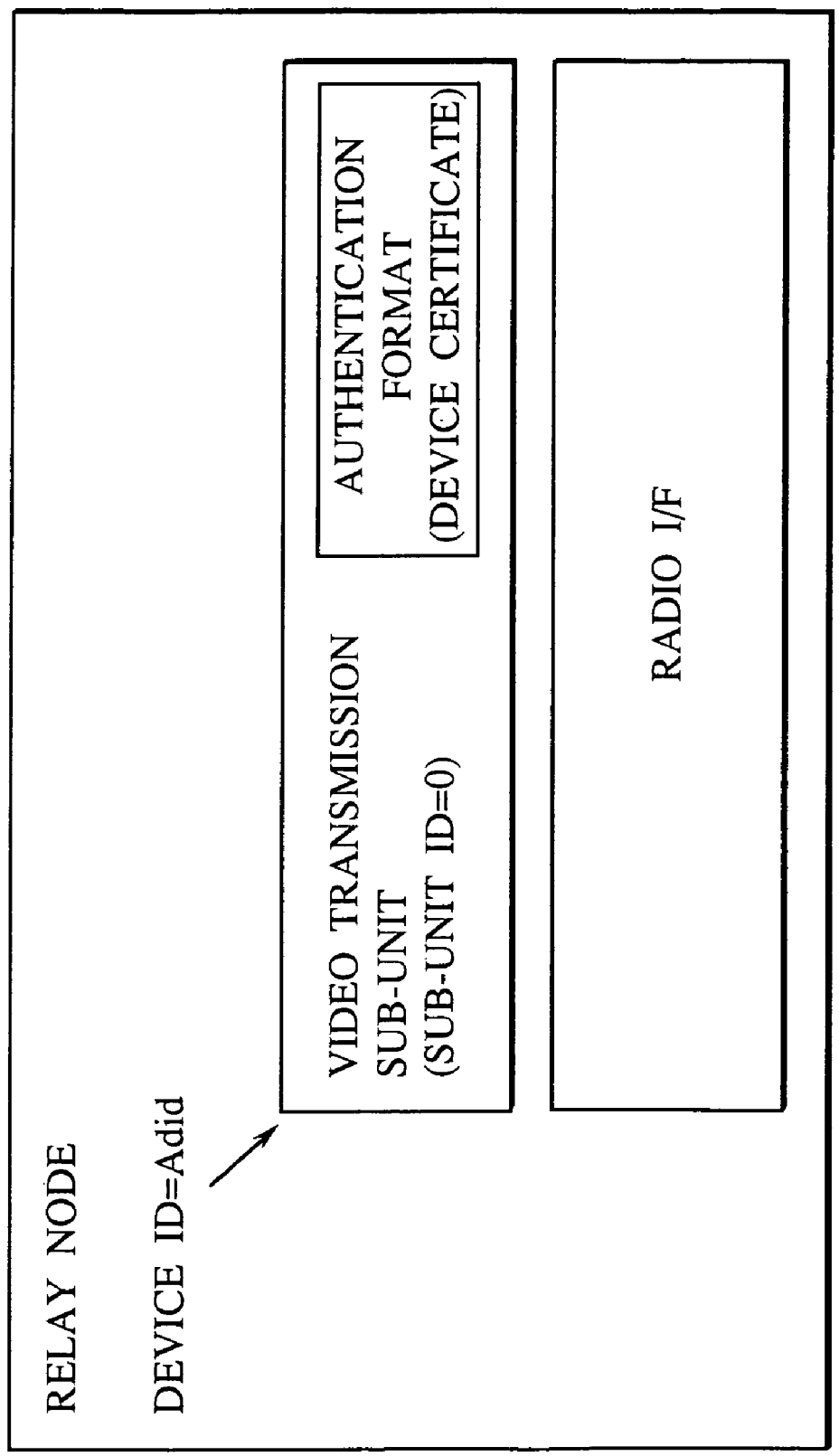
FIG. 18 is a diagram showing an internal configuration of a relay node as seen from a radio node in the network of FIG. 1.

The above description is directed to the IEEE 1394 bus side, but the same relationship also holds in the radio section. Namely, the relay node 102 surveys instruments, services, sub-unit configuration, etc. on the IEEE 1394 bus side and provides their proxy services with respect to the radio section side. As a result, the setting as shown in FIG. 16 is made and the structure of the relay node 102 as seen from the radio node appears as shown in FIG. 18.

Now, the transmission node 101 that recognized that there is an MPEG decoding/display sub-unit in the relay node 102 establishes an isochronous channel #x on the 1394 bus and issues a command of "connect (a plug (a plug in the AV/C as specified by the 1394 TA, for example) for receiving) this isochronous channel #x with the MPEG decoding/display sub-unit, and display the video" in the AV/C protocol (steps S503, S602), for the purpose of transferring the MPEG video to this sub-unit. The transmission node 101 interprets that this sub-unit exists in the relay node 102 so that the destination of the command is the relay node 102.

The relay node 102 that received this command (step S704) interprets the received command packet, recognizes that this command is a command with respect to the MPEG decoding/display sub-unit for which the proxy service is provided by the own node, refers to the proxy table 208, and recognizes that the substance to which this command is directed exists in the radio node 103 (step S705).

Consequently, in order to forward data received through the isochronous channel #x of the IEEE 1394 bus to the radio node side, the isochronous channel (#y) in the radio section is reserved (step S706), and the ISO signal transmission and reception unit 204 (that receives the isochronous channel #x) and the radio ISO signal transmission and reception unit 205 (that transmits the isochronous channel #y) are connected, such that the input data (ISO data) entered from the 1394 interface 201 can be forwarded to the radio section (steps S504, S707).

In addition, a command "data will be transmitted through the radio isochronous channel #y so that receive them, enter them into an MPEG decoder, and display the decoding result on a display" is transmitted to the radio node 103 in a form of a radio node control packet (steps S505, S708).

Figure 19:
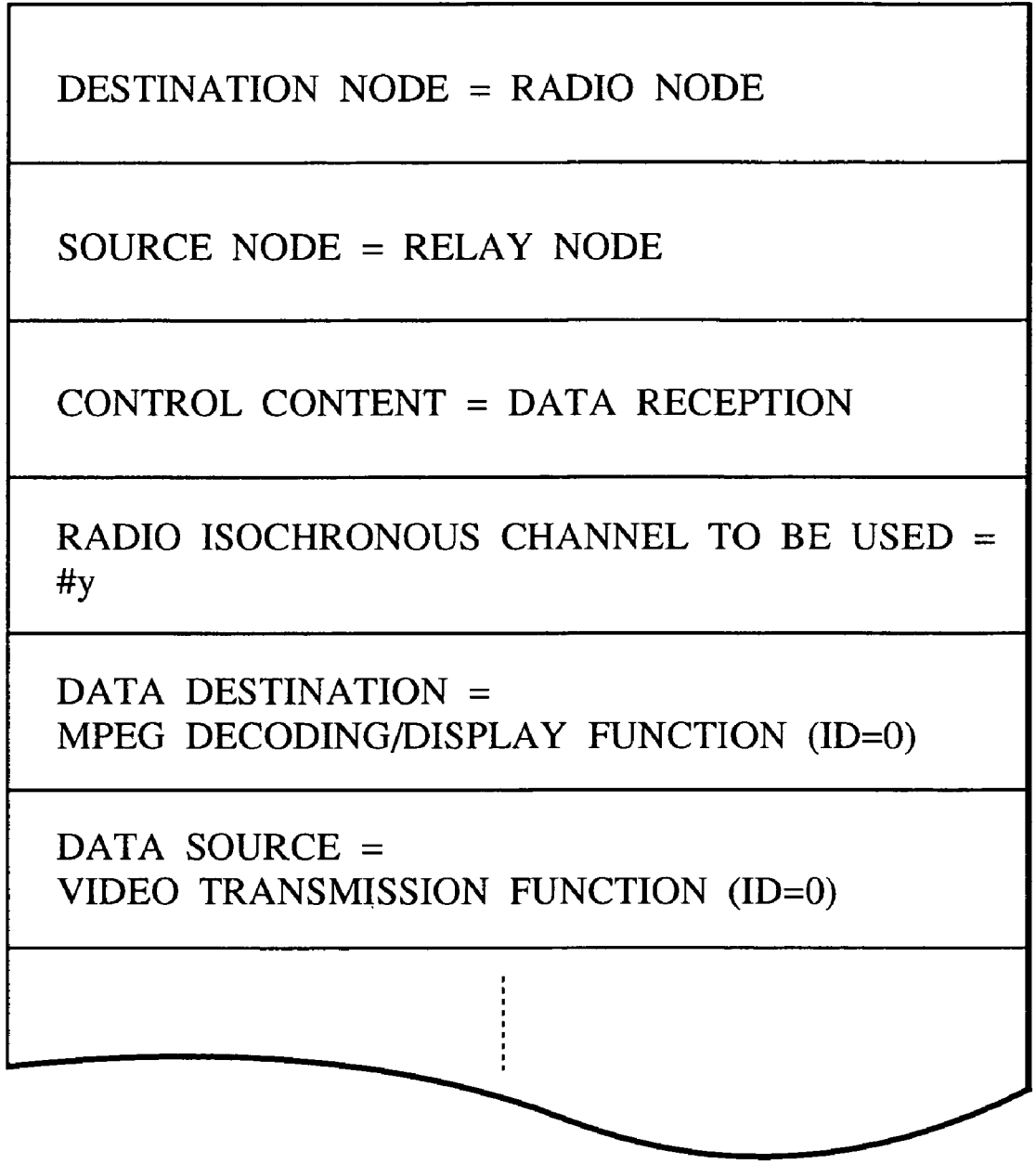
FIG. 19 is a diagram showing an exemplary format of a radio node control packet used in the first embodiment of the present invention.

FIG. 19 shows an exemplary format of this radio node control packet.

As shown in FIG. 19, this packet has a content that urges the radio node 103 to transfer data (MPEG video) received through the radio isochronous channel #y to the MPEG decoding/display function and display them. In addition, information regarding the sub-unit (the video transmission function of the relay node 102; actually, it advertises as having this function as a proxy for the transmission node 101) that transmits this data (MPEG video) is also notified in this packet. (That is, the source of the data is notified in this packet.)

The radio node 103 that received this packet recognizes that data will be transmitted through the radio isochronous channel #y (step S802). The radio node 103 recognizes the source of these data as the video transmission sub-unit of the relay node 102 (actually, the data source is the transmission node 101, as mentioned above). For this reason, information indicating that "the source of data transmitted through this radio isochronous channel is the video transmission sub-unit of the relay node 102" may also be included in this radio node control packet.

After that, the transmission node 101 transfers the encrypted MPEG video through the isochronous channel #x (steps S603, S506). The relay node 102 that received these data forwards them to the radio section, as has been set up previously (steps 709, S507).

The relay node 102 can recognize that received data are encrypted data when the encrypted MPEG video data are received at the step S506, but it recognizes that there is a need to transfer them to the radio network side so that it forwards them as they are. It may also memorize the fact that the authentication and key exchange procedure is necessary later on.

In this way, the encrypted MPEG video reaches to the radio node 103 (step S803). This MPEG video may contain a node ID of the relay node 102 as the source address. For this reason, the radio node 103 can recognize that this MPEG video has arrived from the relay node 102, but as the radio node 103 does not have the key K for decrypting the encryption (or data that is a seed for generating that key) at this point, it cannot decrypt the encryption and take out the original MPEG video in this state. At this point, the radio node 103 recognizes that the authentication procedure with the source of the MPEG video is necessary.

Consequently, (the copy protection processing unit 303 of) the radio node 103 transmits the authentication request to the source of the encrypted data. As already mentioned above, the radio node 103 recognizes (a sub-unit with a sub-unit type=video transmission sub-unit and a sub-unit ID=b (where b=0) within) the relay node 102 as the source of the encrypted data.

Also, as in S521 of FIG. 5, a query "A sub-unit with the sub-unit type=MPEG decoding/display sub-unit and the sub-unit ID=c (where c=0) is receiving the radio isochronous channel #y at the radio node. Which sub-unit is transmitting the encrypted data to the radio isochronous channel #y?" may be transmitted to the relay node 102. In response, the relay node 102 returns a reply "A sub-unit ID=0 of the video transmission sub-unit is transmitting to the radio isochronous channel #y" (steps S522, S731, S831). In this way, the radio node 103 can recognize that the target of the authentication is the video transmission sub-unit of the relay node 102.

In this way, the destination of the authentication request is recognized and the authentication request is transmitted to (a sub-unit ID=0 of the video transmission sub-unit within) the relay node 102. In this transmission, the destination of the authentication request packet may be set as "(a sub-unit ID=0 of) the video transmission sub-unit of the relay node", or information indicating "(a sub-unit ID=0 of) the video transmission sub-unit" may be entered at arbitrary position in the authentication request packet so as to explicitly indicate that the authentication request target is (a sub-unit ID=0 of) the video transmission sub-unit. In the former case, it implies that the authentication and key exchange procedure is contained in each sub-unit of the relay node. In the latter case, it implies that a specific processing unit provided in the relay node carries out the authentication and key exchange for all sub-units collectively.

At that point, the authentication format (device certificate) Bcert of the radio node 103 is attached to the authentication request (step S804, S508). This Bcert may be the authentication format (device certificate) of the MPEG decoding/display sub-unit of the radio node 103. Note that the copy protection processing unit may provide the authentication format (device certificate) for each sub-unit ID instead of that for each sub-unit (each sub-unit type).

The relay node 102 that received the authentication-request (step S710) refers to the proxy table 208 and recognizes that the request target of this authentication request is actually (a sub-unit ID=a (where a=0) of the video transmission sub-unit of) the transmission node 101.

The relay node 102 may transmit a query "A sub-unit ID=0 of the MPEG decoding/display sub-unit is receiving the isochronous channel #x at the relay node. Which sub-unit of the transmission node is transmitting the encrypted data to the isochronous channel #x?" to the transmission node 101 (steps S525, S631, S732). In response, the transmission node 101 returns a reply "A sub-unit ID=0 of the video transmission sub-unit is transmitting to the isochronous channel #x" (steps S524, S631, S732).

In this way, when the partner of the authentication request is recognized, the authentication request received at the step S508 is forwarded to the transmission node 101 without changing its content (by leaving Bcert, etc. unchanged). Namely, the relay node can transparently transfers the destination address, the authentication format (device certificate) of sub-units other than the sub-unit that is the destination of the authentication request, etc.

At a time of transferring the authentication request, the destination of the authentication request packet may be set as (a sub-unit ID=0 of) the video transmission sub-unit, or information indicating that sub-unit may be entered at arbitrary position in the authentication request packet so as to explicitly indicate that the authentication request target is that sub-unit, as mentioned above.

Here, by forwarding the authentication request without changing its content, the authentication request reaches to the transmission node 101 in its original form, so that the actual authentication procedure will proceed between the transmission node 101 and the radio node 103, and moreover it is possible to carry out the above procedure without revealing information such as the value of the key that becomes apparent as a result of the authentication, with respect to the other nodes including the relay node 102.

The transmission node 101 that received the authentication request interprets this as the authentication request that comes from the MPEG decoding/display sub-unit of the relay node 102 (step S604). Then, an ID (Bdid) for identifying the MPEG decoding/display sub-unit of the radio node 103 is extracted from Bcert (step S605), and using this, the similar authentication request is attempted with respect to the source of the authentication request. However, the transmission node 101 is not aware that Bcert is the authentication format (device certificate) of the radio node 103 and regards it rather as the authentication format (device certificate) of (the MPEG decoding/display sub-unit of) the relay node 102.

This authentication request contains the authentication format (device certificate) Acert of (the video transmission sub-unit) of the transmission node 101 and Bdid. Here, the transmission node 101 interprets (the MPEG decoding/display sub-unit of) the relay node 102 as the source of the authentication request (step S509), so that the relay node 102 also becomes the destination of this authentication request (steps S606, S510).

The relay node 102 that received this (step S712) refers to the proxy table 208, recognizes that the actual request target of this authentication procedure is (the MPEG decoding/display function of) the radio node 103, and forwards this authentication request to the radio node 103 without changing its content (by leaving Acert, etc. unchanged) (steps S511, S713). The source of this authentication request is the relay node 102.

The radio node 103 that received this interprets that it is the authentication request that comes from the video transmission sub-unit of the relay node 102 (step S805). Then, an ID (Adid) for identifying the video transmission sub-unit of the transmission node 101 is extracted from Acert, and the remaining procedure necessary for the exchange of the authentication key is attempted with respect to the source of the authentication request. Note that, in this case, the radio node 103 is not aware that Acert is the authentication format (device certificate) of the transmission node 101, and regards it rather as the authentication format (device certificate) of (the video transmission sub-unit of) the relay node 102.

As the remaining procedure necessary for the exchange of the authentication key, the radio node 103 transmits a authentication and key exchange procedure packet to (a node that is interpreted by the radio node as) the source of the authentication request. In this authentication and key exchange procedure packet, a key exchange initial value, a signature, a device ID (Adid) of (the vide transmission sub-unit of) the transmission node that was contained in Acert, etc., are contained (step S806). Here, the radio node 103 is interpreting (the video transmission sub-unit of) the relay node 102 as the source of the authentication request (step S511) so that the relay node 102 also becomes the destination of this authentication request.

The relay node 102 that received this refers to the proxy table 208, recognizes that the actual request target of this authentication procedure is (the video transmission sub-unit of) the transmission node 101, and forwards this authentication procedure packet to the transmission node 101 without changing its content (steps S513, S714). The source of this packet is the relay node 102.

The procedure similar to this is also carried out along the direction of transmission node 101→relay node 102→radio node 103 (steps S514, S515, S609, S715, S807).

Each of the transmission node 101 and the radio node 103 that received this authentication procedure packet carries out the tampering check as to whether or not the received packet has been altered, the check as to whether or not the authentication format (device certificate) sent from the partner is a correct one, etc., and derives the common authentication key Kauth using the given value. This common authentication key Kauth is a key to be shared between (the video transmission sub-unit of) the transmission node and (the MPEG decoding/display function of) the radio node, and it becomes possible to share this key Kauth without revealing it to anyone other than these two (the transmission node 101 and the radio node 103) at this point (steps S607, S608, S808).

Using this authentication key Kauth, it becomes possible to calculate the contents key K for actually carrying out the MPEG stream encryption. The detailed procedure for this calculation will be omitted here, but it may be made such that the calculation of the contents key K becomes possible by separately sending a value of the exchange key or the seed from the transmission node 101 to the radio node 103 as in the copy protection scheme (5C scheme) of the IEEE 1394 (steps S518, S519).

In this way, the value of the contents key K can be shared between (the video transmission sub-unit of) the transmission node 101 and (the MPEG decoding/display function of) the radio node 103.

The transmission node 101 encrypts the MPEG video to be transmitted by using the contents key K at the encryption unit 405 (step S610), and transmits this to (the MPEG decoding/display sub-unit of) the relay node 102 through the isochronous channel #x of the 1394 bus (steps S516, S611).

The relay node 102 transmits the encrypted MPEG video that is transmitted from the transmission node 101 through the isochronous channel #x to the radio isochronous channel #y, from the ISO signal transmission and reception unit 204 through the radio ISO signal transmission and reception unit 205 (steps S517, S716).

The radio node 103 that received this decrypts the encrypted MPEG video by using the value of the contents key K (step S809, S810). The decrypted MPEG video data are then decoded by the MPEG decoding unit 306 (step S811) and decoded data are playbacked at the display unit 307 (step S812).

In this way, even in the interconnected environment where the proxy node exists between the 1394 bus and the radio network, it is possible to carry out the authentication procedure and the key exchange procedure between nodes (the transmission node 101 and the radio node 103 in this embodiment) end-to-end, and moreover it is devised such that its content cannot be known by the other nodes including the relay node 102. Also, in the transfer of data that require the contents protection such as the actual MPEG video, etc., data are encrypted throughout the entire route so that the copying is impossible and therefore the safe data transfer is possible. As a result, it becomes possible to carry out the data transfer that accounts for the copy protection even in such an interconnected environment.

Note that, in this embodiment, the authentication procedure, the encryption key exchange procedure, etc. are carried out in units of sub-units of the nodes, but it is also possible to carry out these in units of radio nodes. An example for carrying out these in units of nodes will be described in the second embodiment which can be applied to this embodiment as well.

Also, in this embodiment, the procedure for the authentication and the key exchange is carried out after receiving the encrypted data, but this procedure may be carried out prior to the encrypted data receiving. For example, this procedure may be carried out at a time of activation of the device or corresponding application.

Second Embodiment

Referring now to FIG. 20 to FIG. 39, the second embodiment of a relay device and a communication device according to the present invention will be described in detail.

In the first embodiment, the authentication procedure and the key exchange procedure are directly carried out by the transmission node and the radio node. Namely, (the video transmission sub-unit of) the transmission node and (the MPEG decoding/display function of) the radio node directly carry out the mutual authentication, the encryption key exchange procedure and the encrypted data exchange. In this case, the relay node functions as a proxy of the MPEG decoding/display function of the radio node with respect to the transmission node, and as a proxy of the video transmission sub-unit of the transmission node with respect to the radio node, but in the above described authentication procedure and encrypted data exchange, the relay node simply forwards these data to a sub-unit or a function for which it is functioning as a proxy.

In contrast, in the second embodiment, an exemplary case of terminating the series of copy protection procedure, that is, the authentication procedure and the encrypted data exchange, at the relay node will be described. Namely, each copy protection procedure is closed between the transmission node and the relay node, and between the relay node and the radio node. In other words, the relay node of this embodiment also provides the proxy services with respect to the transmission node or the radio node, but for the copy protection, the relay node itself has the authentication format (device certificate) and the relay node itself terminates a responsibility for the encrypted MPEG data transfer in the 1394 bus section as well as the encrypted MPEG data transfer in the radio section.

Figure 20:
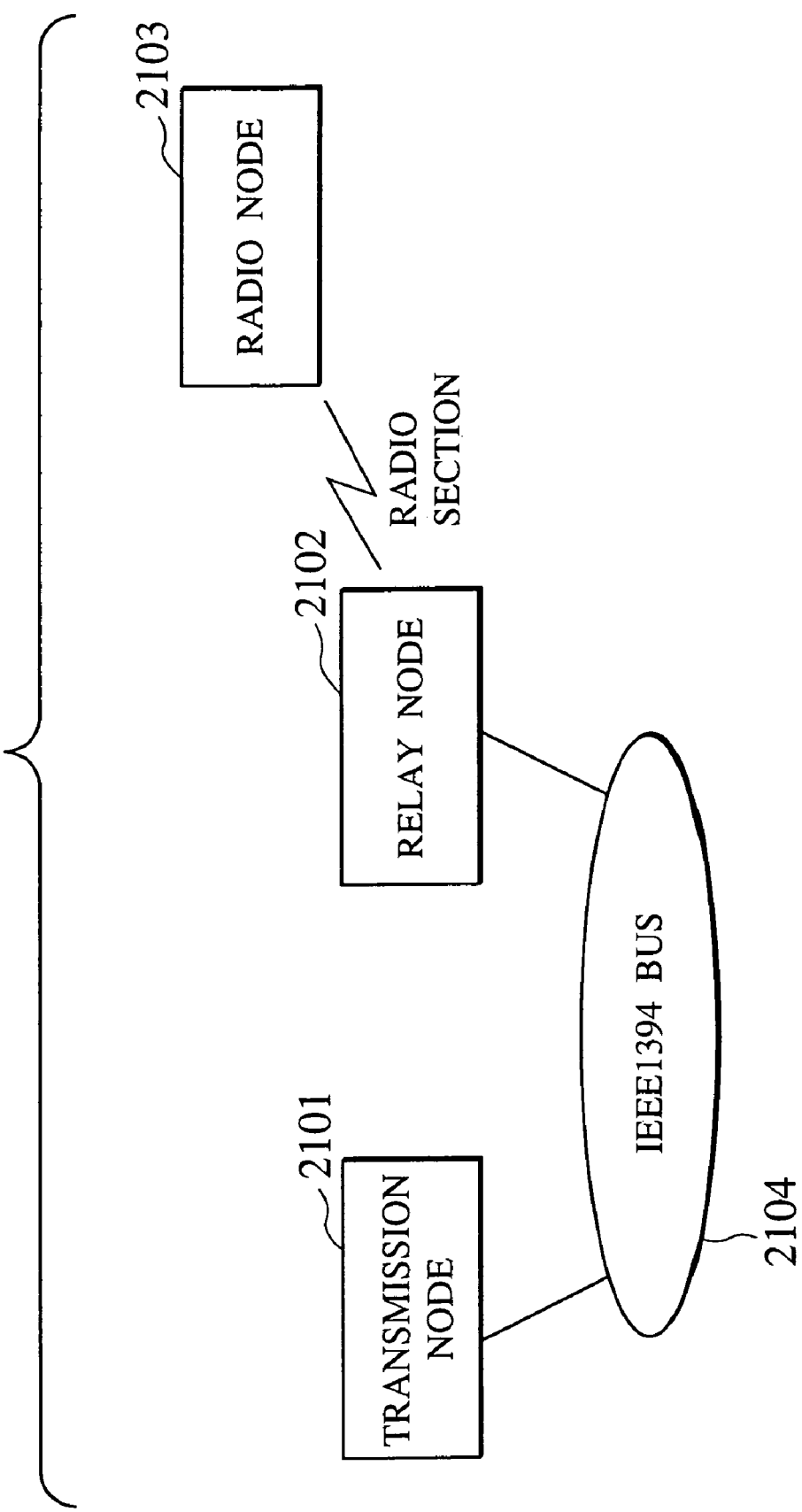
FIG. 20 is a schematic diagram showing an exemplary overall configuration of a network according to the second embodiment of the present invention.

FIG. 20 shows an exemplary overall configuration of a home network at some home, which is basically the same as in the first embodiment.

Figure 21:
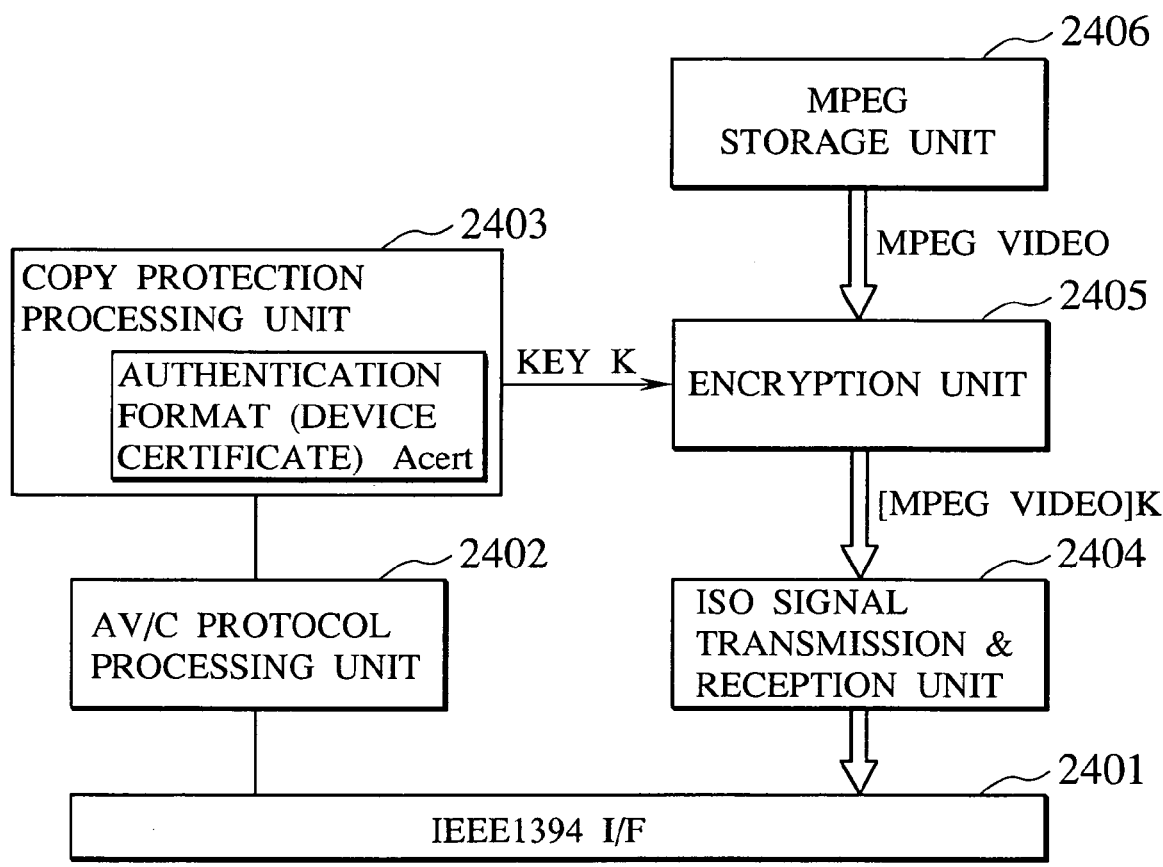
FIG. 21 is a block diagram showing an exemplary internal configuration of a transmission node in the network of FIG. 20.

FIG. 21 shows an exemplary internal configuration of the transmission node 2101, which is also basically the same as in the first embodiment.

Figure 22:
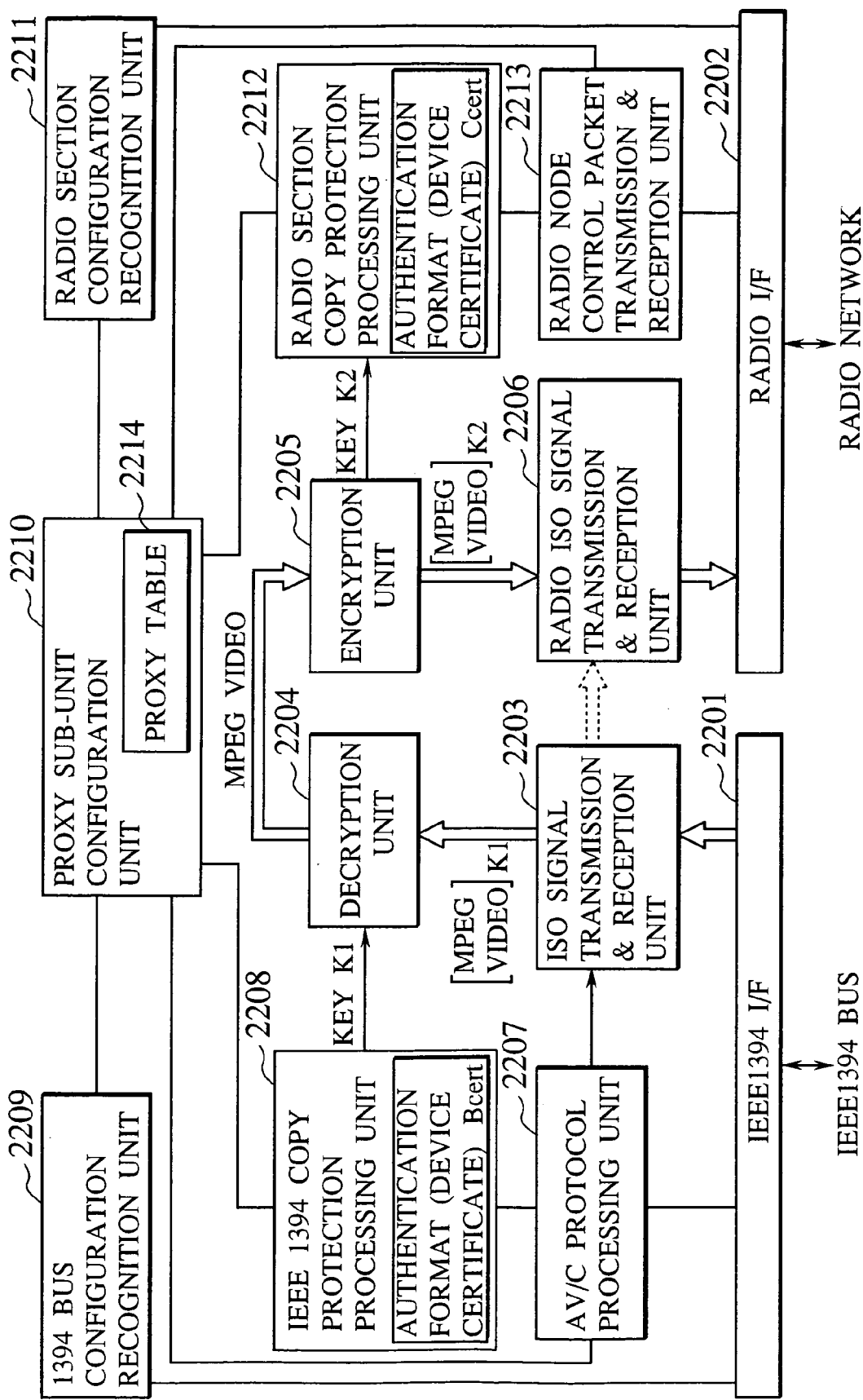
FIG. 22 is a block diagram showing an exemplary internal configuration of a relay node in the network of FIG. 20.

FIG. 22 shows an exemplary internal configuration of the relay node 2102. Similarly as in the first embodiment, the relay node 2102 has a function for providing functions of the radio node as a proxy server of the radio node with respect to a node on the IEEE 1394 bus side, and a function for providing functions of a node on the IEEE 1394 bus side as a proxy server of a node (the transmission node 2101 in this embodiment) on the IEEE 1394 bus side with respect to a node on the radio section side.

Also, the relay node 2102 has a function for forwarding data (MPEG video data) received from the IEEE 1394 bus side to the radio section side, but the relay node 2102 of the second embodiment differs from that of the first embodiment in that the procedure related to the copy protection such as authentication and data encryption, etc., is terminated at the relay node 2102 both in the IEEE 1394 bus section and in the radio section, an IEEE 1394 copy protection processing unit 2208 has the authentication format (device certificate) Bcert for the IEEE 1394 bus side, a radio section copy protection processing unit 2212 has the authentication format (device certificate) Ccert for the radio section side, and the encrypted data entered from the isochronous channel of the 1394 bus are processed by the sequence of reception at the ISO signal transmission reception unit 2203→decryption at the decryption unit 2204→re-encryption of the decrypted MPEG video at the encryption unit 2205→transmission as the radio isochronous signals at the radio ISO signal transmission and reception unit 2206.

The authentication format (device certificate) may be provided one for each IEEE 1394 interface or each radio section interface, or one for each sub-unit (including proxy) (for each sub-unit type).

Here, it is assumed that Acert and Bcert are the authentication formats (device certificates) that were issued by the same authentication organization (the authentication organization responsible for the IEEE 1394 copy protection), but the authentication formats (device certificates) of the radio section (Ccert and Dcert to be described below) may or may not be issued by the same authentication organization, so that the authentication formats (device certificates) issued by a different authentication organization that is responsible for the radio section may be used.

Figure 23:
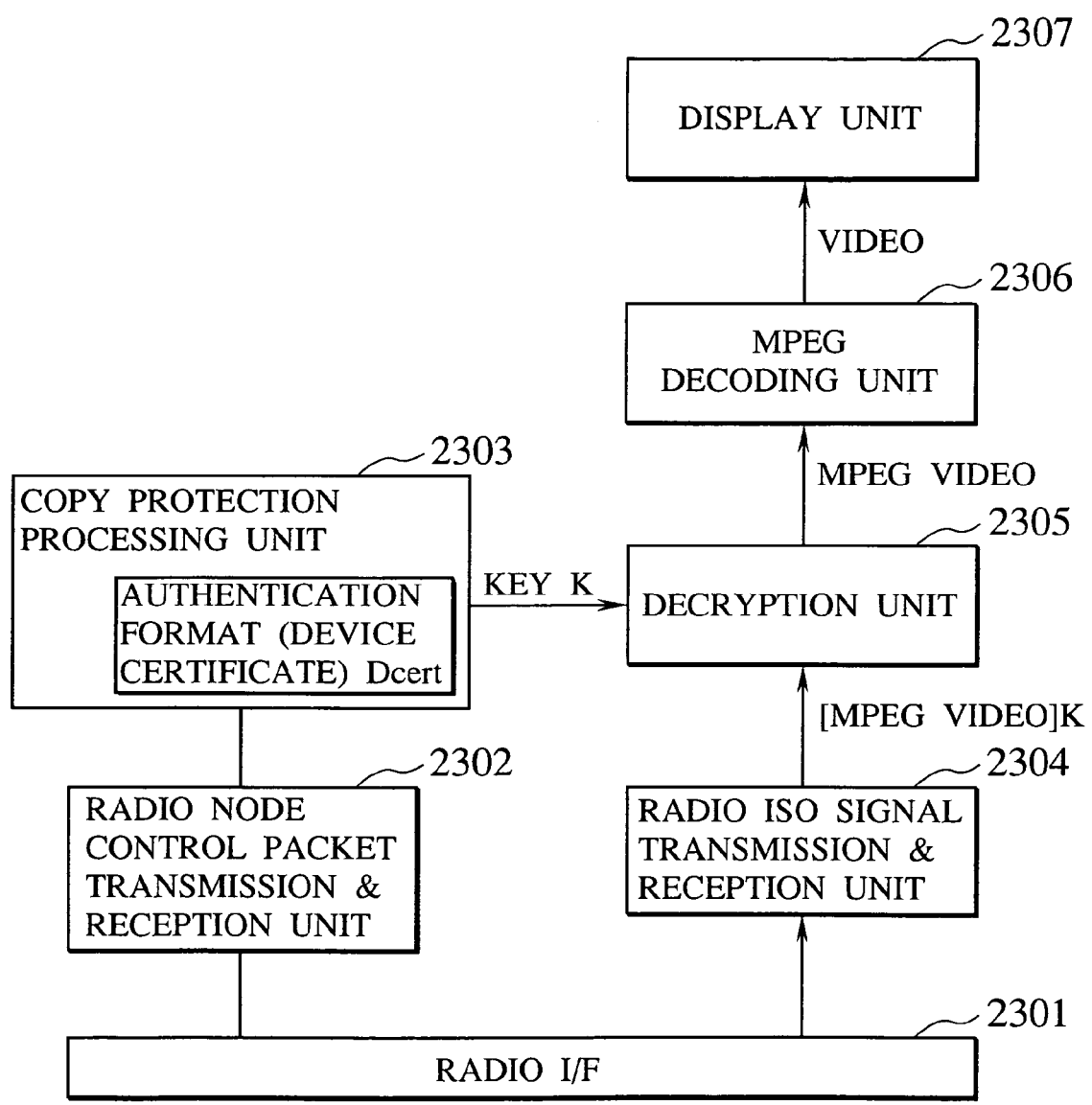
FIG. 23 is a block diagram showing an exemplary internal configuration of a radio node in the network of FIG. 20.

Next, FIG. 23 shows an exemplary internal configuration of the radio node 2103, which is basically the same as that of the first embodiment except that a copy protection processing unit 2303 has the authentication format (device certificate) Dcert for the radio section.

Figure 24:
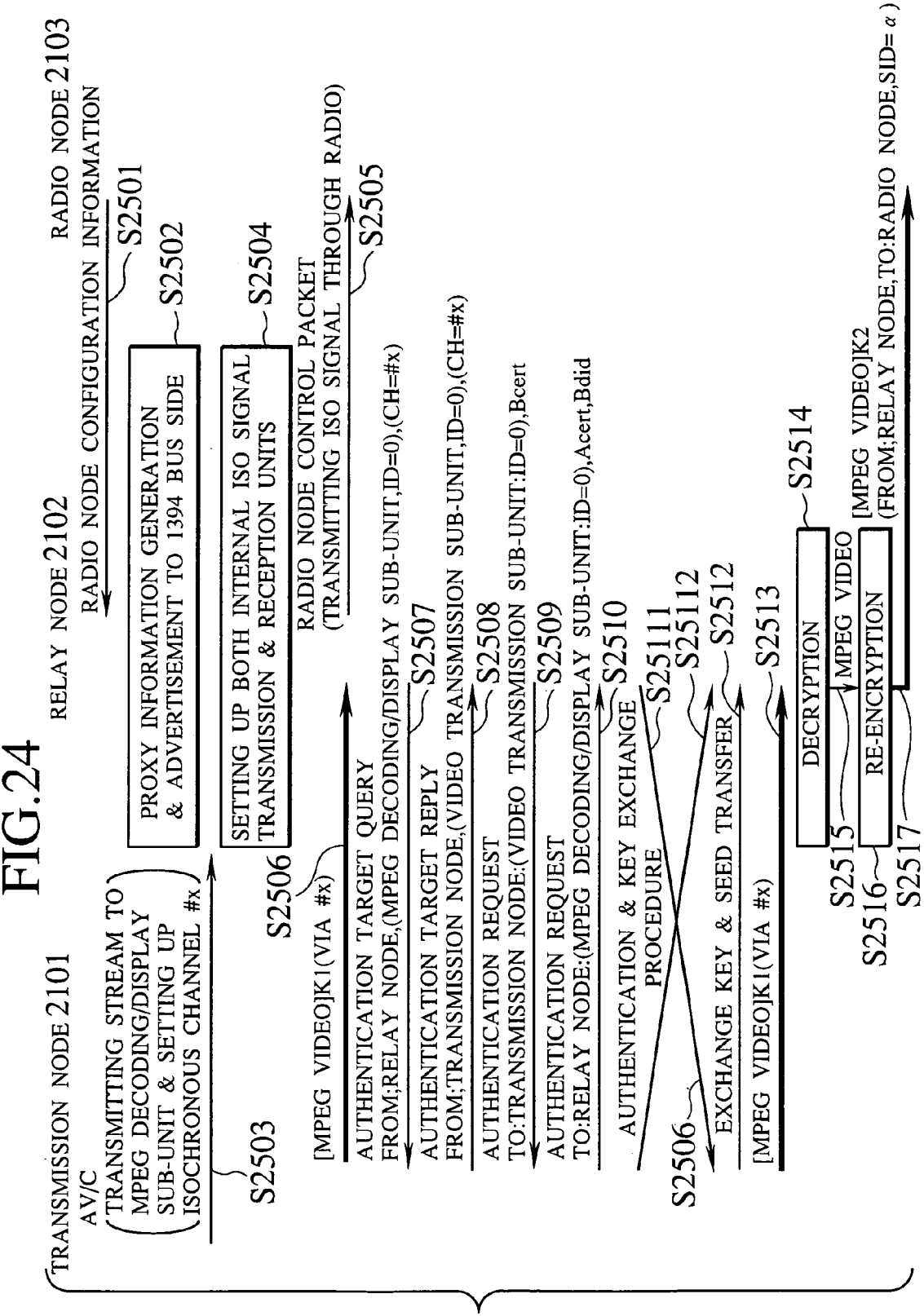
FIG. 24 is a sequence chart showing an exemplary overall sequence in the second embodiment of the present invention.
Figure 25:
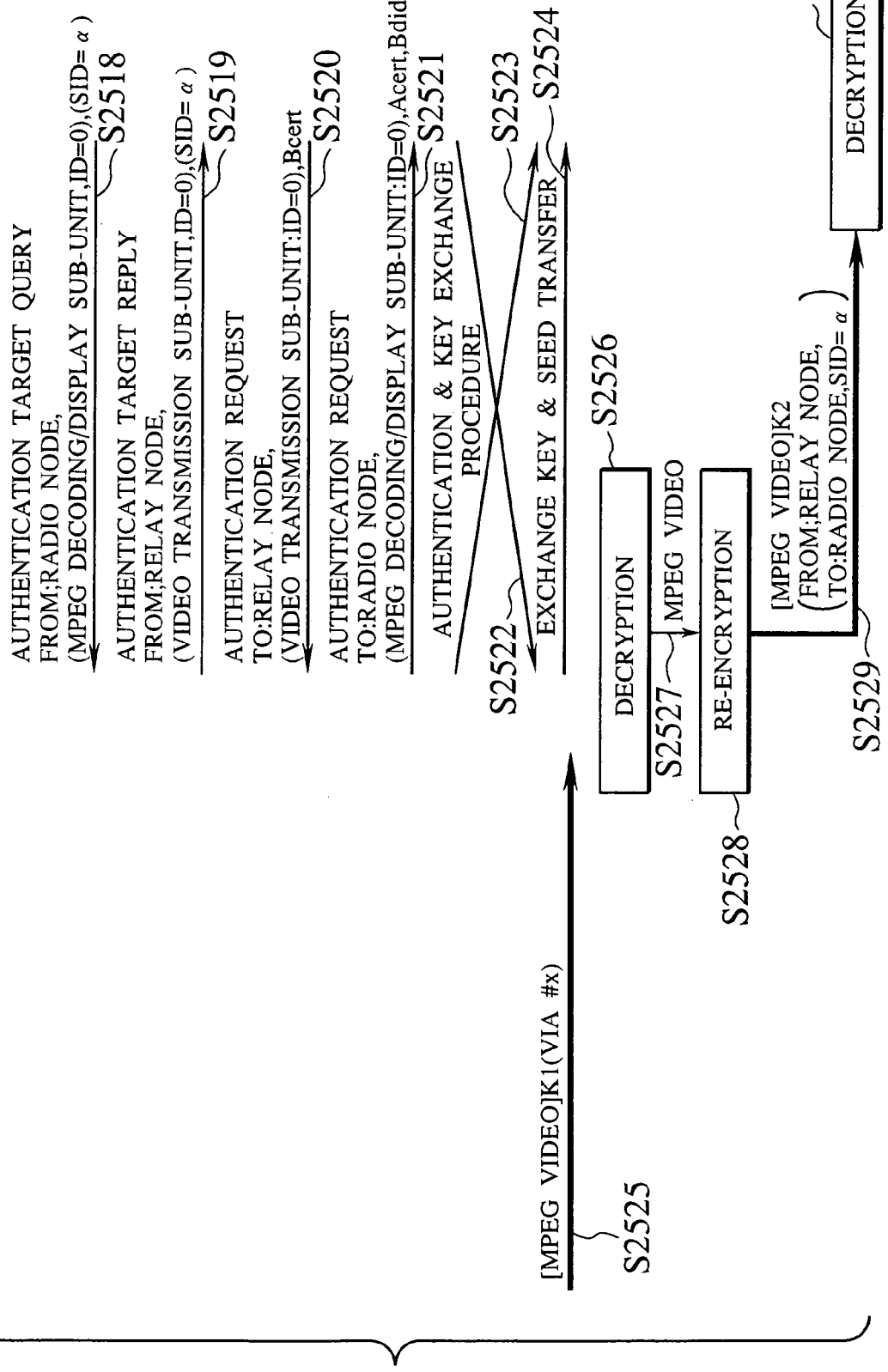
FIG. 25 is another sequence chart showing an exemplary overall sequence in the second embodiment of the present invention.
Figure 26:
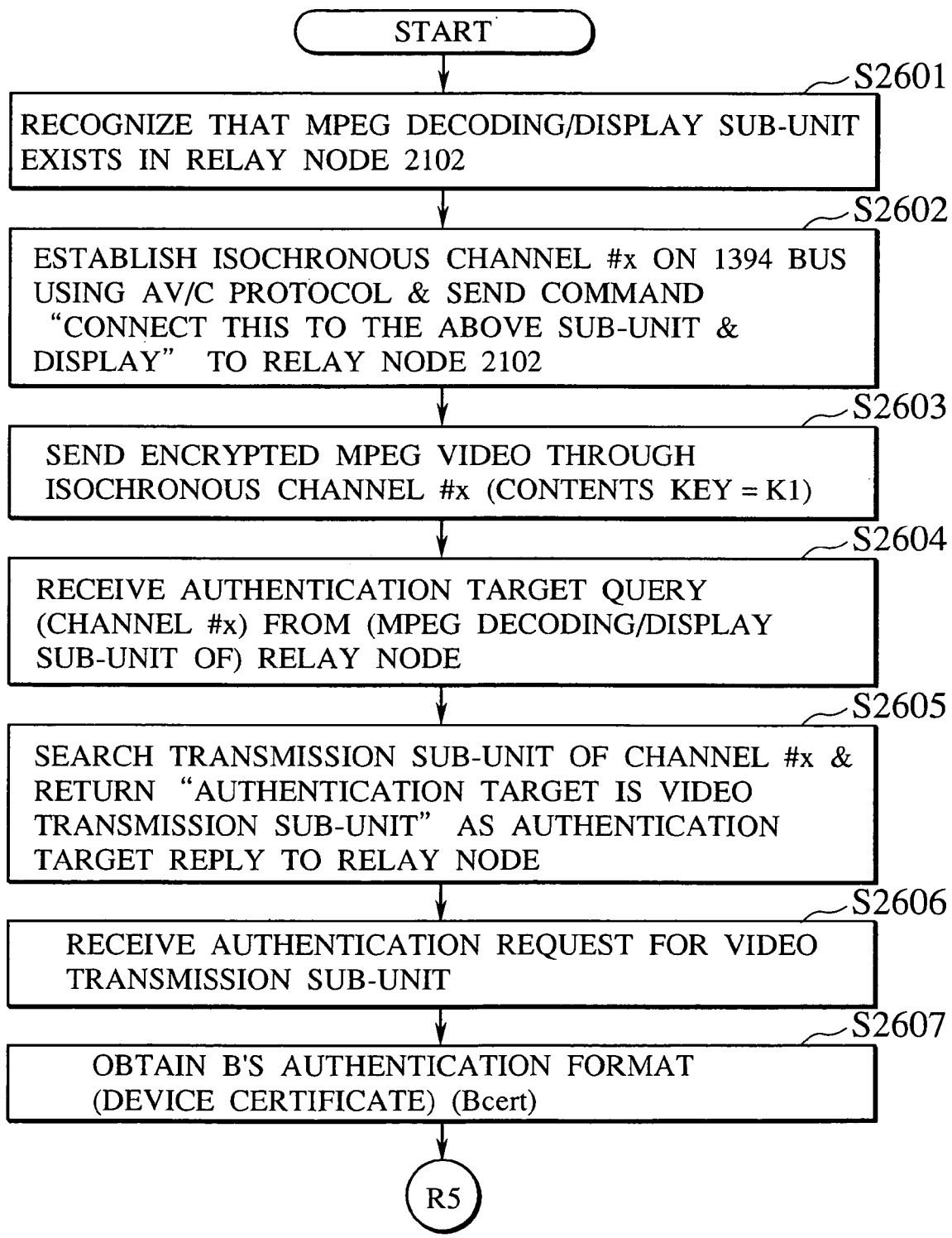
FIG. 26 is a flow chart showing an exemplary operation procedure of a transmission node according to the second embodiment of the present invention.
Figure 27:
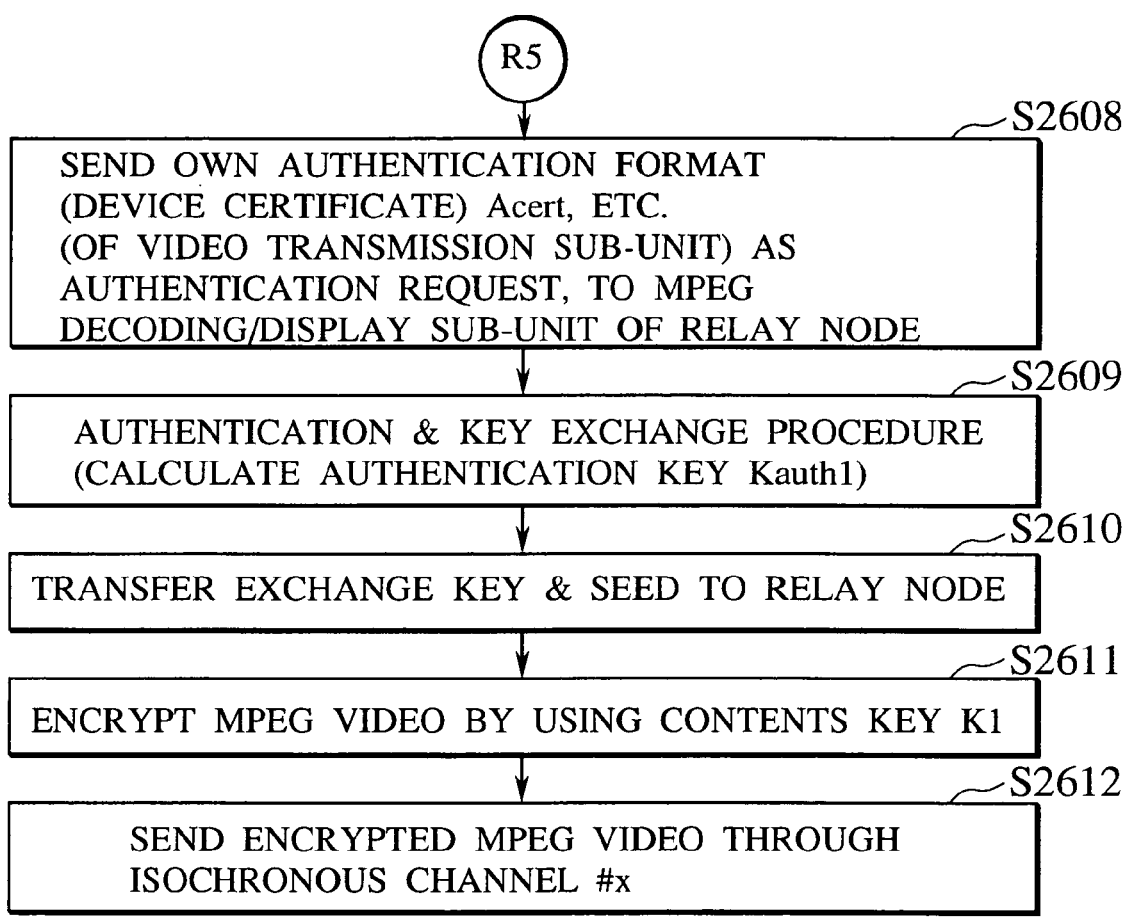
FIG. 27 is another flow chart showing an exemplary operation procedure of a transmission node according to the second embodiment of the present invention.
Figure 28:
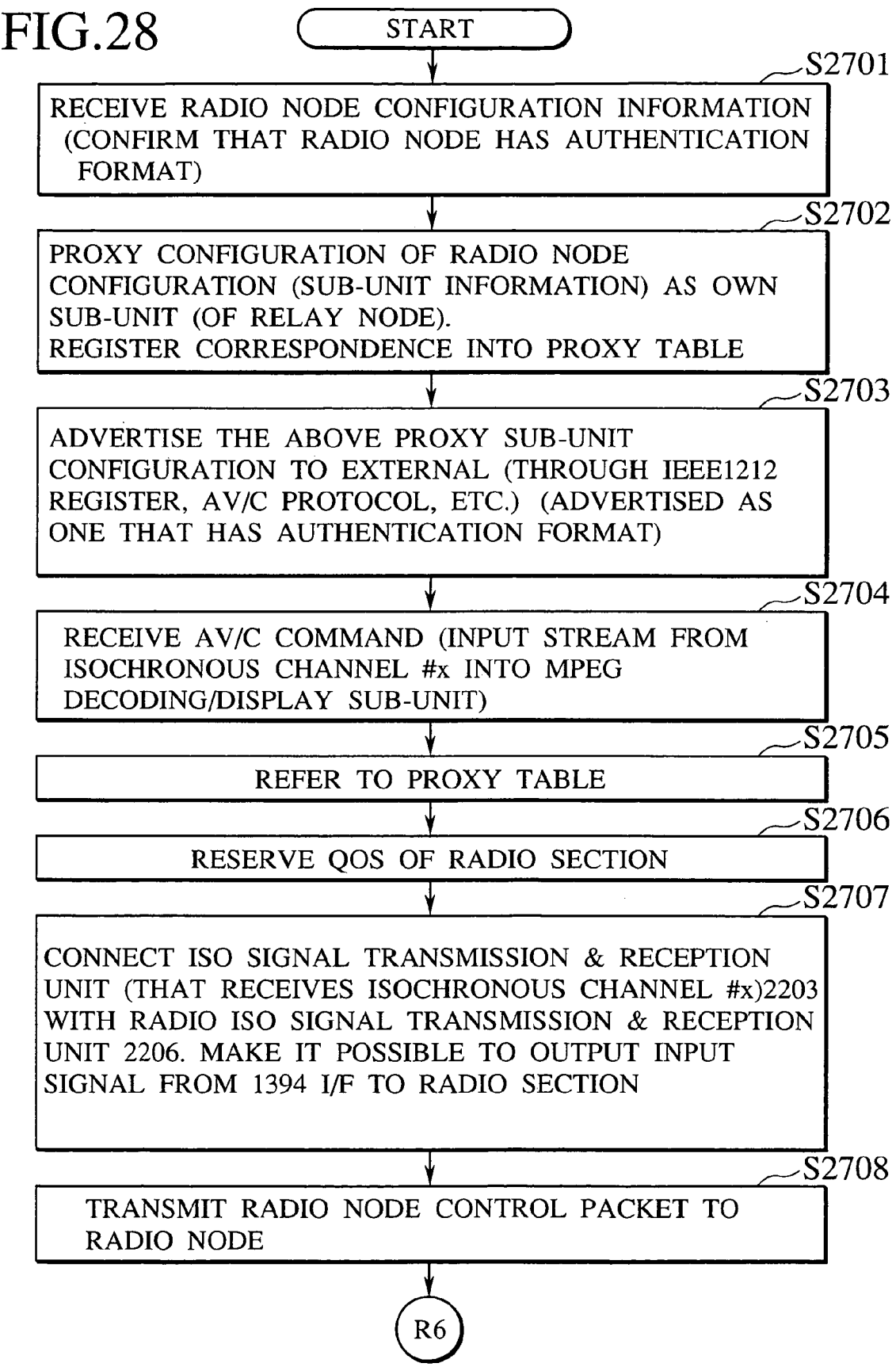
FIG. 28 is a flow chart showing an exemplary operation procedure of a relay node according to the second embodiment of the present invention.
Figure 29:
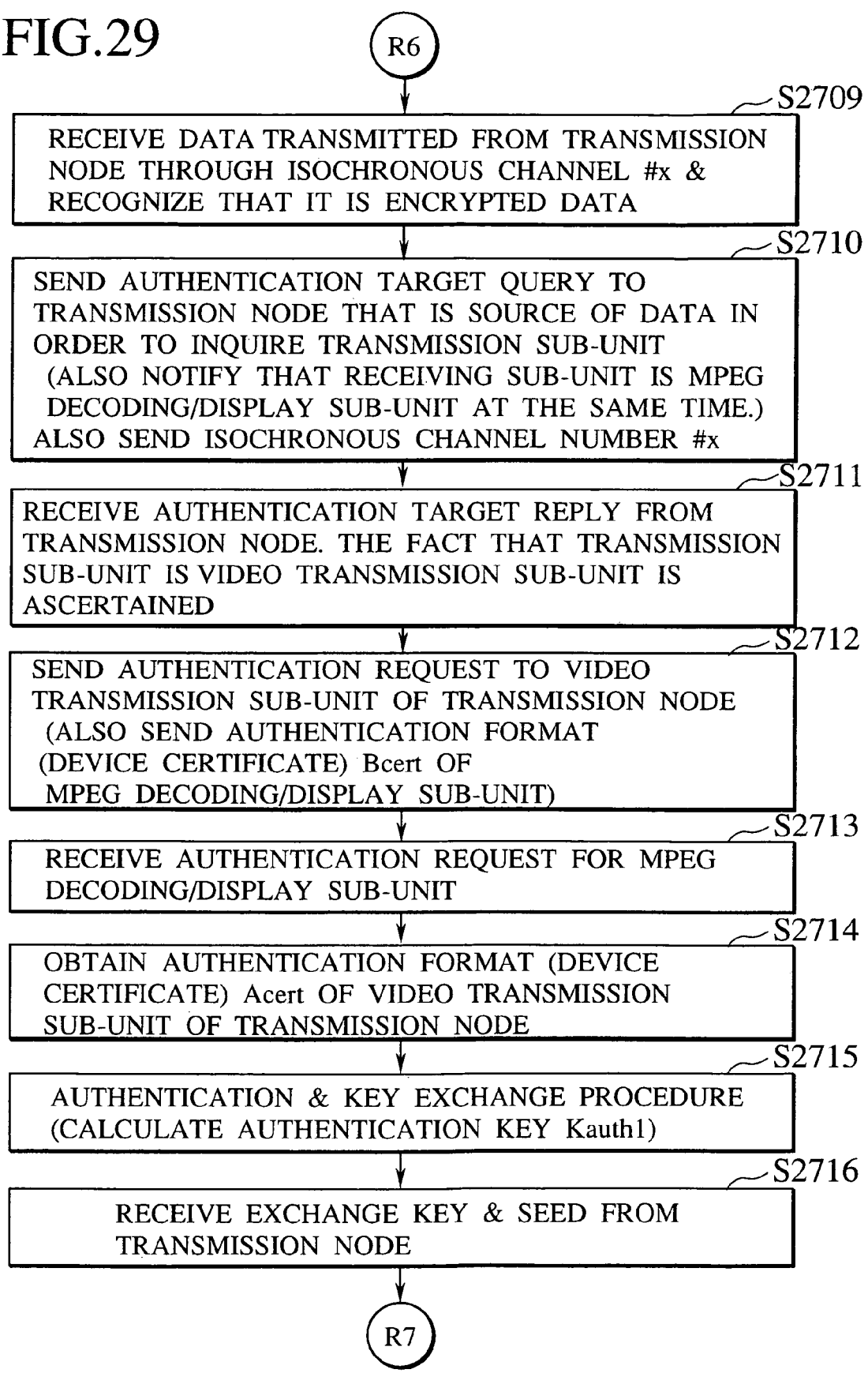
FIG. 29 is another flow chart showing an exemplary operation procedure of a relay node according to the second embodiment of the present invention.
Figure 30:
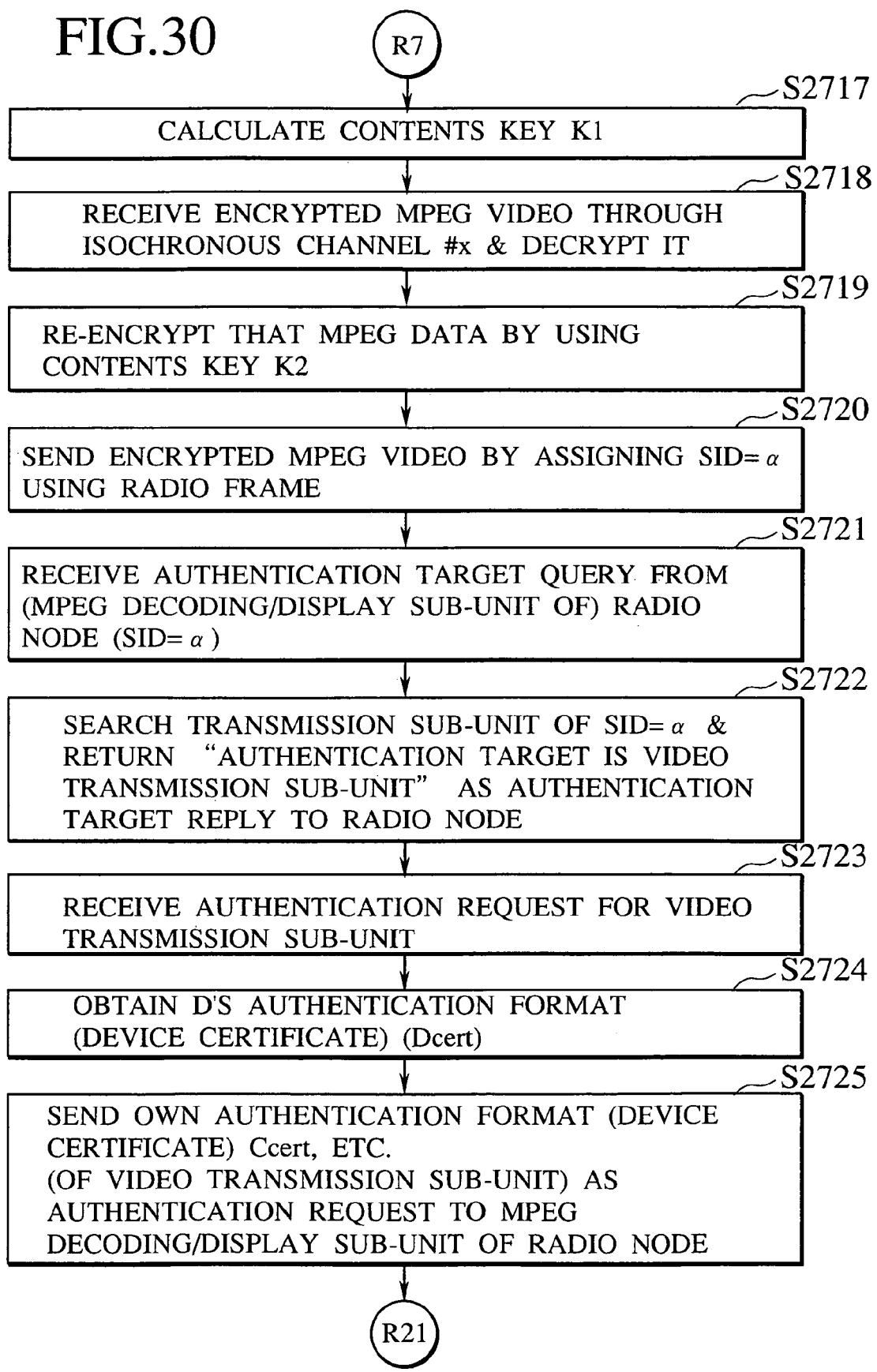
FIG. 30 is another flow chart showing an exemplary operation procedure of a relay node according to the second embodiment of the present invention.
Figure 31:
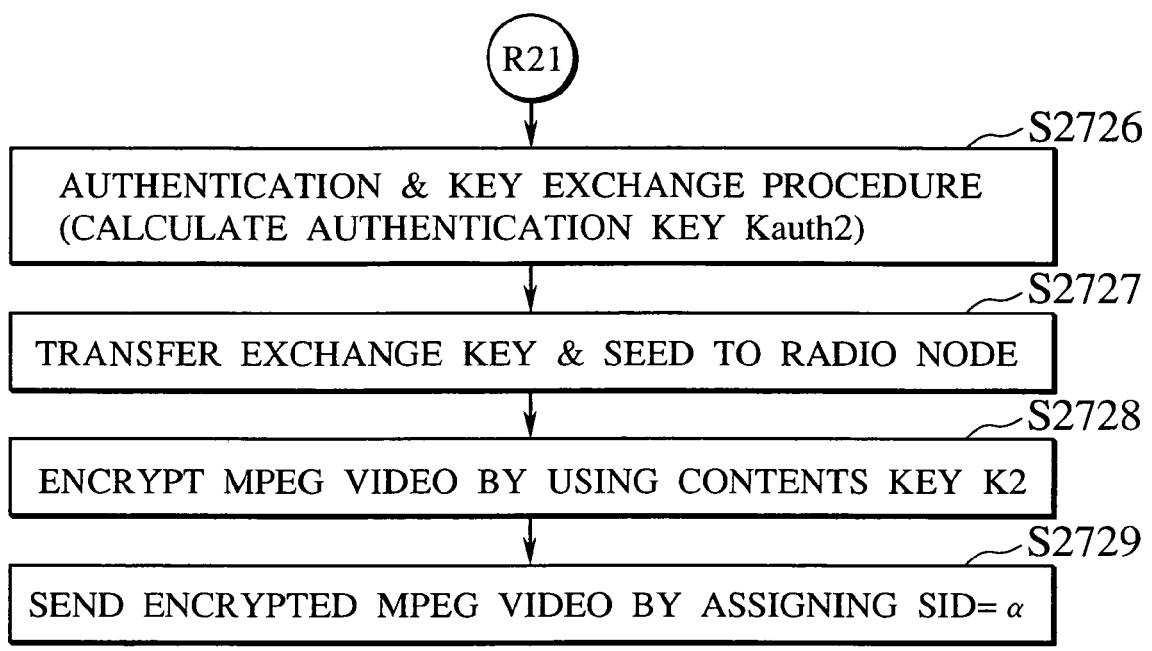
FIG. 31 is another flow chart showing an exemplary operation procedure of a relay node according to the second embodiment of the present invention.
Figure 32:
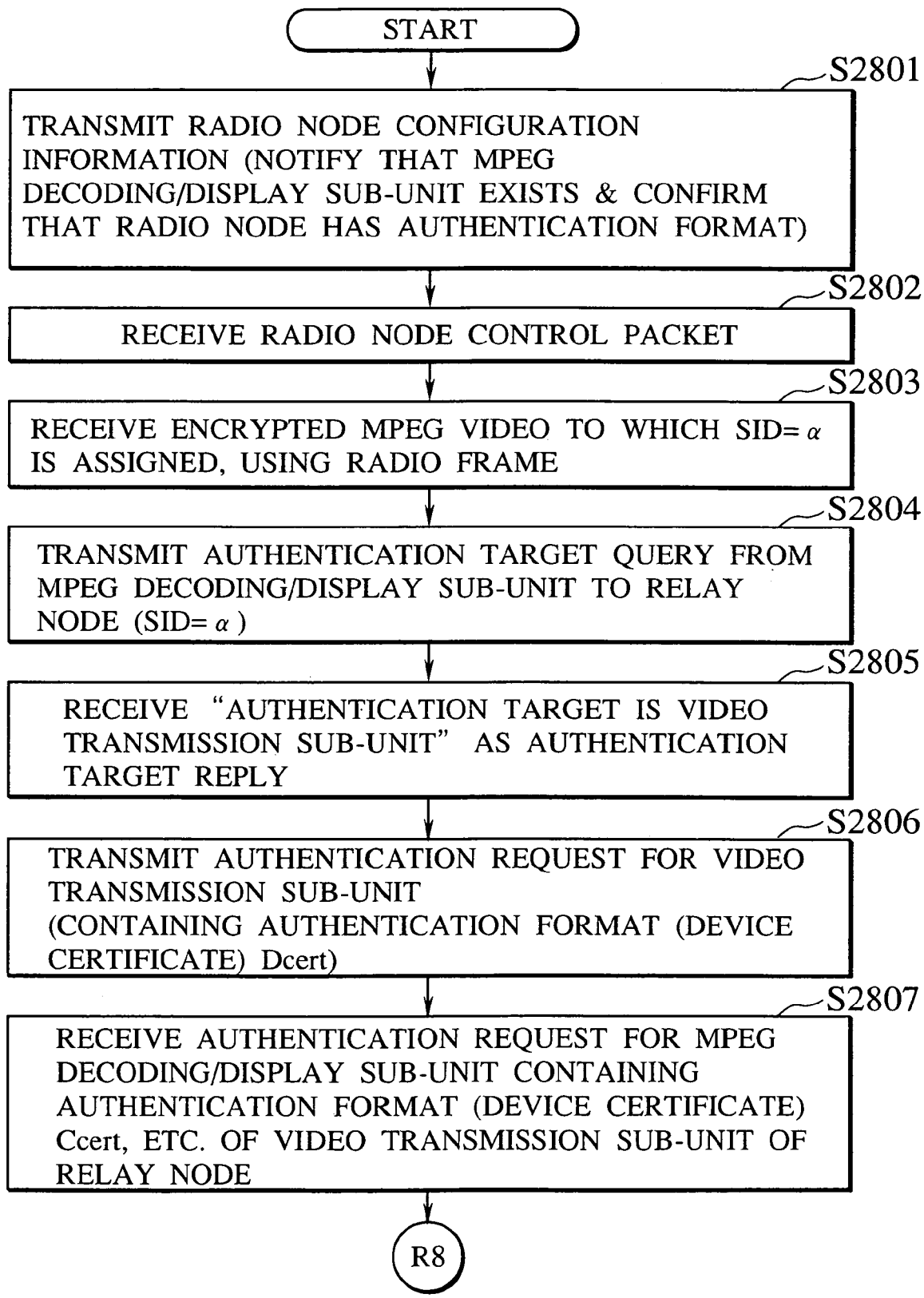
FIG. 32 is a flow chart showing an exemplary operation procedure of a radio node according to the second embodiment of the present invention.
Figure 33:
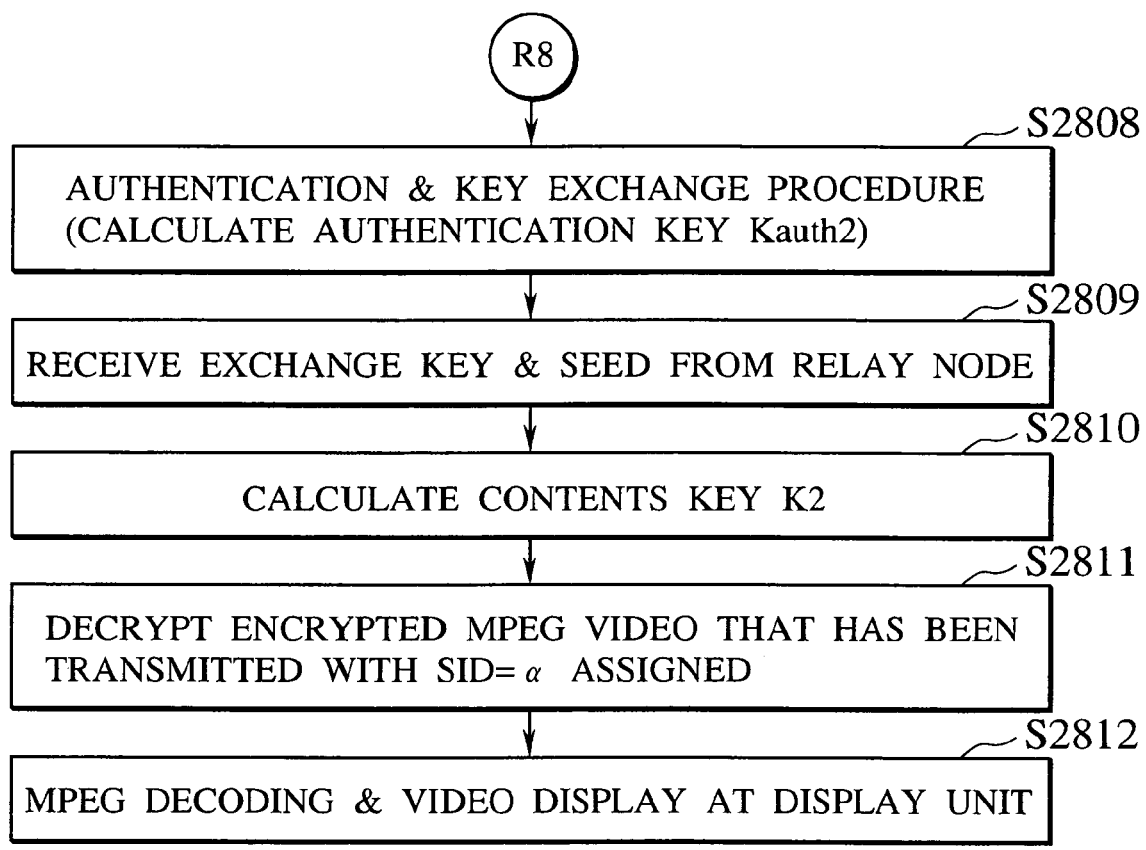
FIG. 33 is another flow chart showing an exemplary operation procedure of a radio node according to the second embodiment of the present invention.

Next, the actual operation sequence for the entire MPEG video transmission after applying the copy protection will be described with references to an exemplary overall sequence shown in FIGS. 24 and 25, an exemplary flow chart for the transmission node 2101 shown in FIGS. 26 and 27, an exemplary flow chart for the relay node 2102 shown in FIGS. 28, 29, 30 and 31, and an exemplary flow chart for the radio node 2103 shown in FIGS. 32 and 33.

First, the radio node 2103 notifies the own configuration information to the relay node 2102 (step S2501). The configuration information indicates that the own node (radio node) has the MPEG decoding/display function, the authentication format (device certificate) for the authentication purpose, etc. Here, the fact that this authentication format (device certificate) is an authentication format (device certificate) for the radio section may also be notified (step S2801).

The relay node 2102 that received this configuration information checks that the radio node 2103 has the authentication format (device certificate) and the MPEG decoding/display function (step S2701). Similarly as in the first embodiment, the relay node 2102 advertises this MPEG decoding/display function as the own sub-unit of the relay node 2102 to the IEEE 1394 bus side (step S2502), using the IEEE 1212 register or the AV/C protocol, etc.

Figure 35:
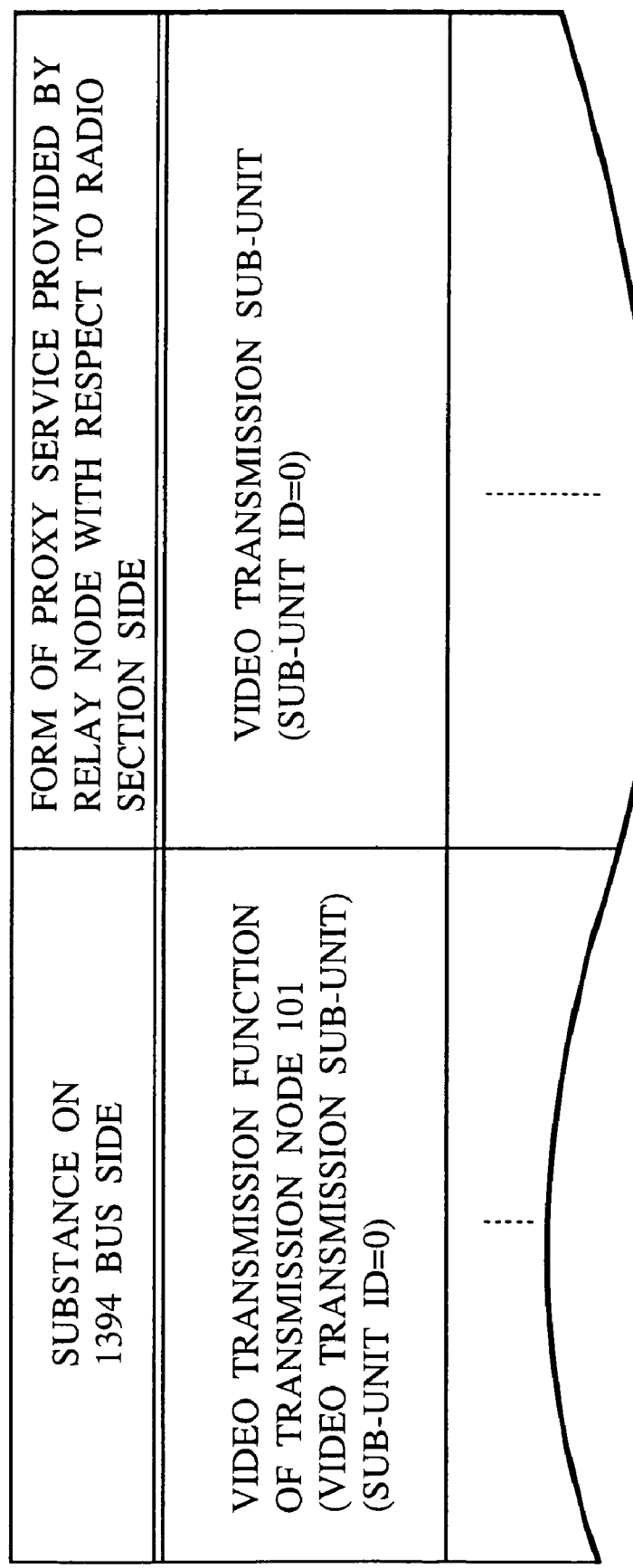
FIG. 35 is another diagram showing an exemplary form of a proxy table used in the second embodiment of the present invention.

To this end, the relay node 2102 has a proxy table. 2214 inside the proxy sub-unit configuration unit 2210. The proxy table 2214 is basically similar to that of the first embodiment, which is a table registering the correspondence between a form in which the relay node 2102 is advertising as a proxy and its actual substance, as shown in FIGS. 35 and 36.

Figure 34:
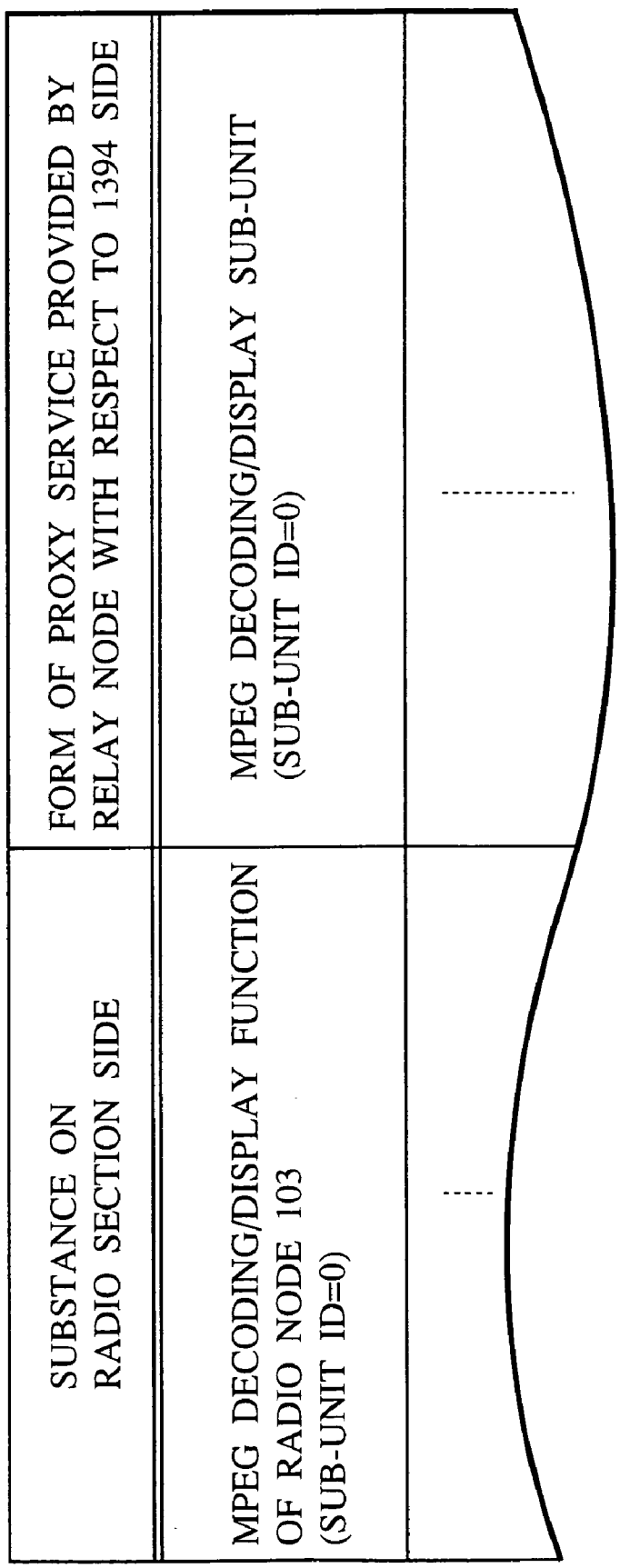
FIG. 34 is a diagram showing an exemplary form of a proxy table used in the second embodiment of the present invention.

Here, the MPEG decoding/display function of the radio node 2103 is advertised as the sub-unit of the relay node, as shown in FIG. 34 (steps S2702, S2703).

Figure 36:
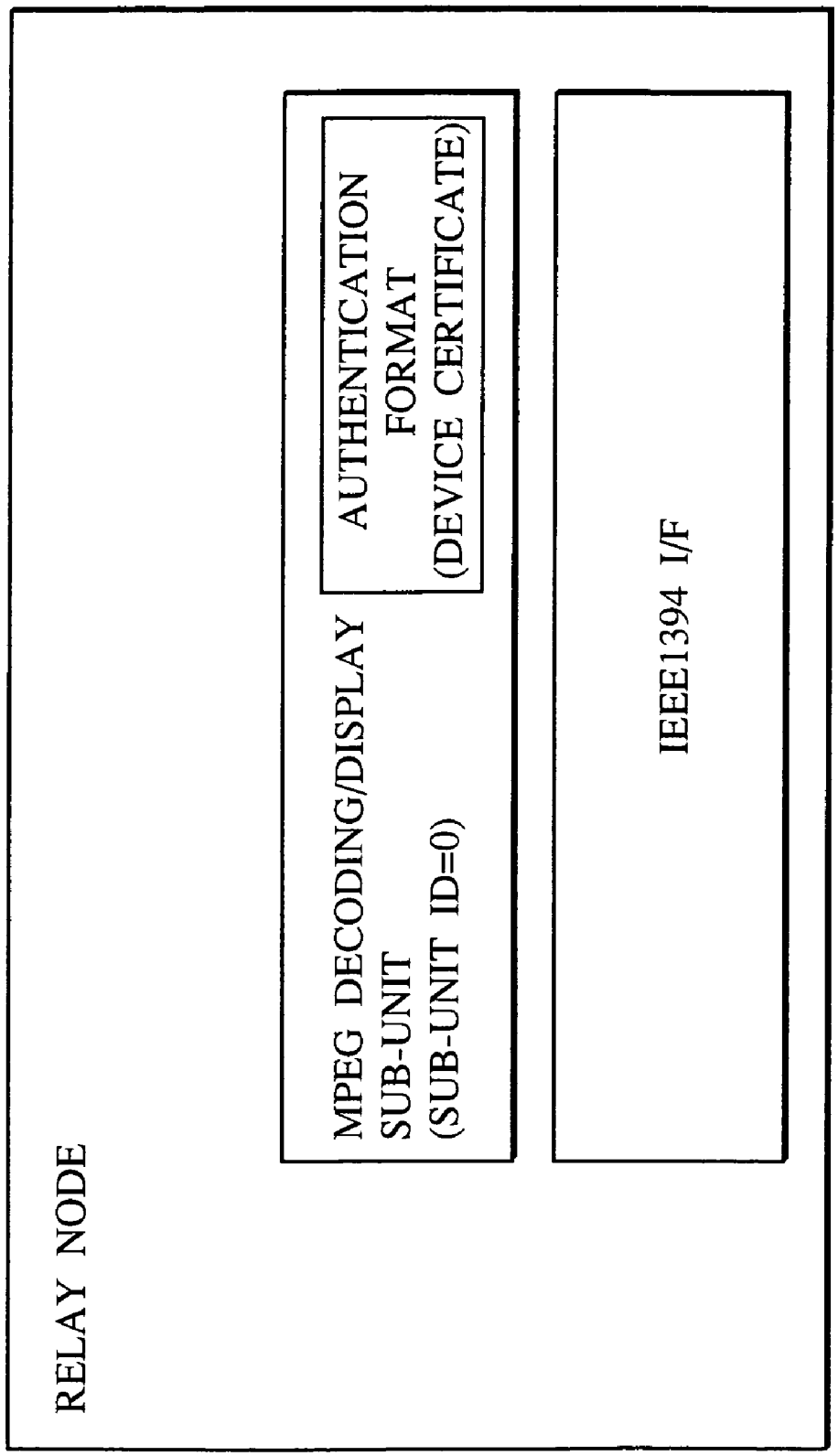
FIG. 36 is a diagram showing an internal configuration of a relay node as seen from a transmission node in the network of FIG. 20.

As a result, the structure of the relay node 2102 as seen from the transmission node 2101 appears as shown in FIG. 36 (step S2601).

Figure 37:
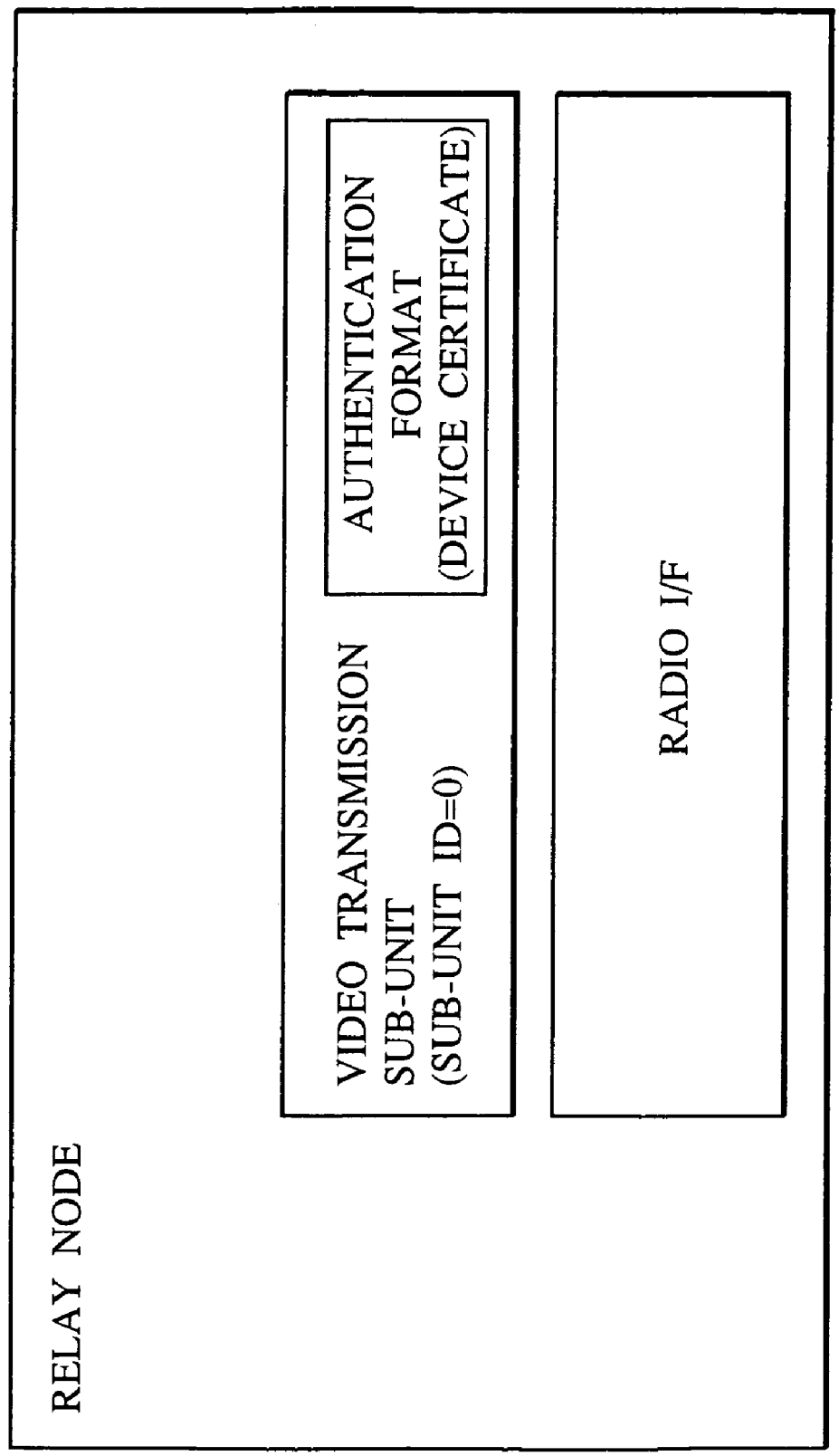
FIG. 37 is a diagram showing an internal configuration of a relay node as seen from a radio node in the network of FIG. 20.

The above description is directed to the IEEE 1394 bus side, but the same relationship also holds in the radio section, similarly as in the first embodiment. Namely, the relay node 2102 surveys instruments, services, sub-unit configuration, etc. on the IEEE 1394 bus side and provides their proxy services with respect to the radio section side. As a result, the setting as shown in FIG. 35 is made and the structure of the relay node 2102 as seen from the radio node appears as shown in FIG. 37.

Now, the transmission node 2101 that recognized that there is an MPEG decoding/display sub-unit in the relay node 2102 establishes an isochronous channel #x on the 1394 bus and issues a command of "connect (a plug for receiving) this isochronous channel #x with the MPEG decoding/display sub-unit, and display the video" in the AV/C protocol (steps S2503, S2602), for the purpose of transferring the MPEG video to this sub-unit. The transmission node 2101 interprets that this sub-unit exists in the relay node 2102 so that the destination of the command is the relay node 2102.

The relay node 2102 that received this command (step S2704) interprets the received command packet, recognizes that this command is a command with respect to the MPEG decoding/display sub-unit for which the proxy service is provided by the own node, refers to the proxy table 2210, and recognizes that the substance to which this command is directed exists in the radio node 2103 (step S2705).

Here, it is assumed that the radio section of FIG. 20 is a QOS compatible radio LAN which is capable of transferring data up to the destination without any quality degradation such as packet loss or delay as long as the prescribed procedure is followed. On this radio LAN, the data are transferred in forms of a radio frame having a format similar to the Ethernet frame, that is, a format of "source address, destination address, data" as shown in FIG. 38.

Here, in order to forward data received through the isochronous channel #x of the IEEE 1394 bus to the radio node side, the QOS set up in the radio section may be carried out, and the ISO signal transmission and reception unit 2203 (that receives the isochronous channel #x) and the radio ISO signal transmission and reception unit 2206 (that transmits the radio frames with guaranteed QOS) may be connected as indicated by a dashed line in FIG. 22 (because the decryption cannot be carried out yet), such that the ISO input data entered from the 1394 interface 2201 can be forwarded to the radio section as it is (steps S2504, S2706, S2707).

In addition, a command "data will be transmitted through the radio frames so that receive them, and display the result on a display" is transmitted to the radio node 103 in a form of a radio node control packet (steps S505, S708, S2802). For this control protocol, the IEEE 1394 AV/C protocol, IEC 61883 protocol, or their modifications may be used. As will be described below, in this embodiment, there is no concept of isochronous channel on the radio LAN but a field called source ID (SID) is provided in data to be transferred such that each node that is transmitting QOS data to the radio section can uniquely identify the QOS data that is being transferred, and this SID value can be used for the judgement of the data flow, as in the isochronous channel of the IEEE 1394. FIG. 39 shows an exemplary format of this radio node control packet. The source of this packet is the relay node 2102.

The radio node 2103 that received this packet recognizes that data will be transferred with QOS by having SID value of α attached thereto.

After that, the transmission node 2101 transfers the encrypted MPEG video through the isochronous channel #x (steps S2603, S2506). The contents key is assumed to be K1.

This encryption key is derived as a function of the exchange key or seed to be described below.

Also, the frame for transmitting this encrypted MPEG video may contain "transmission node ID" for identifying the transmission node, besides the isochronous channel number.

The relay node 2102 that received these data recognizes that data are encrypted, refers to the "transmission node ID" contained in the received data for example, recognizes that this data is transmitted by the transmission node 2101 (step S2709), and carries out the authentication target query with respect to the transmission node 2101 in order to ascertain "which sub-unit of the transmission node 2101 is transmitting these data through the isochronous channel #x" (step S2507, S2710). At this point, the isochronous channel number (#x) through which data are transferred is described therein so that the transmission node 2101 can identify the sub-unit that is transmitting data, and the own sub-unit that received these data (the sub-unit ID=0 of the MPEG decoding/display sub-unit of the relay node 2102 in this embodiment) is also notified. This plays the role of notifying the authentication target as seen from the transmission node 2101.

Note that this authentication target query packet and the authentication target reply packet to be described below may have data encrypted or hashed by the private key of the authentication organization as an electronic signature, so as to be able to confirm the absence of alteration, etc.

Now, the transmission node 2101 that received the authentication target query (step S2604) recognizes that the sub-unit that is receiving data transmitted to the isochronous channel #X is the MPEG decoding/display sub-unit of the relay node 2102, and notifies that the sub-unit that is transmitting data to the isochronous channel #x is the video transmission sub-unit (sub-unit ID=0), to the relay node 2102 as the authentication target reply packet (step S2508, S2605).

In this way, the relay node 2102 can recognize that the sub-unit that is transmitting data to the isochronous channel #x is the video transmission sub-unit (sub-unit ID=0) of the transmission node 2101 (step S2711).

The (MPEG decoding/display sub-unit proxy function of the) relay node 2102 that recognized that the sub-unit that is transmitting data to the isochronous channel #x is the video transmission sub-unit of the transmission node 2101 then carries out the authentication request with respect to the video transmission sub-unit of the transmission node 2101. This authentication request is transferred along with the authentication format (device certificate) (Bcert) of the relay node or the MPEG decoding/display sub-unit of the relay node (steps S2509, S2606, S2607, S2712). This exchange of the authentication request and the authentication format (device certificate) is also carried out from (the video transmission sub-unit of) the transmission node 2101 with respect to (the MPEG decoding/display sub-unit of) the relay node 2102, similarly as in the first embodiment (steps S2510, S2608, S2713, S2714). The information regarding the sub-unit is also exchanged at the authentication and key exchange in this second embodiment so that the key to be used can be made different even for communications between the same devices when the sub-unit that is carrying out communication is different.

After completing the mutual authentication, these two nodes carry out the authentication and key exchange procedure similarly as in the first embodiment (steps S25111, S25112, S2609, S2715) so as to share the authentication key Kauth1. Using this authentication key, the transmission node 2101 carries out the transfer of the exchange key or seed to the relay node 2102 (steps S2512, S2610, S2716), so that it becomes possible for the relay node 2102 to ascertain the value of the contents key K1 (step S2717).

The MPEG video encrypted by using the contents key K1 that is transferred thereafter (via the isochronous channel #x) (steps S2513, S2611, S2612) is decrypted at the relay node 2102 (steps S2514, S2718), re-encrypted by using the contents key K2 that is separately provided for the radio section (steps S2515, S2516, S2719), and transmitted to the radio node 2103 in a form that guarantees QOS on the radio section (steps S2517, S2720, S2803). At this point, the MPEG video passes through a path of the ISO signal transmission and reception unit 2203, the decryption unit 2204, the encryption unit 2205, and the radio ISO signal transmission and reception unit 2206.

As described above, data may be transmitted by attaching a value unique at the relay node 2102 called source ID such that the relay node 2102 can identify data that is being transmitted to the radio section side at this point. Here, this unique value is assumed to be α. Namely, the data with the value α attached are data received from the isochronous channel #x of the IEEE 1394 (that are decrypted by using the contents key K1 and re-encrypted by using the contents key K2). The relay node 2102 is recognizing that data that are transmitted to the radio section by attaching the SID value α are data transmitted from the proxy function of the video transmission sub-unit on the radio section side of the own device.

The operation of the radio node 2103 that received these data are basically the same as the operation of the relay node 2102 that received the encrypted data as described above.

Namely, the radio node 2103 that received these data recognizes that data are encrypted, refers to the "source address" contained in the received data for example, recognizes that this data is transmitted by the relay node 2102, and carries out the authentication target query with respect to the relay node 2102 in order to ascertain "which sub-unit of the relay node 2102 is transmitting these data by attaching the value α thereto" (step S2518, S2804).

At this point, the SID value (α) with which data are transferred is described therein so that the relay node 2102 can identify the sub-unit that is transmitting data, and the receiving side sub-unit that received these data (the sub-unit ID=0 of the MPEG decoding/display sub-unit of the radio node 2103 in this embodiment) is also notified. This plays the role of notifying the authentication target as seen from the relay node 2102.

The relay node 2102 that received the authentication target query (step S2721) recognizes that the sub-unit that is receiving data transmitted with the SID=α is the MPEG decoding/display sub-unit of the radio node 2103, and notifies that the sub-unit that is transmitting data by attaching the SID=α thereto is the video transmission sub-unit, to the radio node 2103 as the authentication target reply packet (step S2519, S2722, S2805).

In this way, the radio node 2103 can recognize that the sub-unit that is transmitting data by attaching the SID=α thereto is the video transmission sub-unit of the relay node 2102.

The (MPEG decoding/display sub-unit of the) radio node 2103 that recognized that the sub-unit that is transmitting data by attaching the SID=α thereto is the video transmission sub-unit of the relay node 2102 then carries out the authentication request with respect to the video transmission sub-unit of the relay node 2102 (steps S2520, S2723, S2724, S2806). This authentication request is transferred along with the authentication format (device certificate) (Dcert) of the radio node (or the MPEG decoding/display sub-unit of the radio node). This exchange of the authentication request and the authentication format (device certificate) is also carried out from (the video transmission sub-unit of) the relay node 2102 with respect to (the MPEG decoding/display sub-unit of) the radio node 2103 (steps S2521, S2725, S2807).

After completing the mutual authentication, these two nodes carry out the authentication and key exchange procedure (steps S2522, S2523, S2726, S2808) so as to share the authentication key Kauth2. Using this authentication key, the relay node 2102 carries out the transfer of the exchange key or seed to the radio node 2103 (steps S2524, S2727, S2809), so that it becomes possible for the radio node 2103 to ascertain the value of the contents key K2 (step S2810).

Note that, in the above description, the authentication and key exchange between the transmission node and the relay node, and the authentication and key exchange between the relay node and the radio node are carried out sequentially in this order, but their order may be reserved, or both of them may be carried out in parallel.

The MPEG video encrypted by using the contents key K1 that is transferred thereafter (steps S2525) is decrypted at the relay node 2102 (steps S2526), re-encrypted by using the contents key K2 that is separately provided for the radio section (steps S2527, S2528, S2728), and transmitted to the radio node 2103 in forms of radio frames to which the SID=α is attached (steps S2529, S2729).

This time, the radio node 2103 can calculate the content key K2 using the exchange key or seed acquired earlier, so that the received data are decrypted (steps S2530, S2811), and playbacked at the display unit 2307 (step S2812).

In this way, even in the interconnected environment where the proxy node exists between the 1394 bus and the radio network, it is possible to carry out the transfer of data that require the contents protection such as the actual MPEG video, etc., in such a way that data are encrypted throughout the entire route so that the copying is impossible and therefore the safe data transfer is possible, as the authentication procedure and the key exchange procedure are carried out by the relay node and the transmission node, and by the relay node and the reception node, at their respective sections. As a result, it becomes possible to carry out the data transfer that accounts for the copy protection even in such an interconnected environment.

Of course, there is a possibility of data copying at a portion where "raw MPEG data" flows in the relay node 2102, or more specifically between the decryption unit 2204 and the encryption unit 2205, so that it is advantageous to provide a measure against the data copying at this portion (such as forming the decryption unit and the encryption unit as a single LSI, for example) so that the eavesdropping of data (illegal copying) by attaching a probe to this portion becomes practically impossible.

Third Embodiment

Referring now to FIG. 40 to FIG. 54, the third embodiment of a relay device and a communication device according to the present invention will be described in detail.

Figure 40:
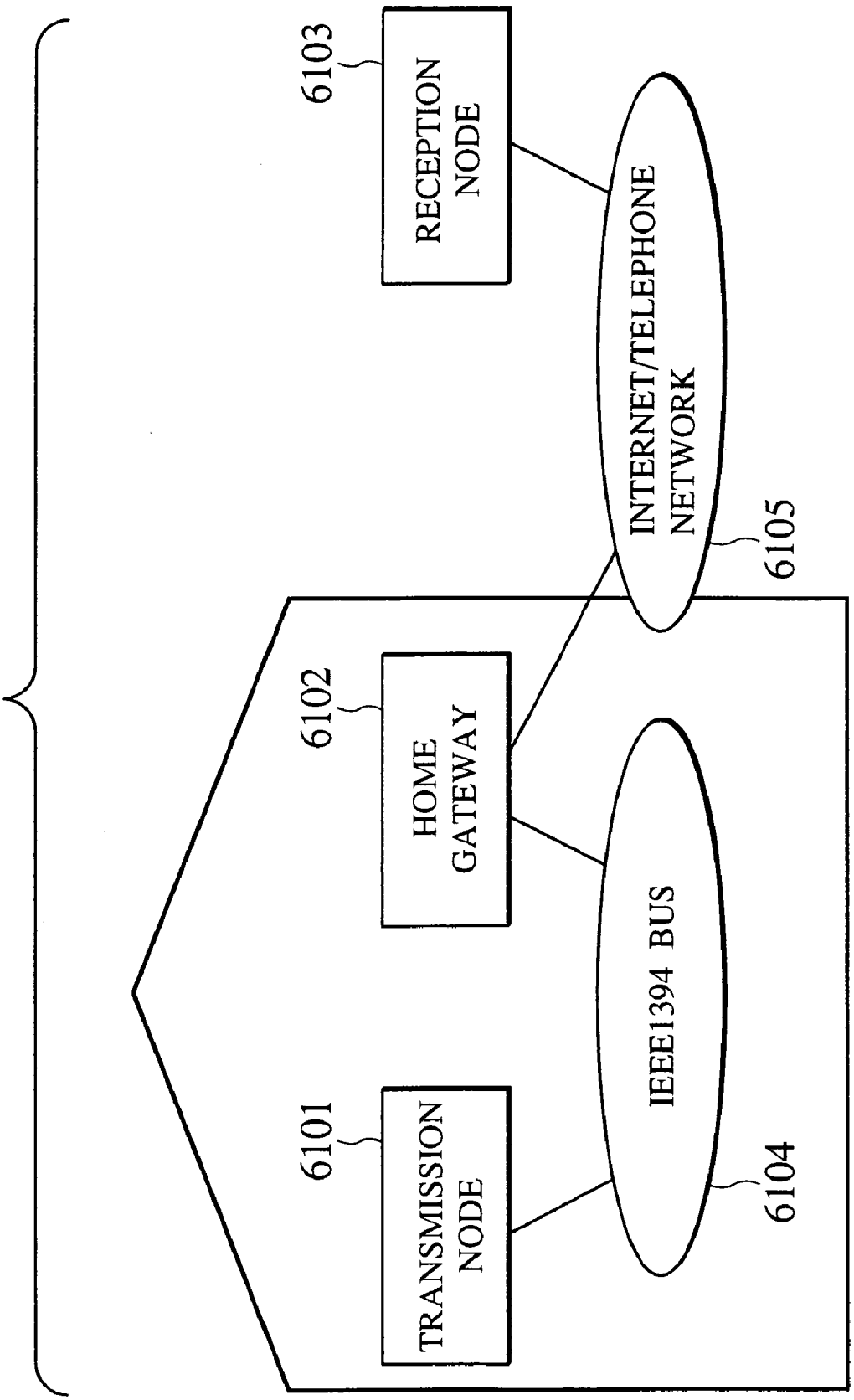
FIG. 40 is a schematic diagram showing an exemplary overall configuration of a network according to the third embodiment of the present invention.

FIG. 40 shows an exemplary overall configuration of networks In this embodiment. As shown in FIG. 40, in this third embodiment, an IEEE 1394 bus 6104 which is a home network of some home and a public network (which is assumed to be the Internet here as an example but may be a telephone network, etc.) 6105 are connected by a home gateway 61-2, and the exchange of data such as video data is to be carried out between a transmission node 6101 and a reception node 6103 after carrying out the authentication procedure and the encryption procedure. Here, it is assumed that (an access network portion of) the Internet 6105 has a very narrow communication bandwidth compared with the IEEE 1394 bus 6104 so that the video data (which are assumed to be MPEG2 video data as an example) exchanged on the IEEE 1394 bus cannot be transmitted directly because of the lack of bandwidth, and for this reason the transmission is to be carried out after applying the transcoding, that is, the code conversion from MPEG2 codes to MPEG4 codes, at the home gateway 6102.

In this third embodiment, similarly as in the second embodiment, the series of copy protection procedure, that is the authentication procedure and the encrypted data exchange, is terminated at the home gateway. Namely, each copy protection procedure is closed between the transmission node and the home gateway, and between the home gateway and the reception node. In this embodiment, the home gateway also provides the proxy services with respect to the transmission node or the reception node, but for the copy protection, the home gateway itself has the authentication format (device certificate) and the home gateway itself terminates a responsibility for the encrypted MPEG data transfer in the 1394 bus section and the radio section.

Figure 41:
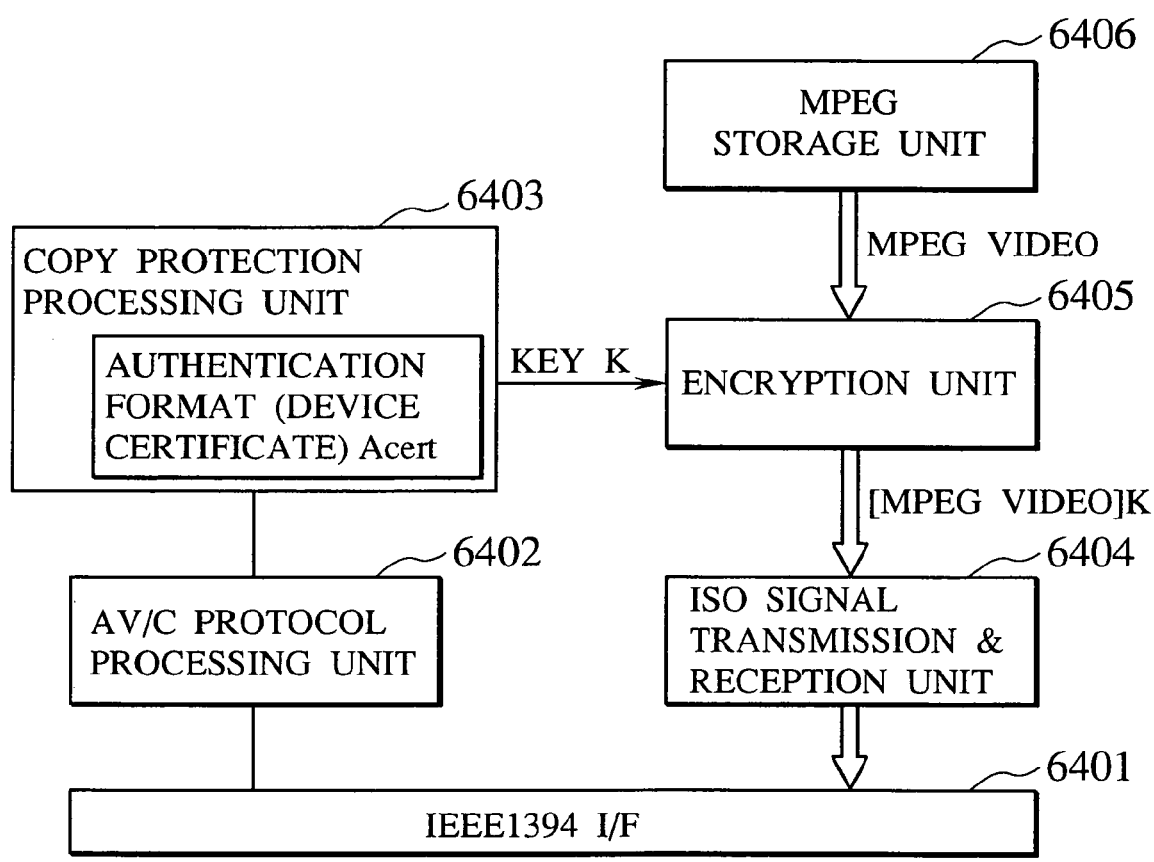
FIG. 41 is a block diagram showing an exemplary internal configuration of a transmission node in the network of FIG. 40.

FIG. 41 shows an exemplary internal configuration of the transmission node 6101, which is basically the same as in the above embodiments.

Figure 42:
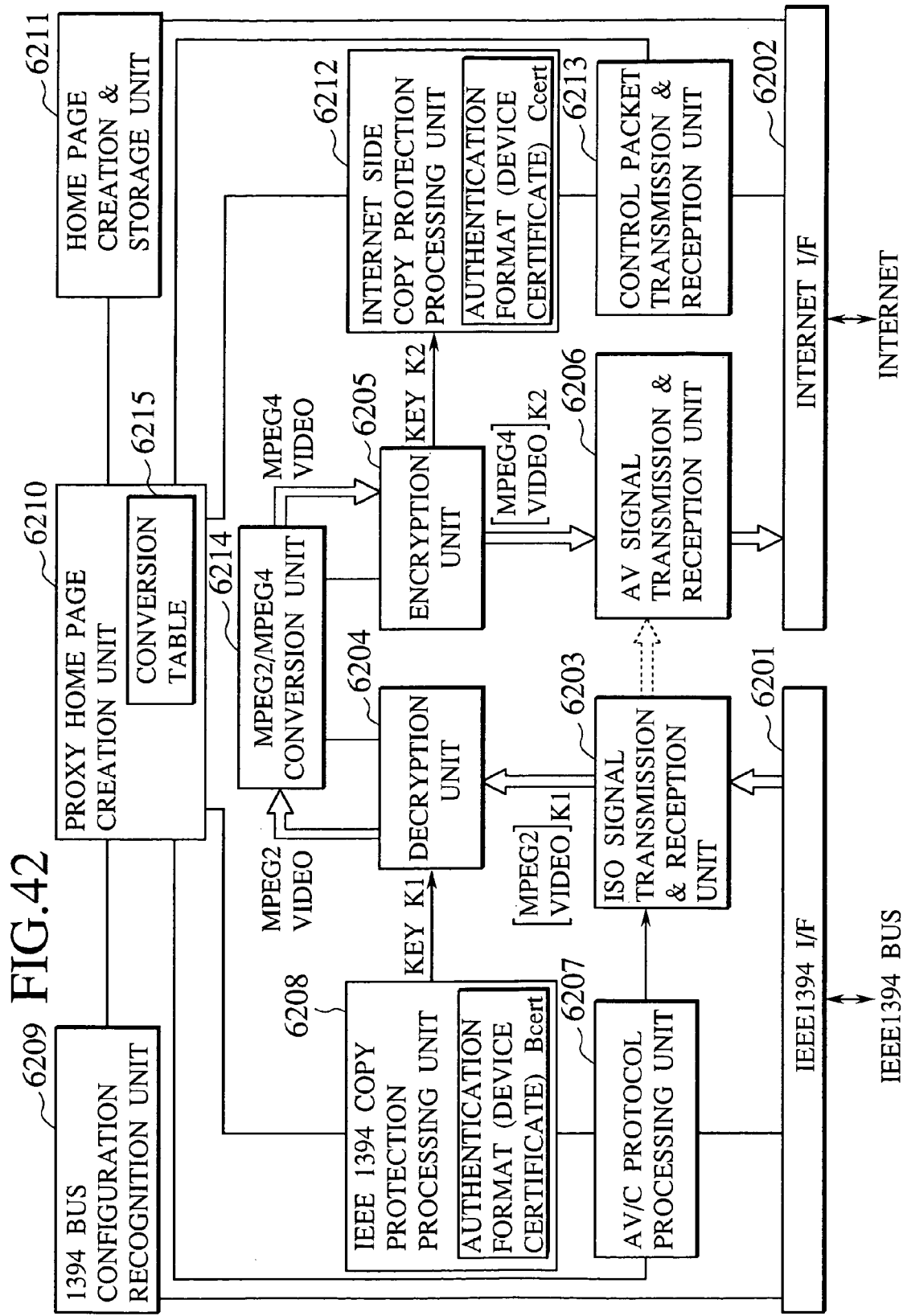
FIG. 42 is a block diagram showing an exemplary internal configuration of a home gateway in the network of FIG. 40.

FIG. 42 shows an exemplary internal configuration of the home gateway 6102. The basic configuration of the home gateway 6102 is the similar to that of the relay node of the second embodiment except that it has an Internet interface 6202 instead of the radio interface, a proxy home page creation unit 6210 instead of the proxy sub-unit configuration unit, a home page creation and storage unit 6211, and an MPEG2/MPEG4 conversion unit 6214 between the decryption unit 6204 and the encryption unit 6205. Each of these differences will be described in detail below.

The home gateway 6102 has a function for providing functions of a node on the IEEE 1394 bus side as a proxy server of a node on the IEEE 1394 bus side (the transmission node 6101 in this embodiment) with respect to a node on the Internet side. The service provided by the transmission node 6101 (the video transmission service in this embodiment) is accessible through a home page provided by the home gateway 6102. Here, from a viewpoint of the reception node 6103, the service of the transmission node 6101 appears through the home page of the home gateway 6102 so that it may be interpreted as the service on the IP (Internet) that is provided by the home gateway 6102.

Also, similarly as in the second embodiment, the home gateway 6102 has a function for forwarding data (MPEG2 video data) received from the IEEE 1394 bus side to the Internet side, but the procedure related to the copy protection such as authentication and data encryption, etc., is terminated at the home gateway 6102 both in the IEEE 1394 bus section and in the Internet section. An IEEE 1394 copy protection processing unit 6208 has the authentication format (device certificate) Bcert for the IEEE 1394 bus side, while an Internet side copy protection processing unit 6212 has the authentication format (device certificate) Ccert for the Internet section side, and the encrypted data entered from the isochronous channel of the IEEE 1394 bus are processed by the sequence of reception at the ISO signal transmission reception unit 6203→decryption at the decryption unit 6204→transcoding of the decrypted MPEG2 video to MPEG4 video at the MPEG2/MPEG4 conversion unit 6214→re-encryption of the MPEG4 video at the encryption unit 6205→transmission to the Internet side at the AV signal transmission and reception unit 6206.

Here, it is assumed that Acert and Bcert are the authentication formats (device certificates) that were issued by the same authentication organization (the authentication organization responsible for the IEEE 1394 copy protection), but the authentication formats (device certificates) of the Internet section (Ccert and Dcert to be described below) may or may not be issued by the same authentication organization, so that the authentication formats (device certificates) issued by a different authentication organization that is responsible for the Internet section may be used.

Note that, in this embodiment, the authentication formats (device certificates) (Acert, Bcert, Ccert, Dcert) are provided one for each sub-unit (each sub-unit type) or one for each Internet application, rather than one for each node (or network interface). Namely, different authentication formats (device certificates) may be used by different Internet applications. Here, the flow indicates a series of data flow that is expressed by the set of (source address, source port, destination address, destination port) of the Internet.

Figure 43:
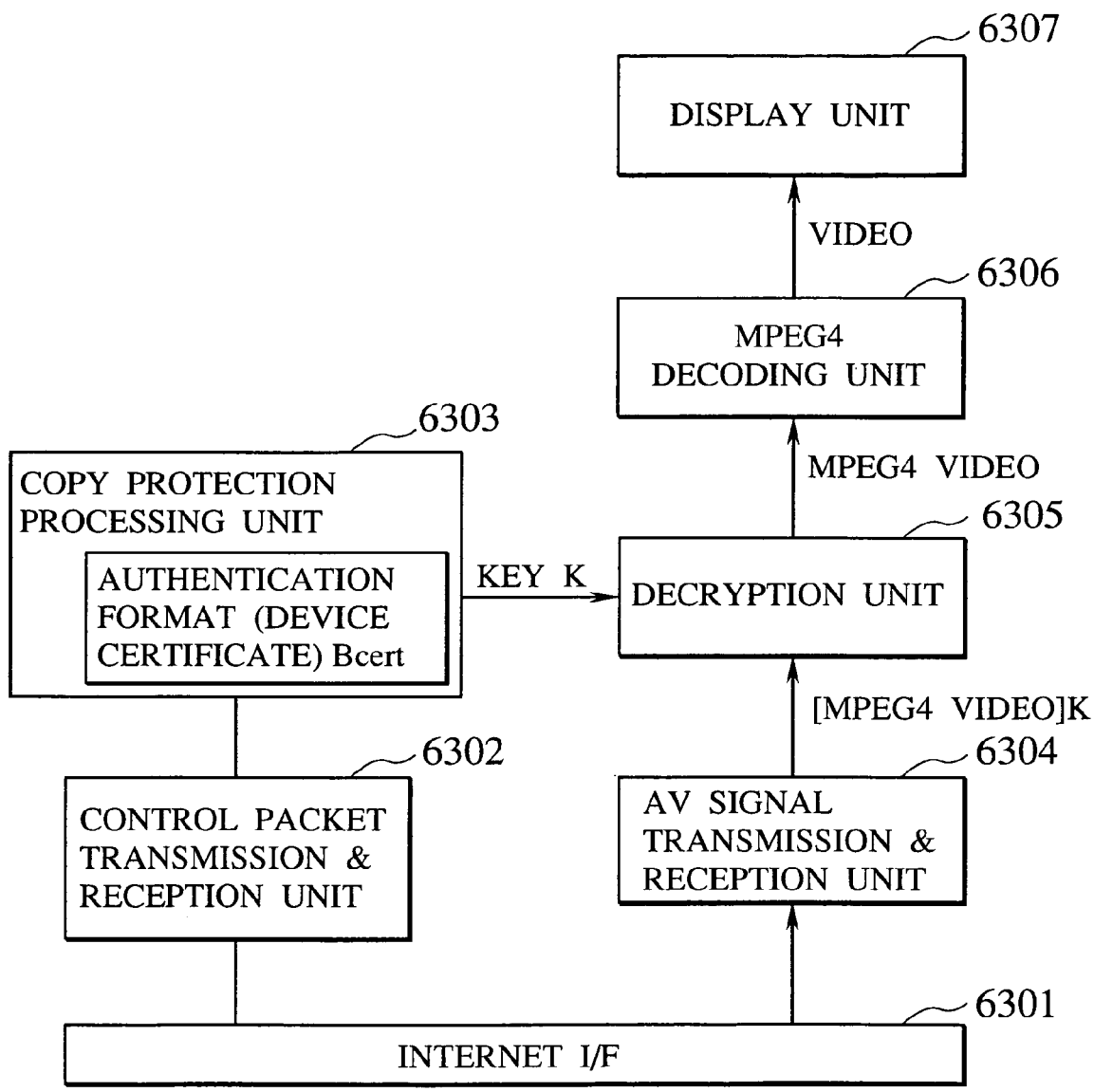
FIG. 43 is a block diagram showing an exemplary internal configuration of a reception node in the network of FIG. 40.

Next, FIG. 43 shows an exemplary internal configuration of the reception node 6103, in which a copy protection processing unit 6303 has the authentication format (device certificate) Dcert for the Internet, and which differs from the second embodiment in that interfaces (an Internet interface 6301, a control packet transmission and reception unit 6302, an AV signal transmission and reception unit 6304) are compatible with the Internet. Here, the control packet transmission and reception unit 6302 may be a packet transmission and reception module having TCP transport protocol while the AV signal transmission and reception unit 6394 may be a packet transmission and reception module having UDP transport protocol.

Figure 44:
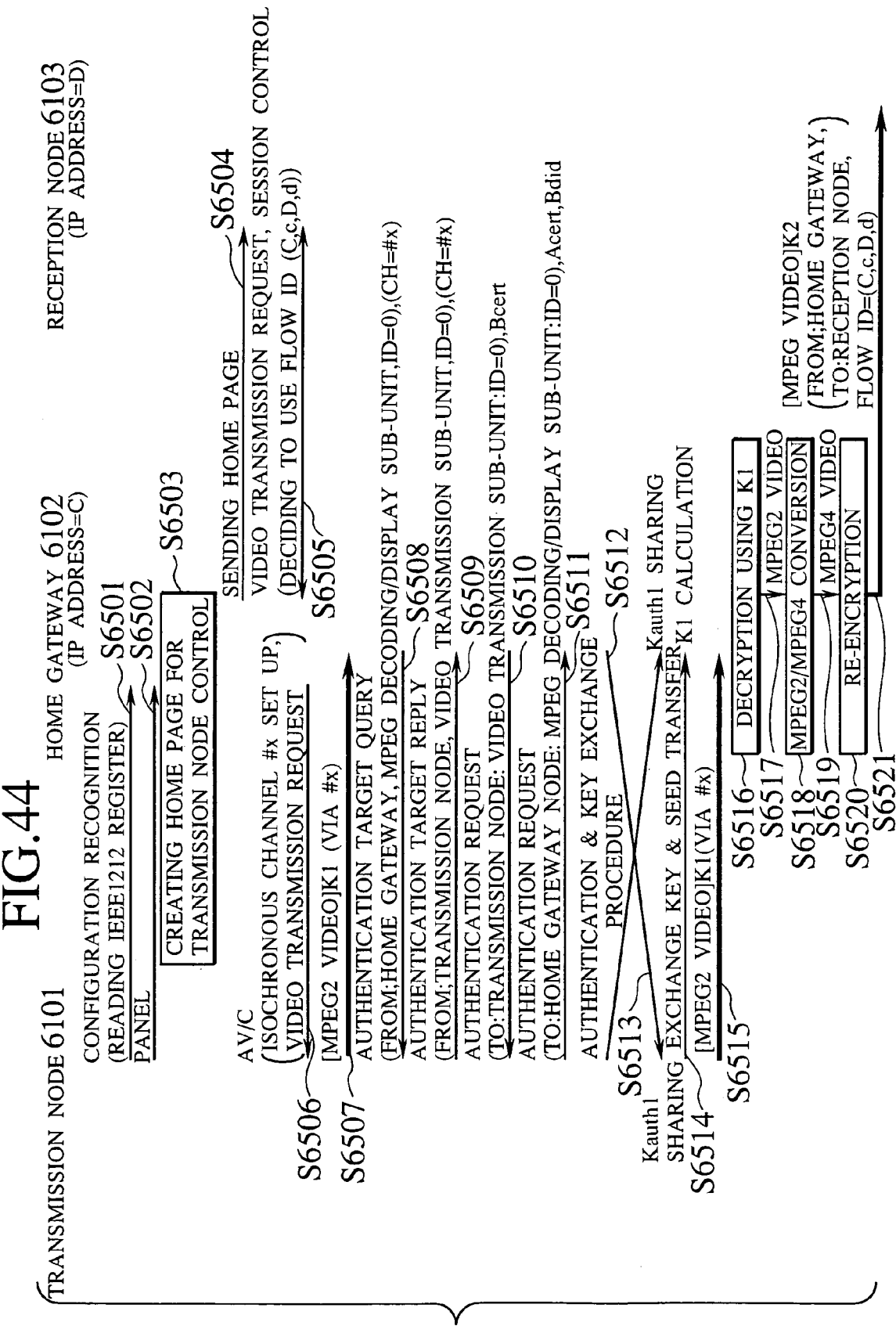
FIG. 44 is a sequence chart showing an exemplary overall sequence in the third embodiment of the present invention.
Figure 45:
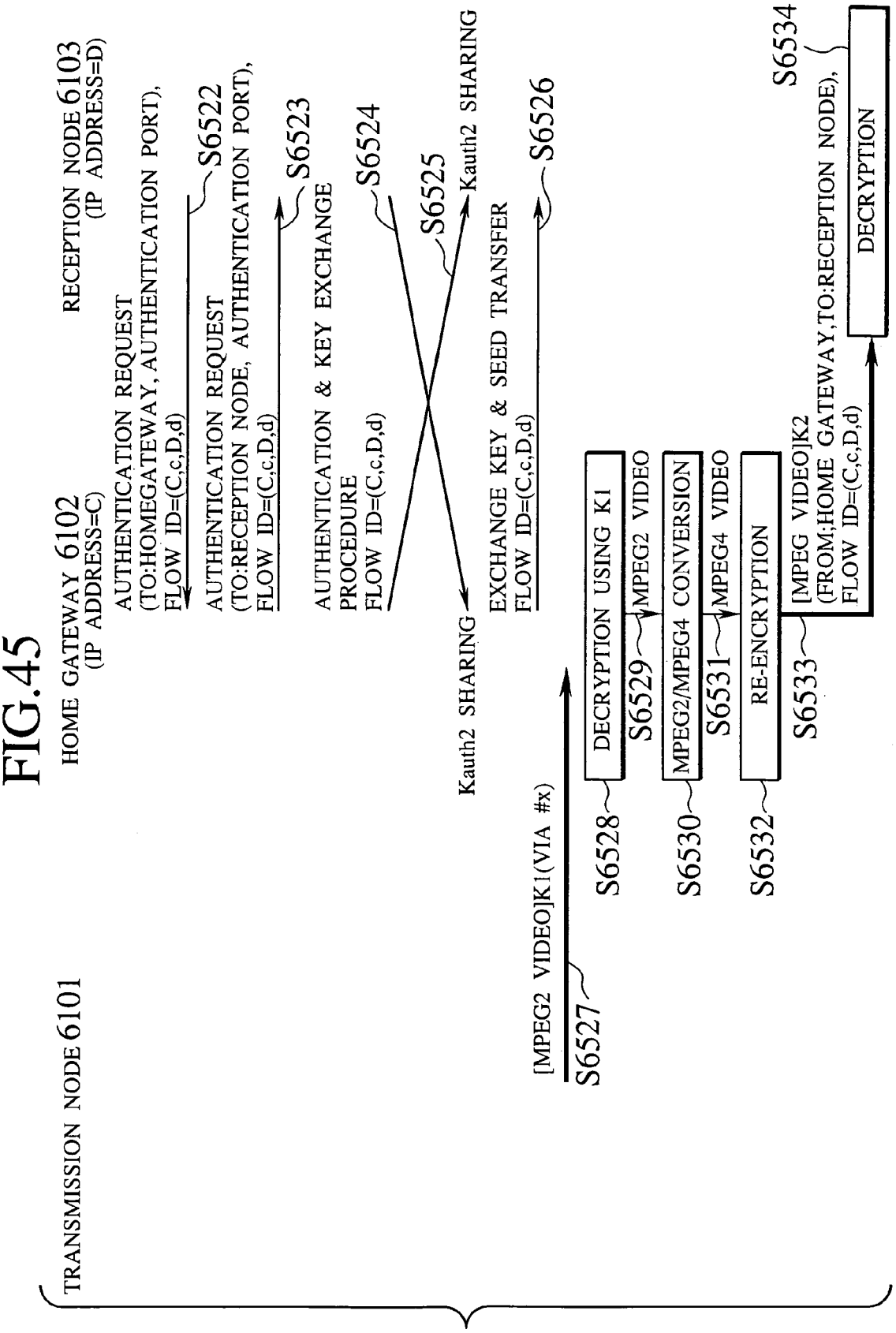
FIG. 45 is another sequence chart showing an exemplary overall sequence in the third embodiment of the present invention.
Figure 46:
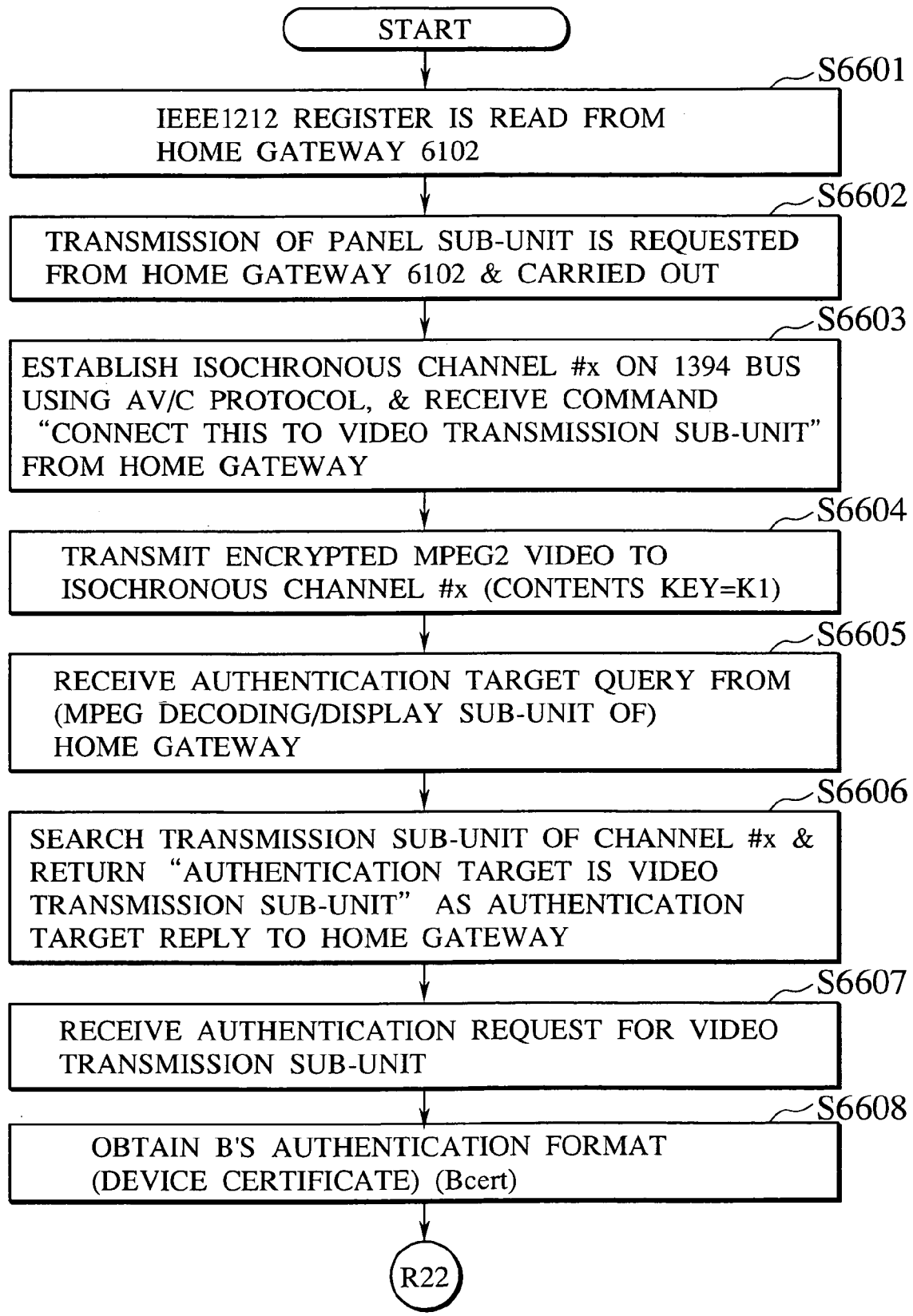
FIG. 46 is a flow chart showing an exemplary operation procedure of a transmission node according to the third embodiment of the present invention.
Figure 47:
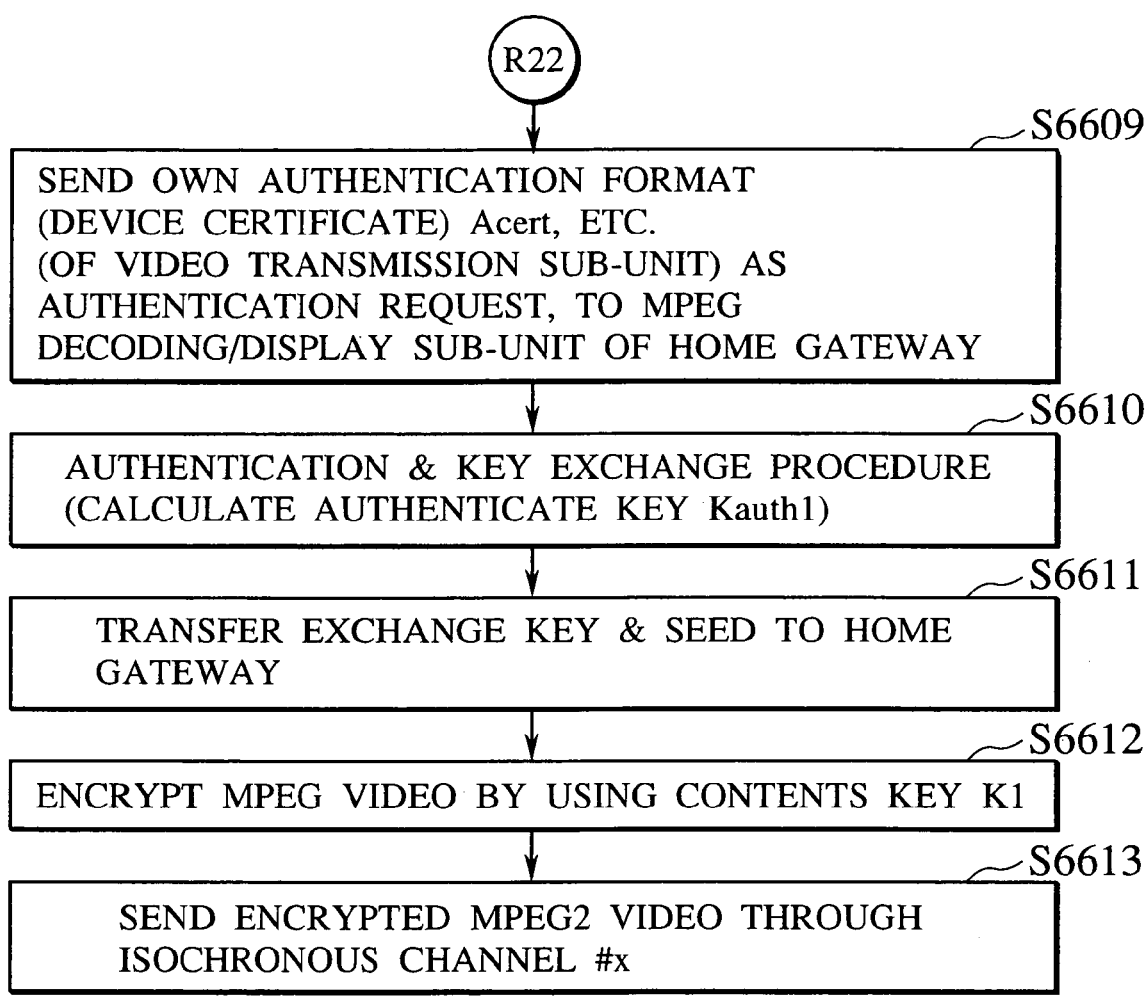
FIG. 47 is another flow chart showing an exemplary operation procedure of a transmission node according to the third embodiment of the present invention.
Figure 48:
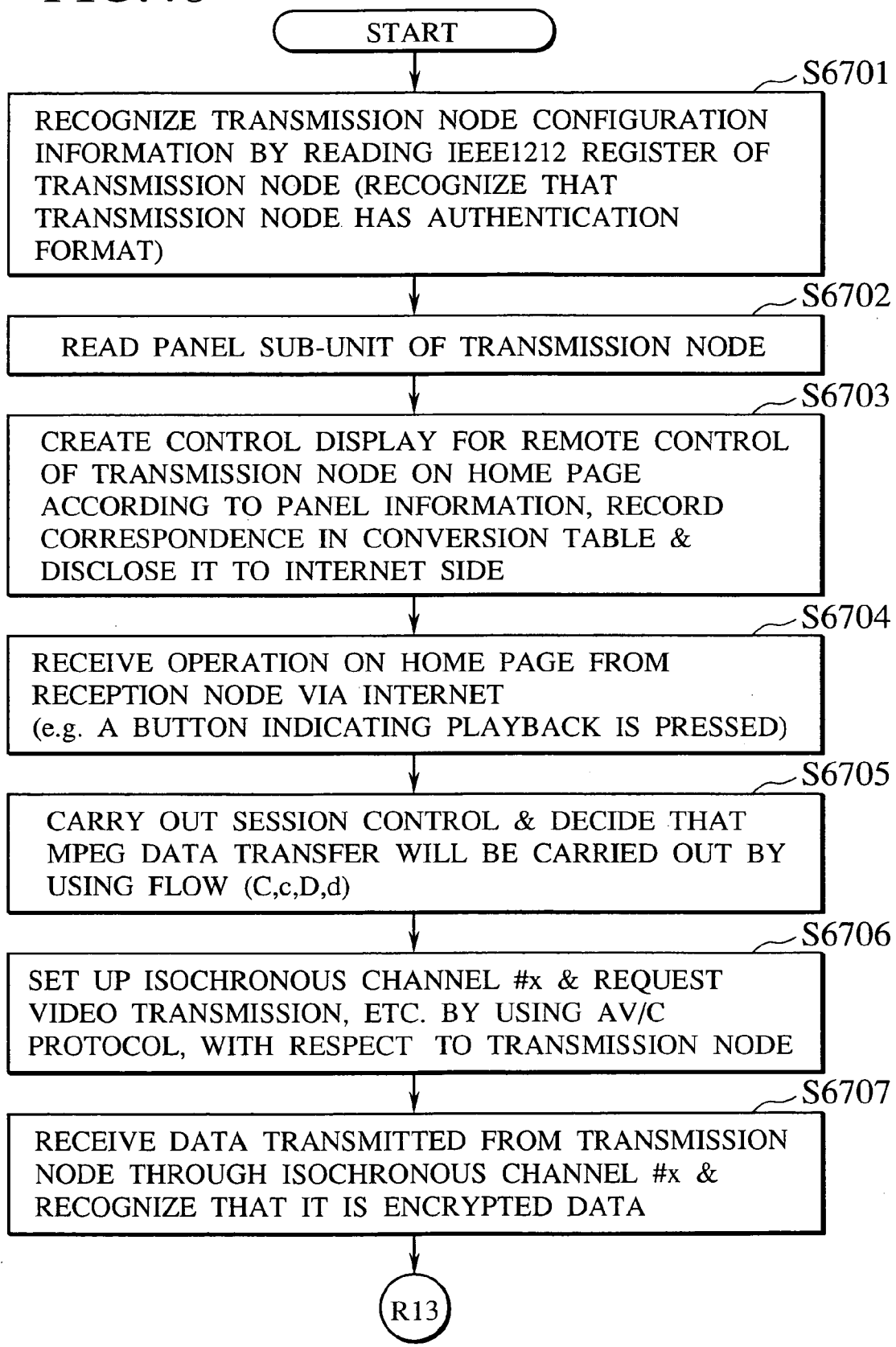
FIG. 48 is a flow chart showing an exemplary operation procedure of a home gateway according to the third embodiment of the present invention.
Figure 49:
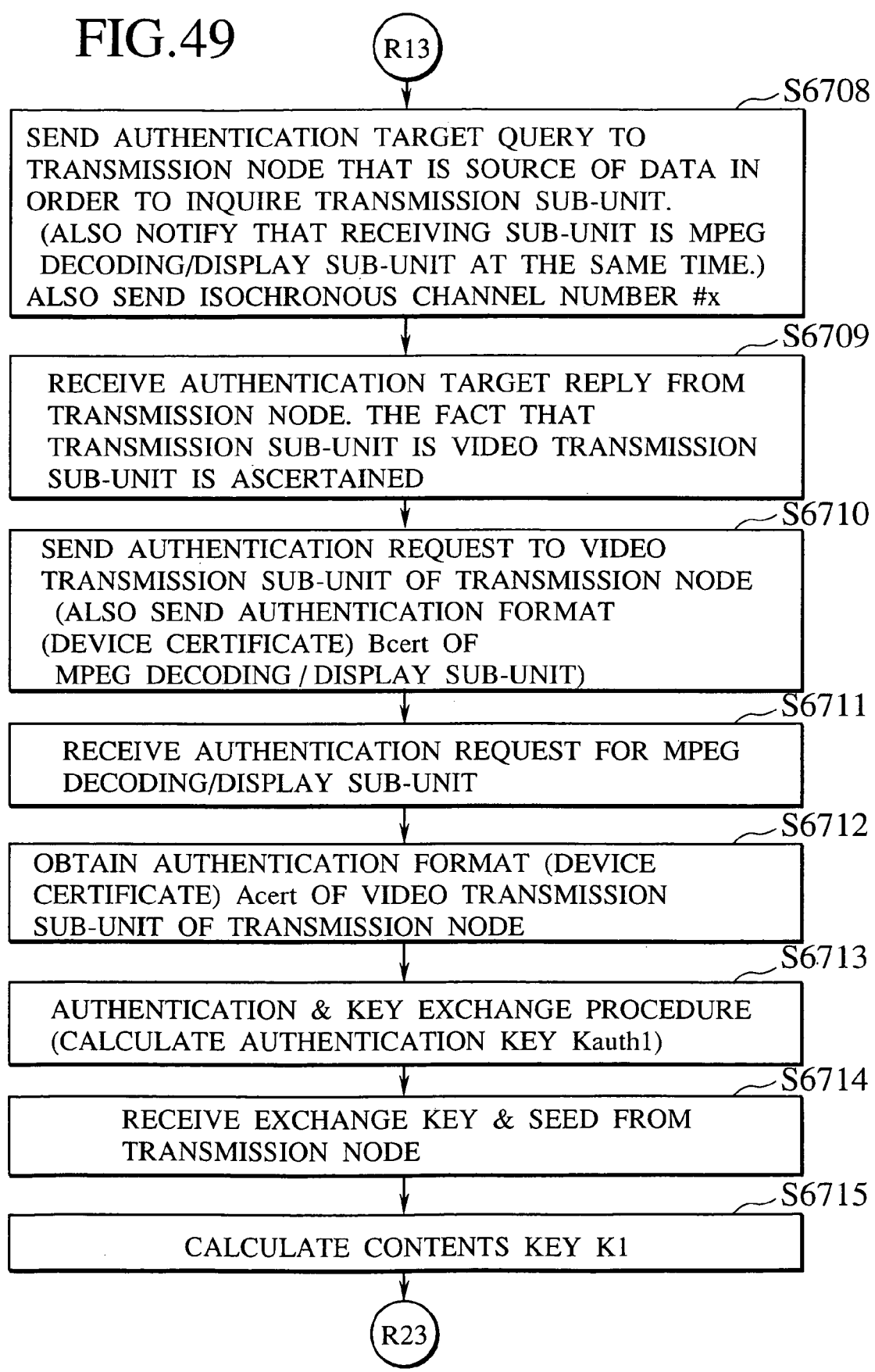
FIG. 49 is another flow chart showing an exemplary operation procedure of a home gateway according to the third embodiment of the present invention.
Figure 50:
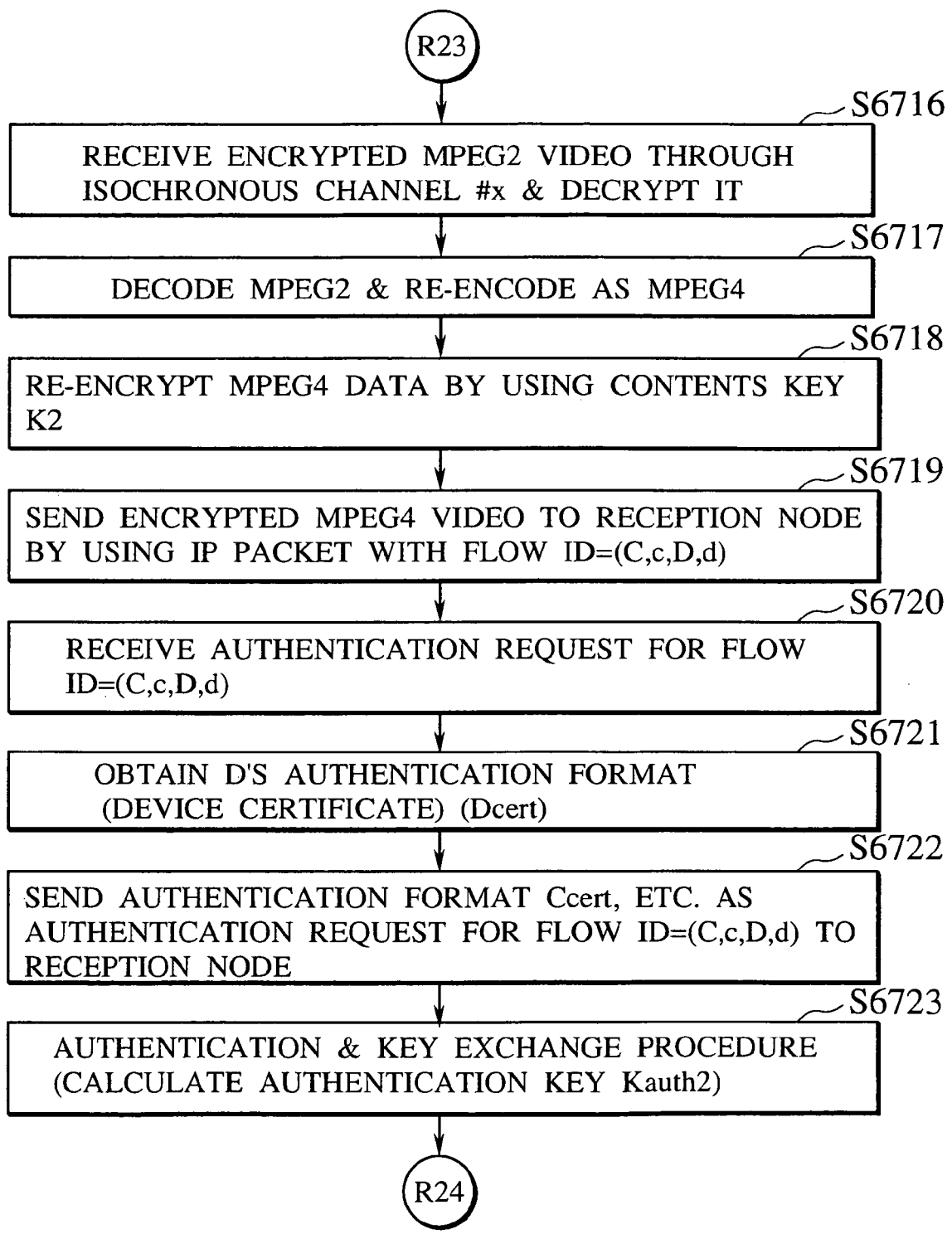
FIG. 50 is another flow chart showing an exemplary operation procedure of a home gateway according to the third embodiment of the present invention.
Figure 51:
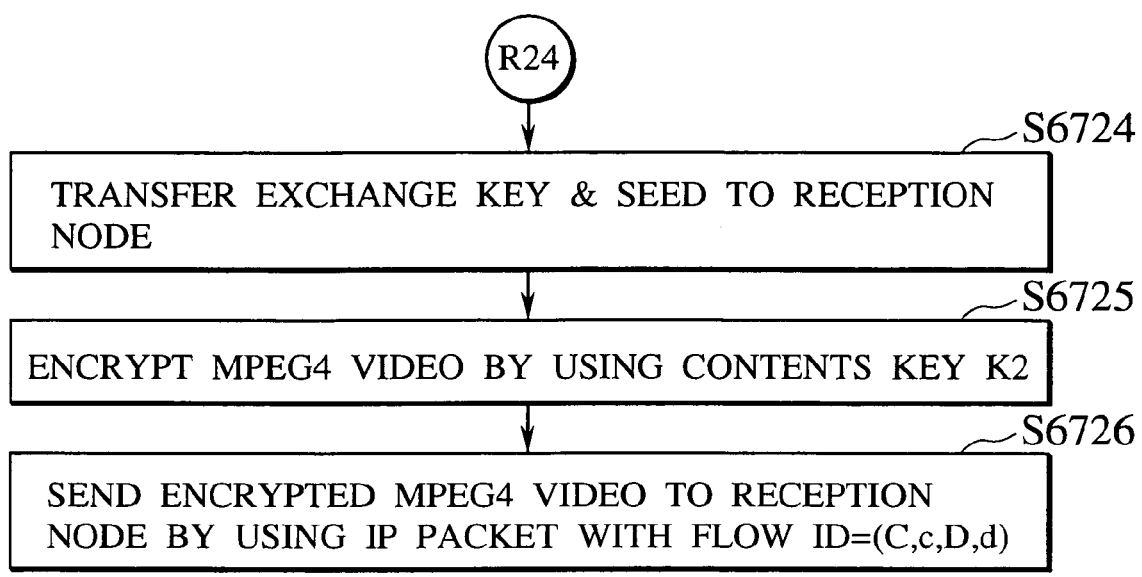
FIG. 51 is another flow chart showing an exemplary operation procedure of a home gateway according to the third embodiment of the present invention.
Figure 52:
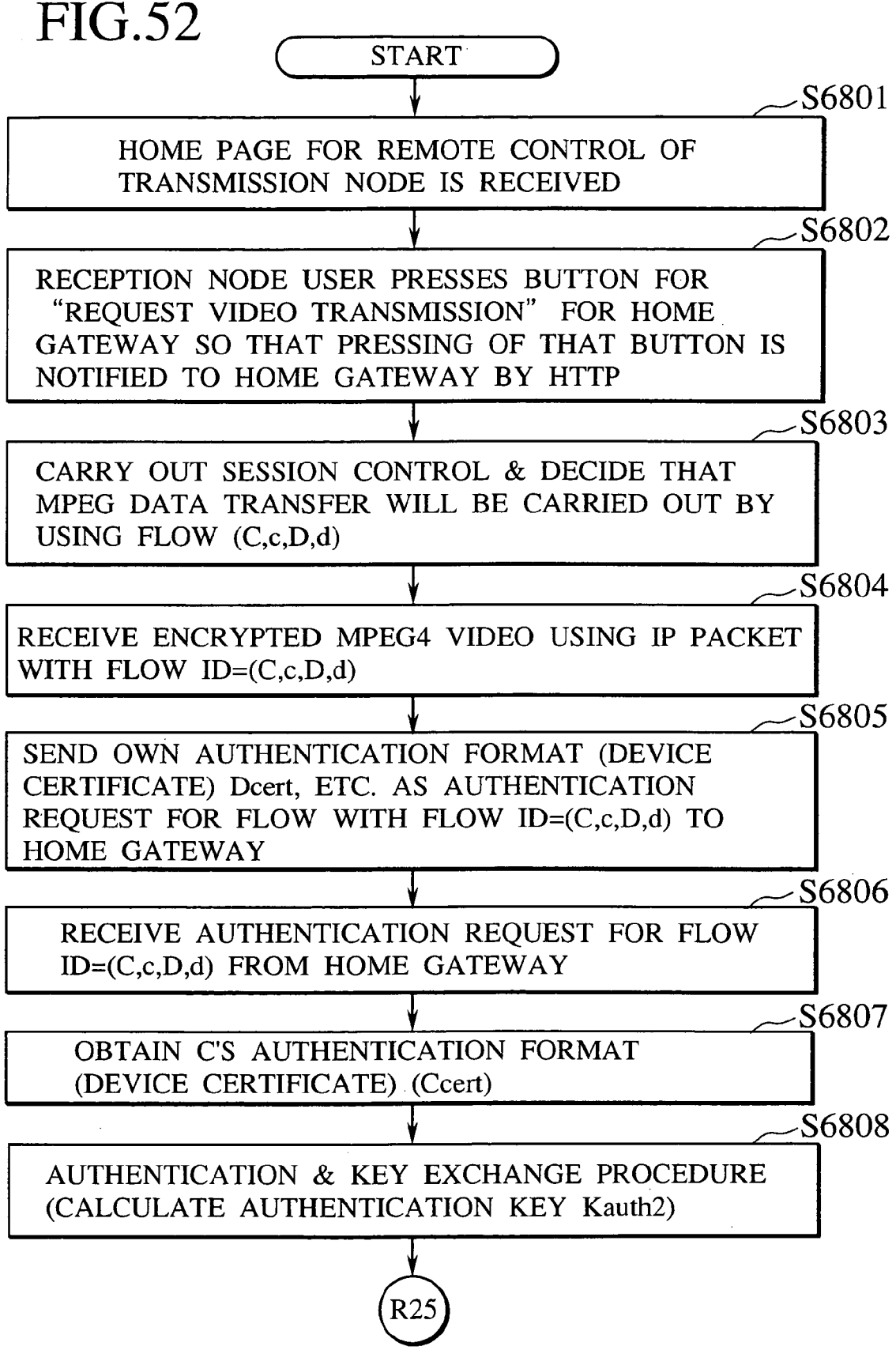
FIG. 52 is a flow chart showing an exemplary operation procedure of a reception node according to the third embodiment of the present invention.
Figure 53:
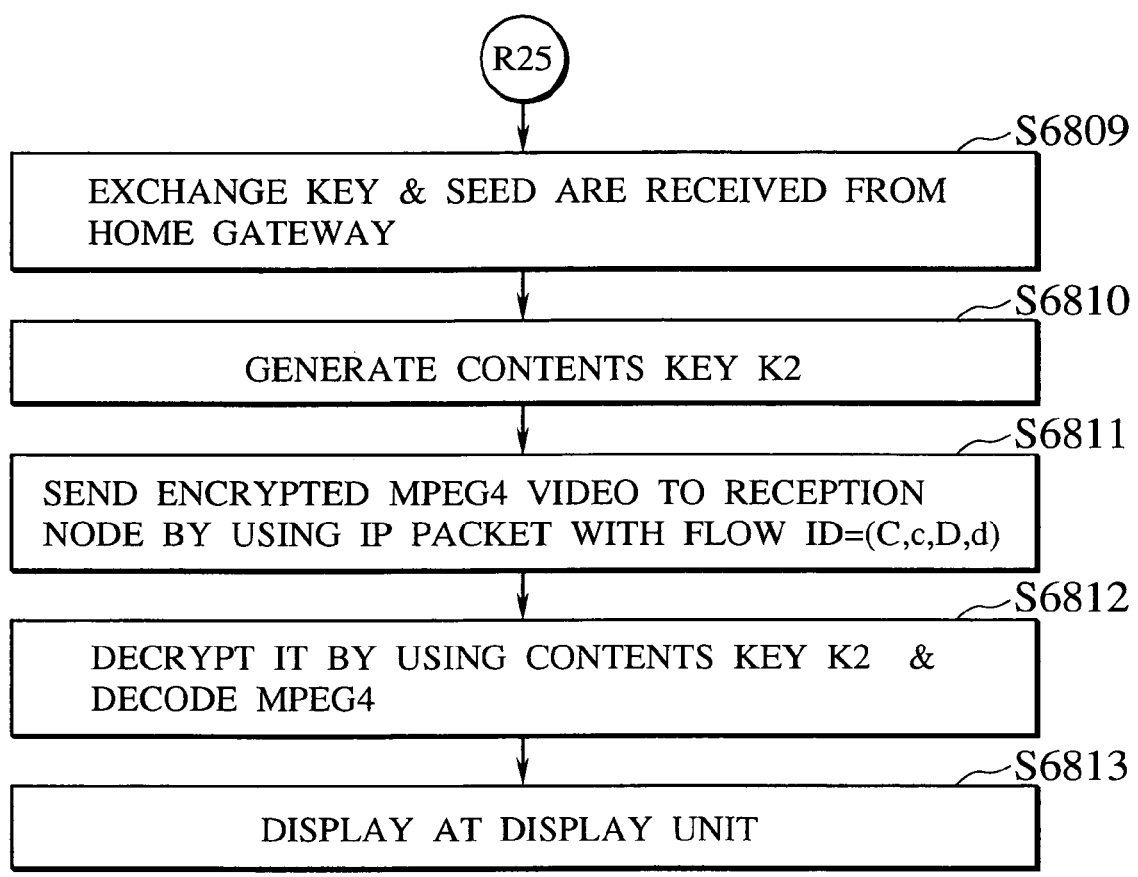
FIG. 53 is another flow chart showing an exemplary operation procedure of a reception node according to the third embodiment of the present invention.

Next, the actual operation sequence for the entire MPEG video transmission after applying the copy protection will be described with references to an exemplary overall sequence shown in FIGS. 44 and 45, an exemplary flow chart for the transmission node 6101 shown in FIGS. 46 and 47, an exemplary flow chart for the home gateway 6102 shown in FIGS. 48, 49, 50 and 51, and an exemplary flow chart for the reception node 6103 shown in FIGS. 52 and 53.

First, the home gateway 6102 collects the attribute and the configuration information of the transmission node 6101, by reading the IEEE 1212 register of the transmission node 6101, for example (steps S6501, S6601, S6701, S6502, S6602, S6702). Through this, the home gateway 6102 comprehends that the transmission node 6101 has the video transmission function, the panel function, and the authentication format (device certificate).

On a basis of this, the home gateway 6102 creates a home page for the remote controlling of the transmission node 6101 (step S6503). Basically, a display screen similar to the control panel possessed by the transmission node 6101 is created as "home page for transmission node control". Control buttons and the like that are arranged on the home page are set in correspondence to buttons of the panel sub-unit of the transmission node 6101 and a list of correspondences is described in a conversion table inside the proxy home page creation unit 6210. For example, when there is a button with a description of "playback" in the panel sub-unit of the transmission node 6101, a button with a description of "playback" is provided in the home page as well, and this relationship is described in the above mentioned conversion table. If a user of this home page presses this button, an interaction indicating that "the button is pressed" with respect to the "playback" button of the panel sub-unit of the transmission node 6101 will be returned from the home gateway 6102. A part (a) of FIG. 54 shows an exemplary form of a panel possessed by the panel sub-unit of the transmission node 6101, and a part (b) of FIG. 54 shows an exemplary form of a corresponding home page for transmission node control created by the home gateway 6102.

Now, when the reception node 6103 on the Internet accesses the home gateway 6102 through the Internet and requests a home page containing a control display screen for the transmission node 6101, this home page is sent to the reception node 6103 (steps S6504, S6801, S6703). Upon viewing this home page, suppose that a user of the reception node 6103 pressed a button for requesting the video transmission on the display screen (such as the "playback" button shown in a part (b) of FIG. 54, for example). As a result, an interaction indicating that "the playback button is pressed", for example, is notified to the home gateway 6102 via the Internet using HTTP (steps S6505, S6802, S6704).

Before or after this notification, the determination of the IP flow by which the stream to be exchanged is to be transferred, that is the set of (source IP address, source port, destination IP address, destination port), the negotiation of the session control (coding scheme, authentication scheme), etc., are carried out between the home gateway 6102 and the reception node 6103 (steps S6505, S6705, S6803). For example, the coding scheme, the authentication scheme, and the port number are determined using RTSP (Realtime Transport Streaming Protocol), SDP (Session Description Protocol), etc.

On a basis of these processings, the home gateway 6102 recognizes that the substance that carries out the video transmission is the video transmission sub-unit of the transmission node 6101, and issues commands for setting up an isochronous channel #x to be used for the data transfer and for requesting the video transmission to the video transmission sub-unit, using the AV/C protocol, etc., with respect to the transmission node 6101 (step S6506).

In response, the encrypted MPEG video is transmitted from the transmission node 6101 through the isochronous channel #x to the home gateway 6102 (steps S6507, S6603, S6604). After that, the authentication target query/reply, the authentication request, the authentication and key exchange procedure, the exchange key/seed transfer, etc., are carried out by the procedure similar to that of the IEEE 1394 side of the second embodiment, such that it becomes possible for the home gateway 6102 to calculate the contents key K1 (steps S6508 to S6514, S6605 to S6611, S6706 to S6715).

Thereafter, the home gateway 6102 receives the encrypted MPEG video through the isochronous channel #x (steps S6515, S6612, S6613), and decrypts it into MPEG2 video by using the contents key K1 at the decryption unit 6204 (steps S6516, S6517, S6716). Next, the extracted MPEG2 video is transcoded into MPEG4 video at the MPEG2/MPEG4 conversion unit 6214 (step S6518). This MPEG4 video is re-encrypted by using the contents key K2 at the encryption unit 6205 (steps S6519, S6520, S6717, S6718), and converted into IP packets. In this case, IP packets in which the source IP address is C (IP address of the home gateway), the source port number is c, the destination IP address is D (IP address of the reception node) and the destination port number is d as determined by the earlier session control procedure are generated (steps S6521, S6719).

Upon receiving these IP packets, the reception node 6103 recognizes that the received data are encrypted (step S6804). The reception node 6103 recognizes that the home gateway 6102 is transmitting these data by referring to the IP header of the arrived packets, for example, and transmits the authentication request to the home gateway 6102 (steps S6522, S6805). This authentication request packet may also be an IP packet. As the port number for the authentication request, a number allocated to the procedure for carrying out the authentication in advance may be used. At this point, the authentication request packet is transferred by attaching the flow ID (C, c, D, d) of the stream transfer. As a result, the home gateway 6102 can recognize the flow to which the authentication request is directed. Although not shown in the figure, this authentication request also contains the authentication format (device certificate) (for this stream) of the reception node, etc. Also, the fact that RTP (Realtime Transport Protocol) is used as the transport protocol, etc., may also be notified at the same time.

Upon receiving this authentication request, the home gateway 6102 recognizes that it is the authentication request for the flow (C, c, D, d), and returns the authentication request containing the authentication format (device certificate) for this flow, to the reception node (steps S6523, S6720 to S6722, S6806, S6807). At this point, this authentication request contains the above described flow ID, etc.

Next, these two nodes carries out the authentication and key exchange procedure, the exchange key/seed transfer, etc., using IP packets (steps S6524 to S6526, S6723, S6724, S6808 to S6810). As a result, it becomes possible for the reception node 6103 to generate the contents key K2.

Thereafter, when the MPEG4 data that are encrypted by using the contents key K2 are transmitted through the flow (C, c, D, d) (steps S6527 to S6533, S6725, S6726, S6811), these data can be decrypted by using the contents key K2 that is prepared as described above (step S6534). The decrypted MPEG4 data are decoded at the MPEG decoding unit 6306 (step S6812) and playbacked at the display unit 6307 (step S6813).

In this way, even in the environment where the home network and the Internet are interconnected, it is possible to carry out the transfer of data that require the contents protection such as the actual MPEG video, etc., in such a way that data are encrypted throughout the entire route so that the copying is impossible and therefore the safe data transfer is possible, as the authentication procedure and the key exchange procedure are carried out by the home gateway and the transmission node, and by the home gateway and the reception node. As a result, it becomes possible to carry out the data transfer that accounts for the copy protection even in such an interconnected environment.

Similarly as in the second embodiment, there is a possibility of data copying at a portion where "raw MPEG data" flows in the home gateway 6102, or more specifically between the decryption unit 6204, the MPEG2/MPEG4 conversion unit 6214, and the encryption unit 6205, so that it is possible to provide a measure against the data copying at this portion, such as sealing this portion within a single LSI, for example.

Fourth Embodiment

Referring now to FIG. 55 to FIG. 64, the fourth embodiment of a relay device and a communication device according to the present invention will be described in detail.

In the first embodiment, the authentication and key exchange scheme in the case where the relay node is connected to both the IEEE-1394 bus and the radio network and the encrypted video data are to be exchanged between the transmission node on the IEEE 1394 bus and the radio node on the radio network has been described. In the first embodiment, the actual authentication and key exchange as represented by the exchange of the authentication format (device certificate), etc., is directly carried out between the transmission node and the radio node, and the relay node is provided in a form of transparently relaying these data.

In contrast, in this fourth embodiment, the authentication and key exchange is carried out separately between the transmission node and the relay node and between the relay node and the radio node, as in the second embodiment. Here, however, unlike the second embodiment, this fourth embodiment uses a scheme in which the decryption and the re-encryption of the contents data at the relay node are unnecessary. Namely, the second embodiment employs a procedure in which the encryption in the IEEE 1394 section of the arrived data is decrypted and then re-encrypted for the radio section at the relay node, whereas this fourth embodiment employs a scheme in which the encrypted data arrived from the IEEE 1394 bus side can be transferred directly to the radio network.

Figure 55:
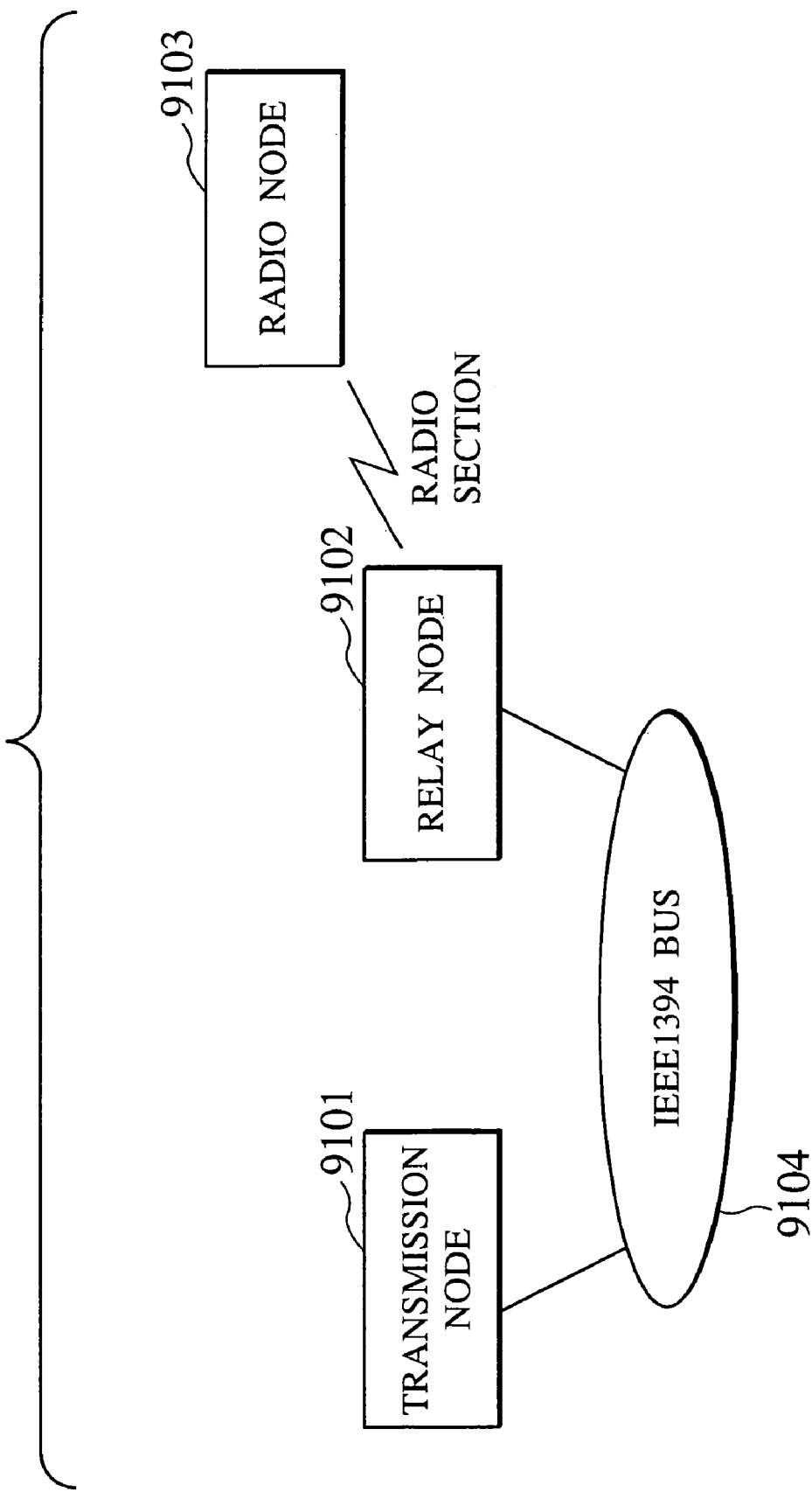
FIG. 55 is a schematic diagram showing an exemplary overall configuration of a network according to the fourth embodiment of the present invention.

FIG. 55 shows an exemplary overall configuration of a home network at some home, which is basically the same as in the second embodiment.

Figure 56:
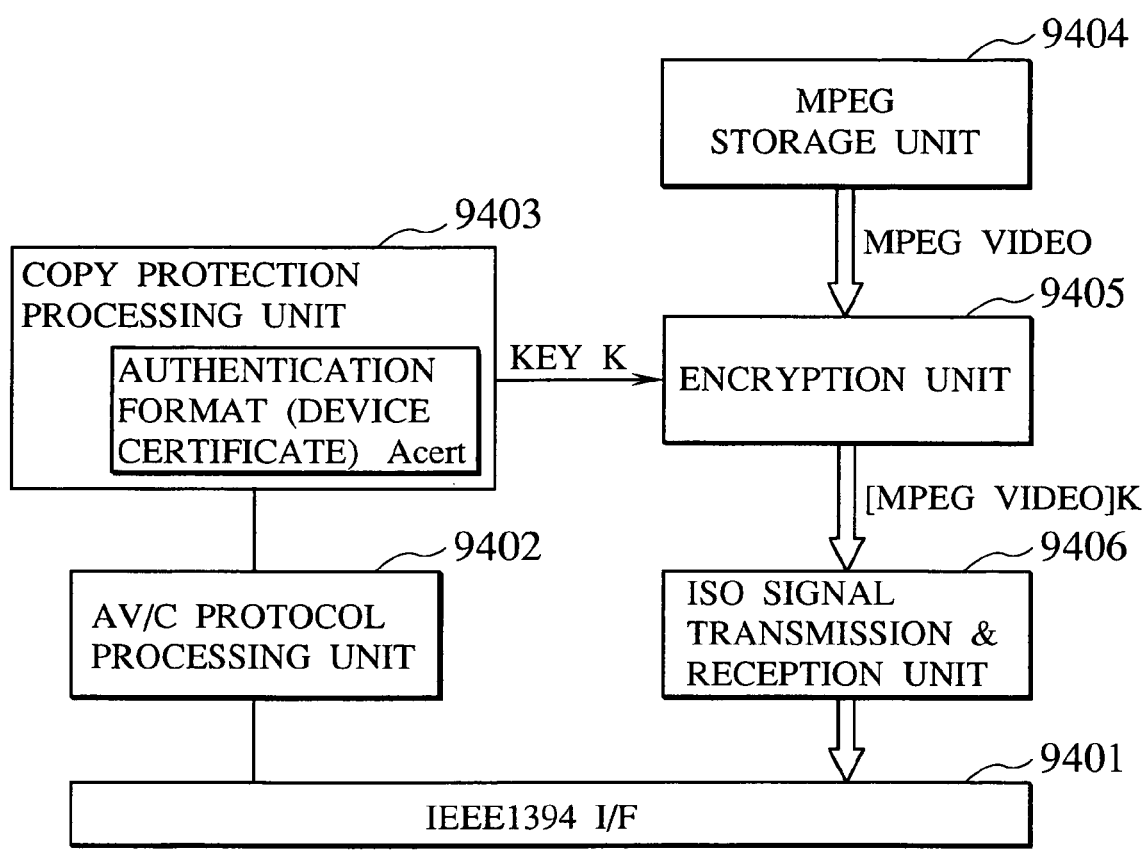
FIG. 56 is a block diagram showing an exemplary internal configuration of a transmission node in the network of FIG. 55.

FIG. 56 shows an exemplary internal configuration of the transmission node 9101, which is also basically the same as in the second embodiment. The authentication format (device certificate) Acert is provided one for each node.

Figure 57:
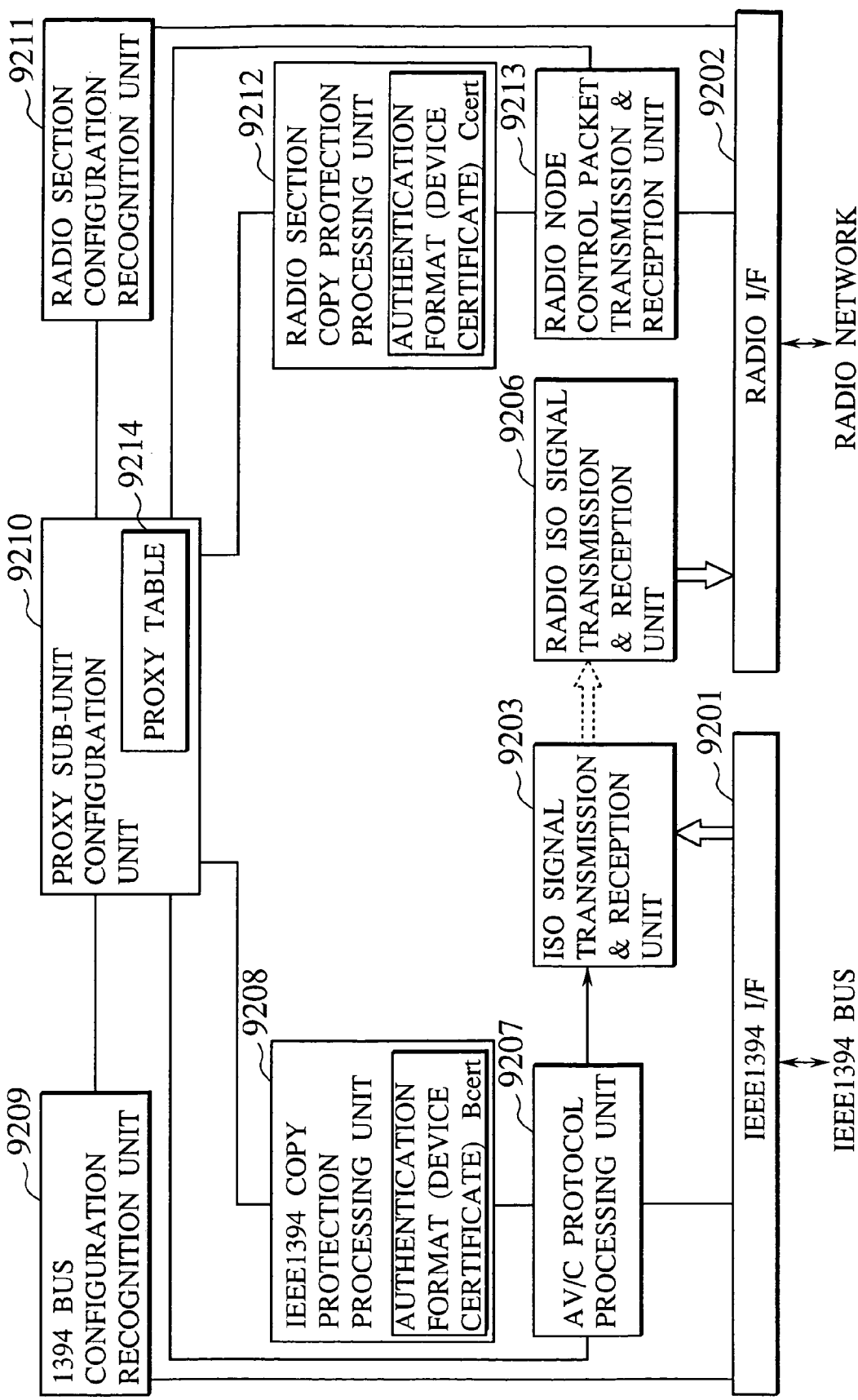
FIG. 57 is a block diagram showing an exemplary internal configuration of a relay node in the network of FIG. 55.

FIG. 57 shows an exemplary internal configuration of the relay node 9102. The authentication formats (device certificates) Bcert and Ccert are provided one for each network interface (Bcert for the IEEE 1394 side and Ccert for the radio network side). This relay node 9102 is similar to that of the second embodiment except that the encrypted stream signals are directly exchanged between the ISO signal transmission and reception unit 9203 on the IEEE 1394 side and the radio ISO signal transmission and reception unit 9206 on the radio network side (without going through the process of decryption/re-encryption).

Figure 58:
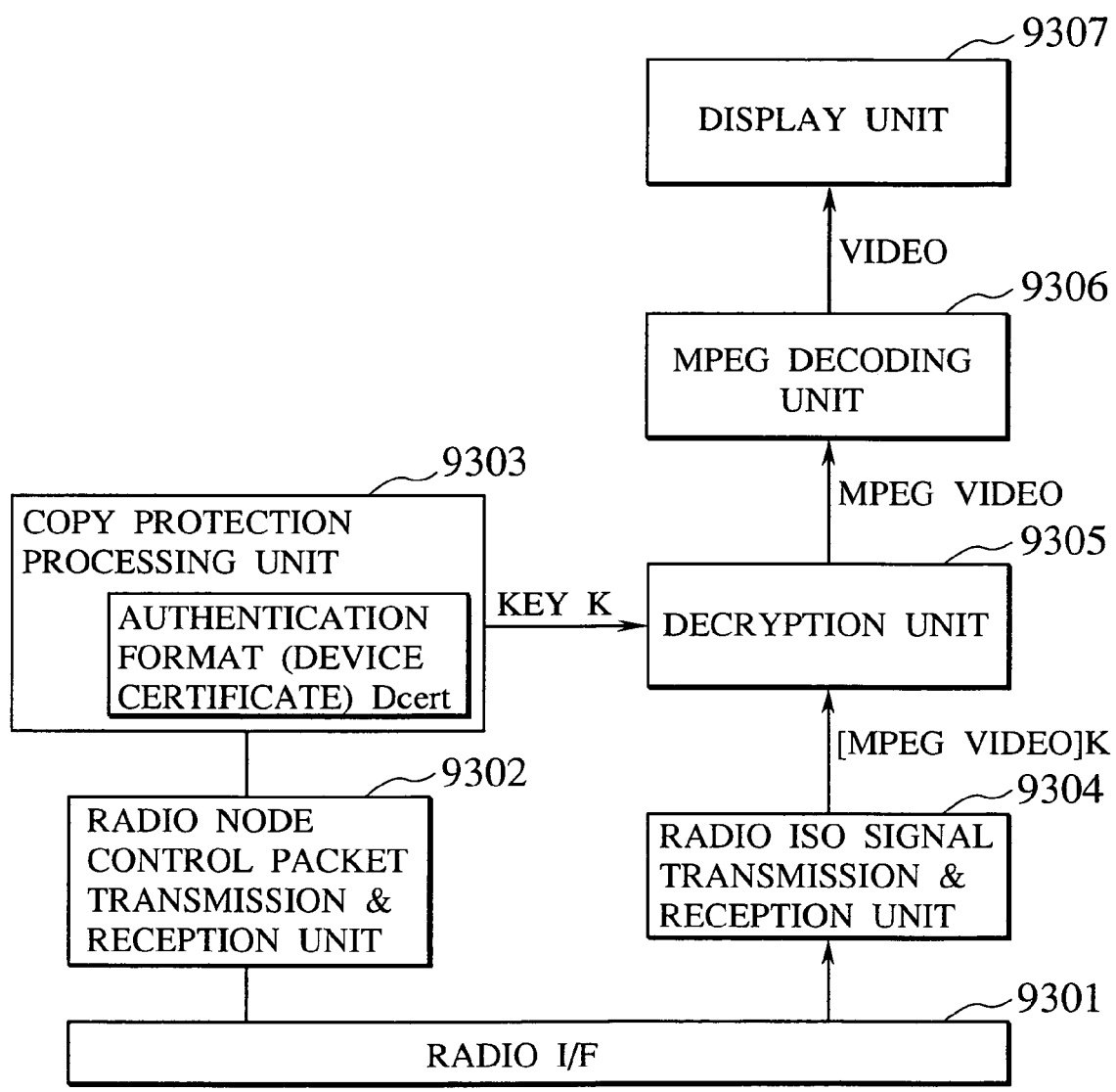
FIG. 58 is a block diagram showing an exemplary internal configuration of a radio node in the network of FIG. 55.

FIG. 58 shows an exemplary internal configuration of the radio node 9103, which is also basically the same as that of the second embodiment. The authentication format (device certificate) Dcert is provided one for each node.

As in the previous embodiments, the relay node 9102 has proxy service functions for services on the radio network with respect to the IEEE 1394 side and services on the IEEE 1394 with respect to the radio network side, but the details of these functions will be omitted here.

Figure 59:
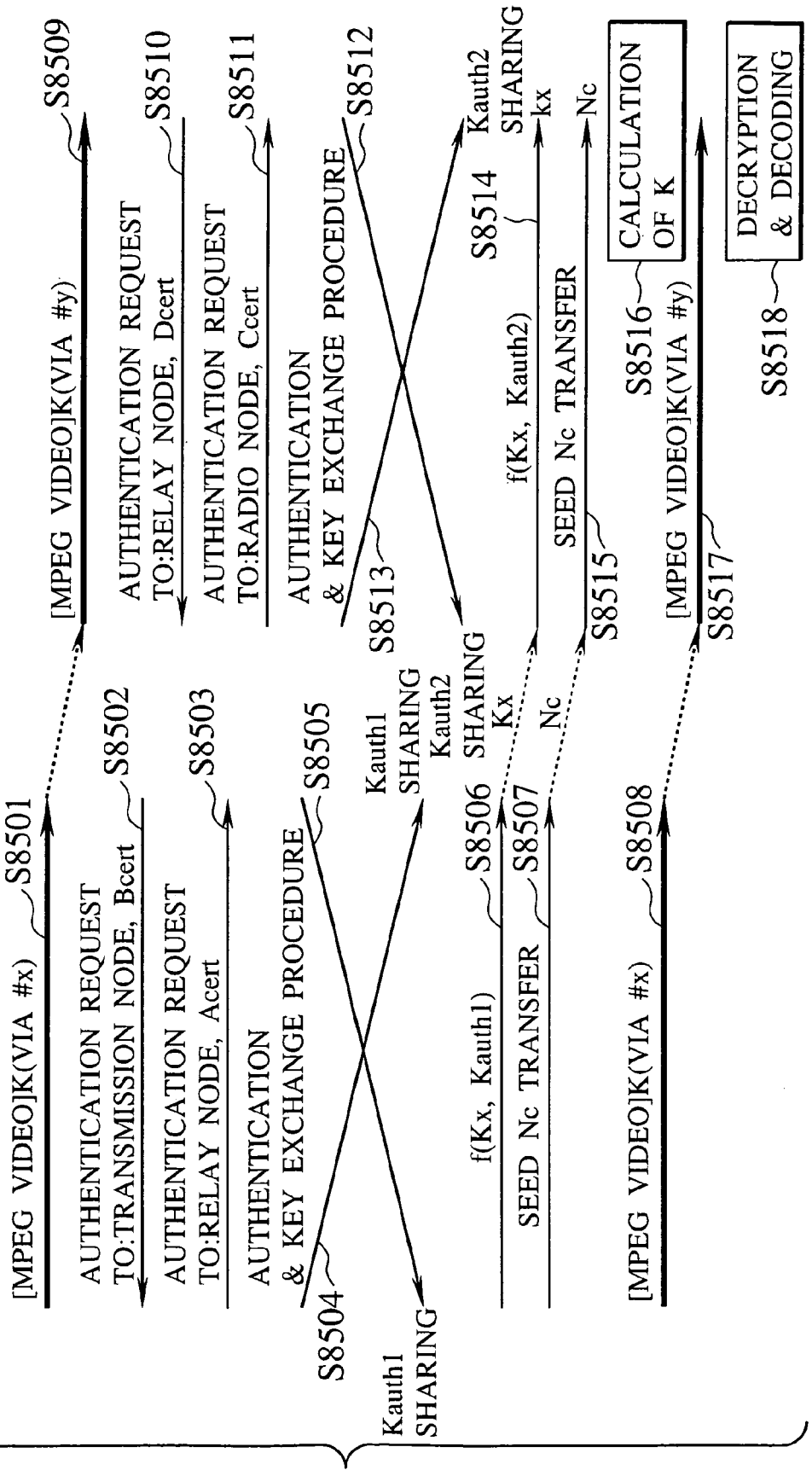
FIG. 59 is a sequence chart showing an exemplary overall sequence in the fourth embodiment of the present invention.

Next, FIG. 59 shows an exemplary overall sequence of this embodiment. Similarly as in the previous embodiments, the relay node is advertising the service (video transmission sub-unit) provided by the transmission node as a proxy to the radio network side, and when (the video decoding sub-unit of) the radio node requests the service (MPEG video transfer request) with respect to the proxy function of the relay node, the relay node makes the actual video transfer request with respect to the video transmission sub-unit of the transmission node that is providing the actual service. It is assumed that the actual video data are to be transferred in an encrypted form, through the isochronous channel #x on the IEEE 1394 and through the radio isochronous channel #y on the radio network. The details are the same as in the previous embodiments so that the detailed description will be omitted here.

Figure 60:
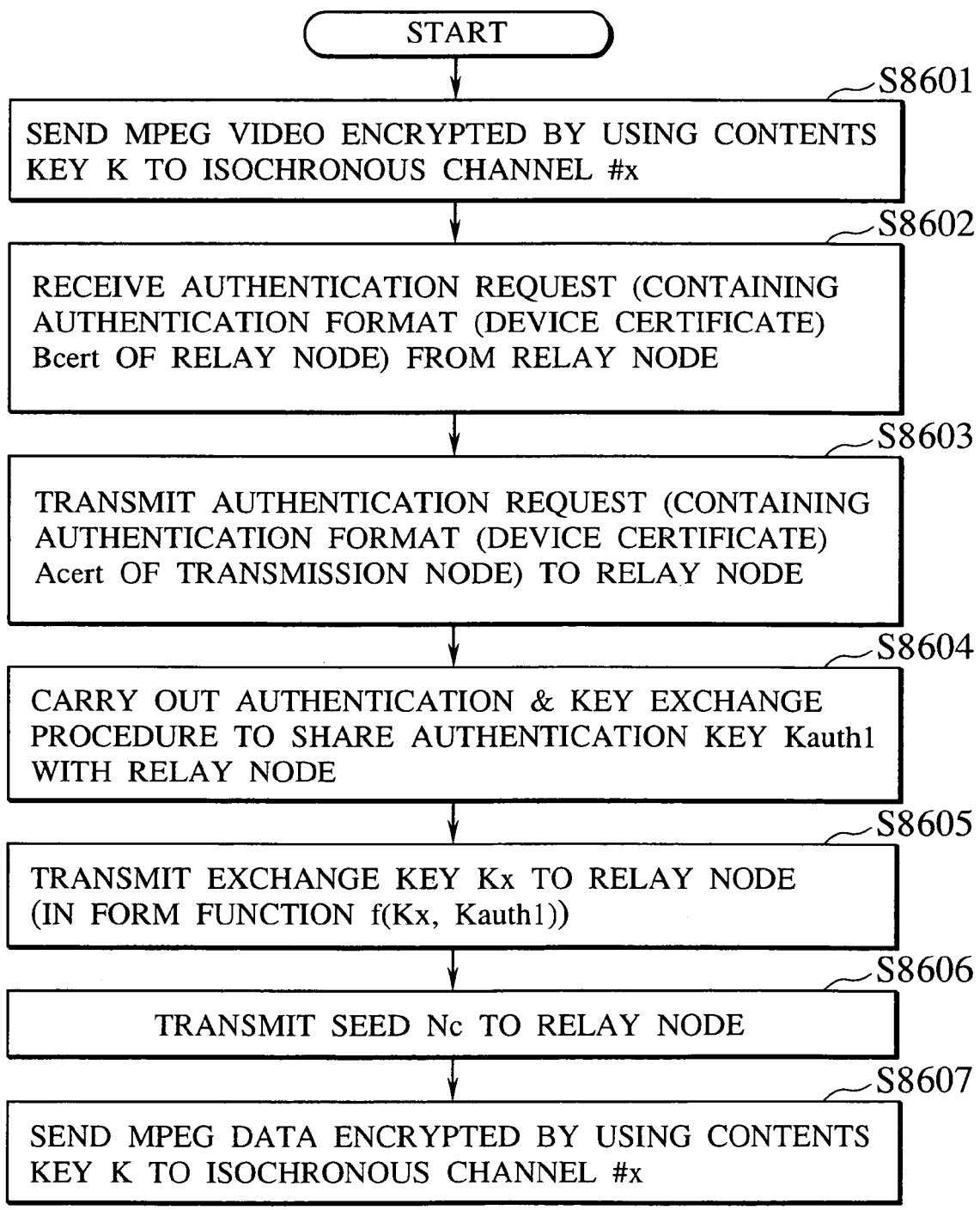
FIG. 60 is a flow chart showing an exemplary operation procedure of a transmission node according to the fourth embodiment of the present invention.
Figure 61:
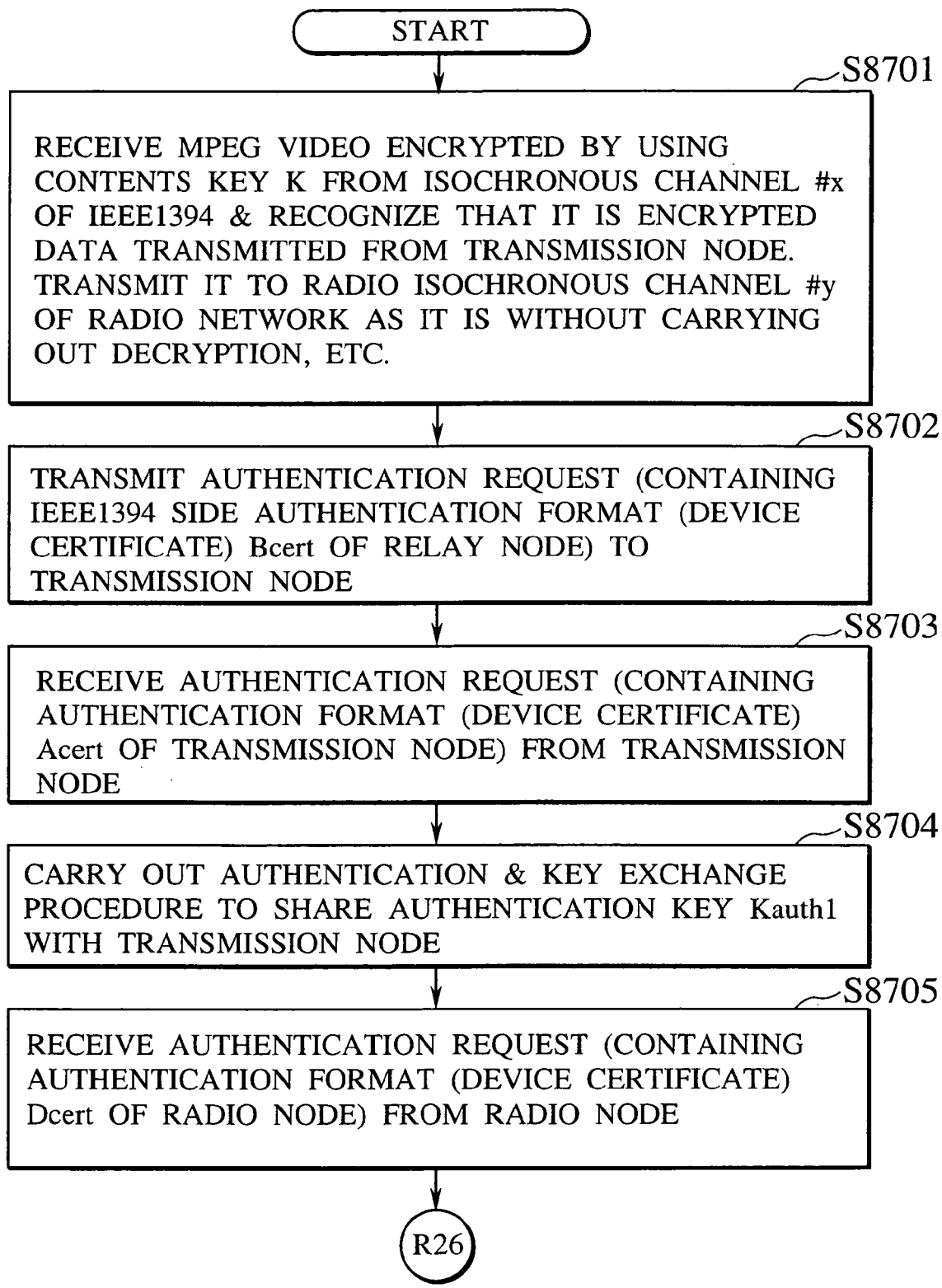
FIG. 61 is a flow chart showing an exemplary operation procedure of a relay node according to the fourth embodiment of the present invention.
Figure 62:
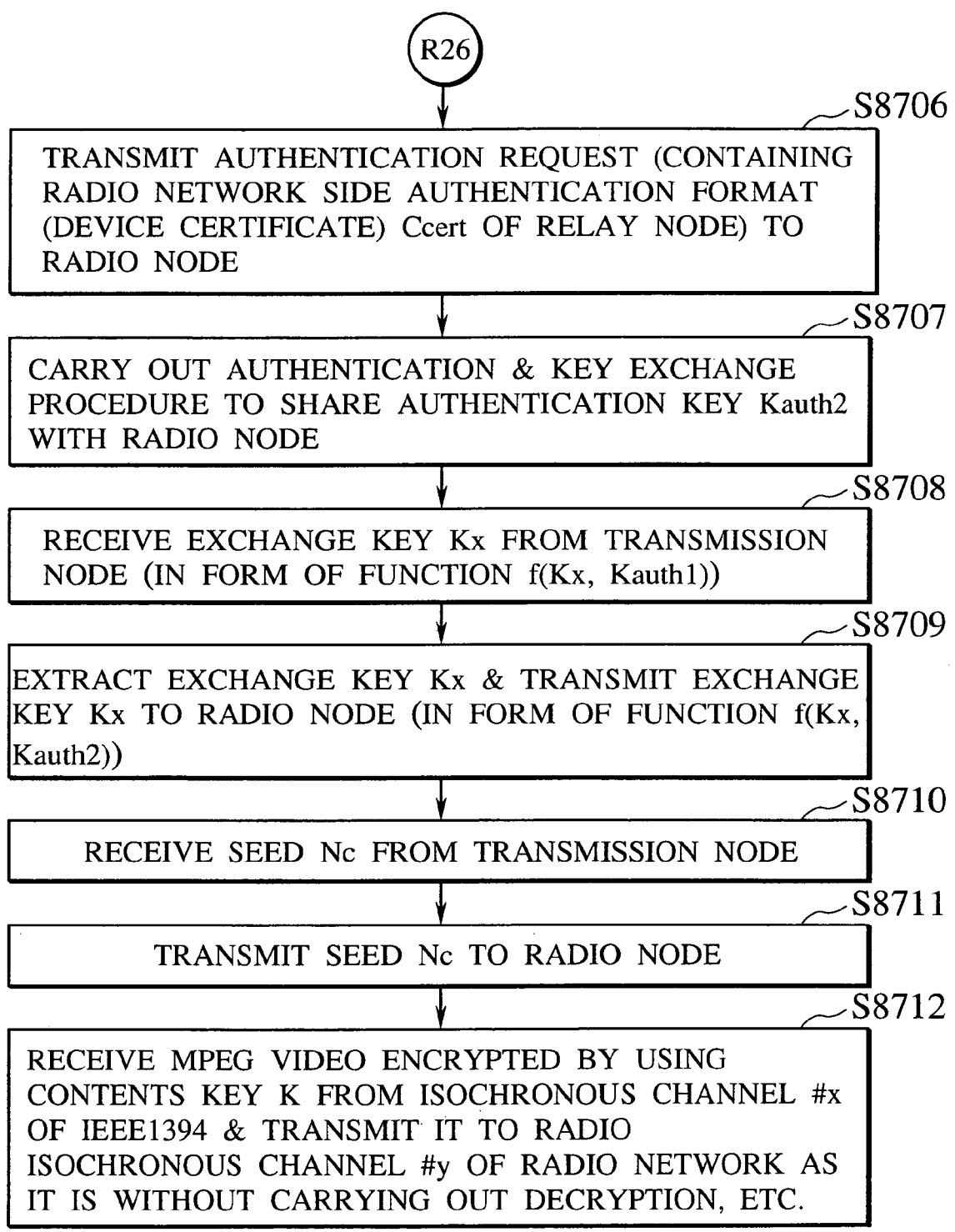
FIG. 62 is another flow chart showing an exemplary operation procedure of a relay node according to the fourth embodiment of the present invention.
Figure 63:
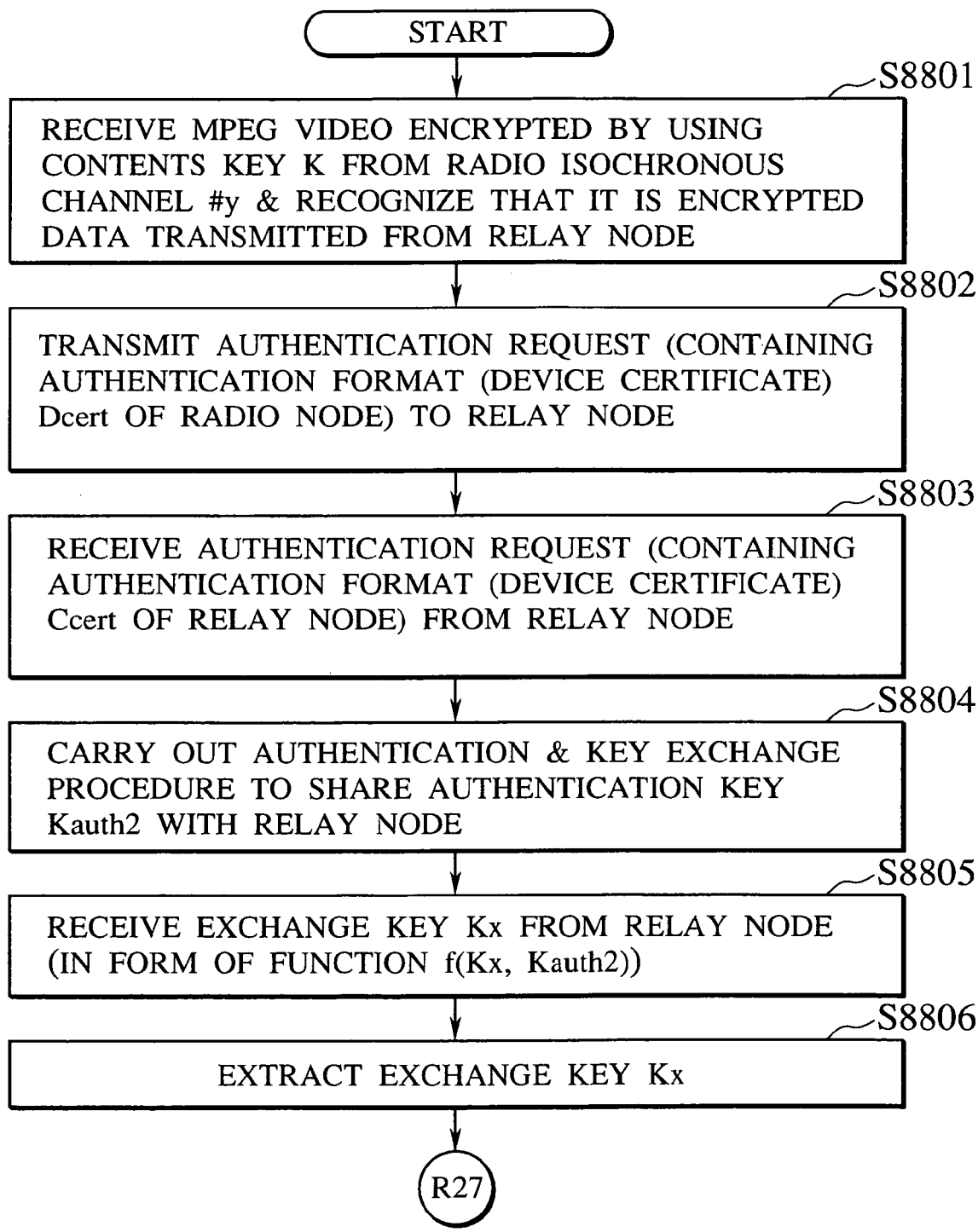
FIG. 63 is a flow chart showing an exemplary operation procedure of a radio node according to the fourth embodiment of the present invention.
Figure 64:
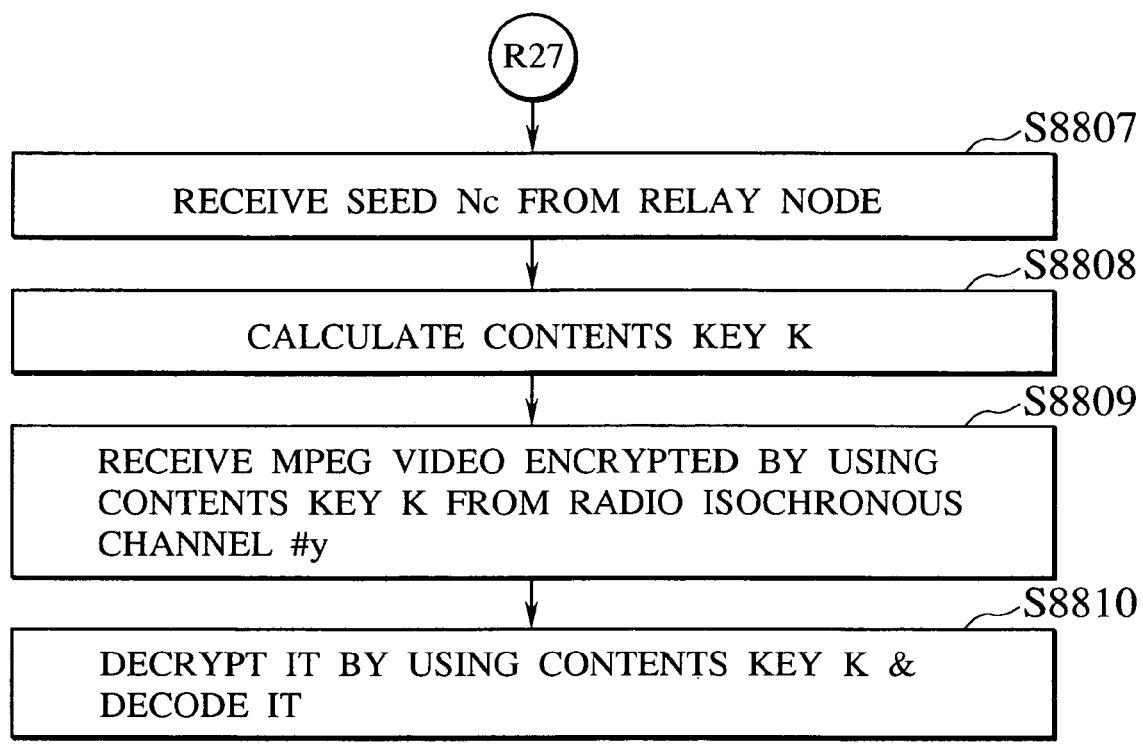
FIG. 64 is another flow chart showing an exemplary operation procedure of a radio node according to the fourth embodiment of the present invention.

FIG. 60 shows an exemplary operation procedure of the transmission node 9101, FIGS. 61 and 62 show an exemplary operation procedure of the relay node 9102, and FIGS. 63 and 64 show an exemplary operation procedure of the radio node 9103.

In this embodiment, the procedure basically follows the authentication and key exchange scheme called "5C Digital Transmission Content Protection Specification" which is the copyright protection scheme on the IEEE 1394. Note that this embodiment is directed to the case of carrying out the authentication and key exchange in units of nodes (the case of carrying it out in units of sub-units will be described in the fifth embodiment).

Now, the transmission node 9101 transfers the MPEG video that is encrypted by using the contents key K on the isochronous channel #x of the IEEE 1394 (steps S8501, S8601, S8701). The relay node 9102 that received this MPEG video transfers this MPEG video directly (leaving the received MPEG video in a form encrypted by using the contents key K) to the radio isochronous channel #y on the radio network side (steps S8509, S8701).

The relay node 9102 that recognized that data received through the isochronous channel #x are encrypted then recognizes that there is a need to carry out the authentication and key exchange with the transmission node 9101 by referring to the transmission node ID field (SID field) of the CIP header of the arrived data, for example (step S8801), and transfers the authentication request packet containing the authentication format (device certificate) Bcert, to the transmission node 9101 (steps S8502, S8702).

The transmission node 9101 that received this packet then transmits the authentication request packet containing the authentication format (device certificate) Acert of the transmission node, to the relay node 9102 (Steps S8503, S8602, S8603, S8703).

Next, the authentication and key exchange procedure is carried out such that the authentication key Kauth1 is secretly shared between the transmission node 9101 and the relay node 9102 (steps S8504, S8505, S8604, S8704).

In the IEEE 1394 copyright protection scheme, the contents key K is calculated by a function J with three variables including the exchange key Kx, the seed Nc, and the encryption control information EMI. Namely, K=J(Kx, Nc, EMI). Here, the EMI is a value that is always attached to the encrypted data to be transferred. Consequently, there is also a need for the transmission node 9101 to notify values of the exchange key Kx and the seed Nc to the receiving side (the relay node, as well as the radio node in the case of this embodiment).

For this reason, the transmission node 9101 transmits this information to the relay node 9102, in a form of f(Kx, Kauth1) using the authentication key Kauth1 that is shared with the relay node 9102 and the known function f (steps S8506, S8605, S8708, S8709). The relay node 9102 can calculate the value of Kx from this value. Similarly, the value of the seed Nc is transferred from the transmission node 9101 to the relay node 9102 (steps S8507, S8606, S8710). At this point, the relay node 9102 has recognized the values of Kx and Nc that are necessary in generating the contents key K for decryption.

Now, the similar procedure is also carried out between the relay node 9102 and the radio node 9103 (steps S8510 to S8513, S8705 to S8707, S8802 to S8804). This procedure is similar to the authentication and key exchange procedure between the transmission node 9101 and the relay node 9102 so that the details will be omitted here. Note here that encrypted data to be transferred on the radio isochronous channel #y of the radio network may also be attached with address information, etc., by which the relay node 9102 that is the source node can be identified.

Now, suppose that the authentication key Kauth2 is shared between the relay node 9102 and the radio node 9103. In this embodiment, the relay node 9102 forwards the encrypted MPEG video directly to (the radio isochronous channel #y of) the radio network without decrypting it, so that there is a need for the relay node 9102 to notify the values of the exchange key Kx and the seed Nc that are the same as in the IEEE 1394 section, to the radio node 9103. (Conversely, if this can be notified, it becomes possible for the radio node 9103 to carry out the decryption. Here, it is assumed that the IEEE 1394 section and the radio network section are operated by the same contents protection policy.) Consequently, the relay node 9102 transmits the respective values of Kx and Nc that are calculated from data received at the steps S8506 and S8507, to the radio node 9103 similarly (steps S8514, S8515, S8709, S8711, S8805 to S8807). More specifically, the value of Kx is transmitted to the radio node 9103 by calculating f(Kx, Kauth2) using the value of the authentication key Kauth2, while the value of Nc is transferred as it is.

The radio node 9103 can recognize the values of Kx and Nc by using the same procedure as the relay node in this way, so that it becomes possible for the radio node 9103 to calculate the value of the contents key K using the similar function J (step S8516).

Thus, when the MPEG video that is encrypted by using the contents key K and transmitted from the transmission node 9101 is transferred up to the radio node 9103 as the relay node 9102 forwards it directly without carrying out the decryption (steps S8508, S8517, S8607, S8712, S8809), it can be decrypted by using the value of the contents key K that is calculated at the earlier step S8516 (steps S8518, S8810). Then, decoding, displaying, etc., of the MPEG video are carried out.

Note that this embodiment has been described by assuming that the radio isochronous channel is defined on the radio network and the encrypted MPEG video is transferred on this radio isochronous channel, but the similar scheme for forwarding the values of Kx and Nc from the relay node to the radio node is also applicable to the case where the QOS data transfer on the radio network transfers radio frames similar to the Ethernet as in the second embodiment.

In other words, the decryption and the re-encryption at the relay node 9102 can be made unnecessary by the scheme of this embodiment, so that the fast packet transfer becomes possible and therefore the low cost relay node can be realized.

Note that, in this case, even if there is another node other than the transmission node 9101 on the IEEE 1394 side, it is impossible to transmit the encrypted data (data having the same EMI, to be precise) that are encrypted by using another contents key from that another node to the radio node 9103 via the relay node 9102. In the mechanism adopted here, the contents key is basically to be determined by the transmission node 9101 of data so that there is a high probability for that another node to select another contents key. However, the contents key K is already uniquely defined between the relay node 9102 and the radio node 9103. That is, only one contents key can be shared for the same EMI value between the relay node 9102 and the radio node 9103. Consequently, at most one contents key can be used between these two nodes so that even if data (encrypted by using another contents key) from another node are received, another contents key cannot be generated at a time of transferring data from the relay node 9102 to the radio node 9103 so that data cannot be decrypted.

Thus, in the case where there is a transmission request for the encrypted data that requires the use of another contents key with respect to a node (the radio node 9103 in the case of this embodiment) that is already transmitting encrypted data (the case where there is a service request with respect to the proxy service for another node of the IEEE 1394, for example), the above noted contradiction can be prevented if the relay node 9102 refuses such a request. The similar effect can also be achieved if the relay node 9102 conceals the other services (sub-units) to the radio node 9103 (by interrupting the proxy service providing itself, or by interrupting the proxy service that is associated with the encrypted stream transfer, etc.) in the case where the encrypted data transmission with respect to the radio node 9103 is already taking place.

Fifth Embodiment

Referring now to FIG. 65 to FIG. 68, the fifth embodiment of a relay device and a communication device according to the present invention will be described in detail.

The fourth embodiment is directed to the scheme in which the authentication and key exchange is carried out separately between the transmission node and the relay node and between the relay node and the radio node, and there is no need to carry out the decryption and the re-encryption at the relay node.

In contrast, this fifth embodiment is directed to the scheme in which there is also no need to carry out the decryption and the re-encryption at the relay node, but the authentication and key exchange on the radio network side can be carried out in units of sub-units as in the second embodiment, so that a plurality of contents keys can be used between the same two nodes. According to this embodiment, the simultaneous reception of the encrypted data from a plurality of transmission nodes on the IEEE 1394 becomes possible.

FIG. 65 shows an exemplary overall configuration of a home network at some home, which is basically similar to that of the fourth embodiment except that there are two transmission nodes (P and Q).

The internal configuration of each of the transmission nodes 9801 and 9811 is the same as in the fourth embodiment.

The internal configuration of the relay node 9802 is also similar to that of the fourth embodiment except that the authentication and key exchange is to be carried out in units of nodes on the IEEE 1394 side while the authentication and key exchange is to be carried out in units of sub-units on the radio network side.

The internal configuration of the radio node 9803 is also similar to that of the fourth embodiment except that the authentication and key exchange is to be carried out in units of sub-units.

Note that the operation procedures of the transmission nodes 9801 and 9811 and the radio node 9803 are the same as in the fourth embodiment. Also, the operation procedure of the relay node 9802 in the case of relaying with respect to a single transmission node is basically the same as in the fourth embodiment.

As in the previous embodiments, the relay node 9802 has proxy service functions for services on the radio network with respect to the IEEE 1394 side and services on the IEEE 1394 with respect to the radio network side, but the details of these functions will be omitted here.

Next, FIG. 66 shows an exemplary operation procedure of the relay node 9802 in the case of relaying with respect to plural transmission nodes, and FIGS. 67 and 68 show an exemplary overall sequence of this embodiment. Similarly as in the previous embodiments, the relay node is advertising the service (video transmission sub-unit) provided by the transmission node as a proxy to the radio network side, and when (the video decoding sub-unit of) the radio node requests the service (MPEG video transfer request) with respect to the proxy function of the relay node, the relay node makes the actual video transfer request with respect to the video transmission sub-unit of the transmission node that is providing the actual service. It is assumed that the actual video data are to be transferred in an encrypted form, through the isochronous channel #x on the IEEE 1394 and through the radio isochronous channel #y on the radio network. The details are the same as in the previous embodiments so that the detailed description will be omitted here.

In this embodiment, the procedure also basically follows the authentication and key exchange scheme called "5C Digital Transmission Content Protection Specification" which is the copyright protection scheme on the IEEE 1394.

Now, the transmission node P 9801 transfers the MPEG video that is encrypted by using the contents key K1 on the isochronous channel #x of the IEEE 1394 (steps S9201, S9301). Similarly as in the fourth embodiment, it is assumed that the contents key K1 is calculated by K1=J(Kxp, Ncp, EMI). The relay node 9802 that received this MPEG video transfers this MPEG video directly (leaving the received MPEG video in a form encrypted by using the contents key K1) to the radio isochronous channel #y on the radio network side (steps S9209, S9301).

The procedure (steps S9202 to S9207, S9302) by which the relay node 9802 makes the authentication request with respect to the transmission node P, carries out the key exchange, and obtains the exchange key Kxp and the seed Ncp is the same as in the fourth embodiment, so that the details will be omitted here. At this point, the relay node 9802 has recognized the values of Kxp and Ncp that are necessary for decryption.

Now, the similar authentication and key exchange procedure is also carried out between the relay node 9802 and the radio node 9803 (steps S9210 to S9217, S9303). This procedure is similar to the authentication and key exchange procedure between the transmission node and the relay node in the second embodiment so that the details will be omitted here. Note here that the authentication target query, the authentication target reply, or the authentication request may be made by mounting thereon a sub-unit ID, a channel number, or an identifier of a plug that will carry out transmission and reception of the encrypted data. In this way, it becomes possible for the relay node 9802 or the radio node 9803 to identify the encrypted data to which the authentication and key exchange procedure is directed, and it becomes possible to notify different keys for the encrypted data using different keys even in the authentication and key exchange between the same two nodes, as will be described below. In the case of including the channel number in the authentication request, the authentication target query of the step S9210 and the authentication target reply of the step S9211 become unnecessary.

Now, suppose that the authentication key Kauth1 is shared between the relay node 9802 and the radio node 9803. In this embodiment, the relay node 9802 also forwards the encrypted MPEG video directly to (the radio isochronous channel #y of) the radio network without decrypting it, so that there is a need for the relay node 9802 to notify the values of the exchange key Kxp and the seed Ncp, to the radio node 9803. (Conversely, if this can be notified, it becomes possible for the radio node 9803 to carry out the decryption.) Consequently, the relay node 9802 transmits the respective values of Kxp and Ncp that are calculated from data received at the steps S9206 and S9207, to the radio node 9803 similarly (steps S9216, S9217). More specifically, the value of Kxp is transmitted to the radio node 9803 by calculating f(Kxp, Kauth1) using the value of the authentication key Kauth1 (step S9216).

The radio node 9803 can recognize the values of Kxp and Ncp by using the same procedure as the relay node 9802 in this way, so that it becomes possible for the radio node 9803 to calculate the value of the contents key K1 using the similar function J (step S9218).

Thus, when the MPEG video that is encrypted by using the contents key K1 and transmitted from the transmission node P 9801 is transferred up to the radio node 9803 as the relay node 9802 forwards it directly without carrying out the decryption (steps S9208, S9219), it can be decrypted by using the value of the contents key K1 that is calculated at the earlier step S9218 (steps S9220). Then, decoding, displaying, etc., of the MPEG video are carried out.

By the scheme of this embodiment, the decryption and the re-encryption at the relay node 9802 also can be made unnecessary by the scheme of this embodiment, so that the fast packet transfer becomes possible and therefore the low cost relay node can be realized.

Now, the case where another transmission node Q 9811 transmits data encrypted by using another contents key K2 with respect to the radio node 9803 via the relay node 9802 at the same time (steps S9221, S9229, S9304) will be considered.

Similarly as in the first half of this embodiment, the authentication and key exchange is carried out between the transmission node Q 9811 and the relay node 9802 (steps S9222 to S9227) so that the relay node 9802 can obtain the respective values of the exchange key Kxq and the seed Ncq.

In this embodiment, the authentication between the relay node 9802 and the radio node 9803 is to be carried out in units of sub-units, so that if transmission and reception of the encrypted data are carried out between different sub-units, a plurality of authentication and key exchange procedures can be carried out between the relay node 9802 and the radio node 9803.

Namely, similarly as in the first half of this embodiment, the authentication and key exchange is carried out between sub-units that are different from those of the first half of this embodiment (steps S9230 to S9235, S9305). Then, the relay node 9802 forwards the exchange key Kxq and the seed Ncq between the transmission node Q 9811 and the own node (relay node 9802), to the radio node 9803 (steps S9236, S9237, S9305, S9306).

The radio node 9803 can recognize the values of Kxq and Ncq in this way, so that it becomes possible for the radio node 9803 to calculate the value of the contents key K2 using the similar function J (step S9238).

Thus, when the MPEG video that is encrypted by using the contents key K2 and transmitted from the transmission node Q 9811 is transferred up to the radio node 9803 as the relay node 9802 forwards it directly without carrying out the decryption (steps S9228, S9229), it can be decrypted by using the value of the contents key K2 that is calculated at the earlier step S9238 (steps S9240). In other words, the simultaneous reception of the MPEG video data that are encrypted by using two different contents keys (K1 and K2 in this embodiment) becomes possible.

Note that the fourth and fifth embodiments have been described for an exemplary case of interconnecting the IEEE 1394 and the radio network, but the schemes of these embodiments are also applicable to the other network such as Internet.

Note also that the authentication and key exchange was carried out between certain sub-units in this embodiment, but it is possible to carry out the authentication and key exchange between certain plugs.

As described, according to the present invention, it becomes possible to carry out the contents protection procedure for transmission and reception of contents to be protected, between devices that are not connected to the same networks.

Note that the present invention is equally applicable to the case of data transfer in the direction opposite to that described in the first to fifth embodiments (the case of data transfer from the radio node to a node on the IEEE 1394, for example).

Note also that the first to fifth embodiments have been described by focusing on only one of the contents transmission function and the contents reception function in the radio node or the node on the IEEE 1394, but the radio node and the node on the IEEE 1394 can be equipped with both of the contents transmission function and the contents reception function.

Note also that the authentication procedure and the key exchange procedure (the contents key sharing procedure) are not necessarily limited to those described above, and the present invention is also applicable to the cases using various other methods.

Note also that the above embodiments have been described for the home network, but the present invention is also applicable to networks other than the home network.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the relay device and the communication device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A relay device, comprising:

a first interface unit connected to a first network operated by a first protocol;

a second interface unit connected to a second network operated by a second protocol that is different from the first protocol;

a proxy configuration unit for disclosing a device/service/sub-unit on the second network as an own device/service/sub-unit provided on the relay device with respect to a first network side;

a control command reception unit for receiving control command signals destined to the own device/service/sub-unit from the first network side;

a control command transmission unit for transmitting signals corresponding to the control command signals received by the control command reception unit, to the device/service/sub-unit on the second network;

a contents protection information reception unit for receiving contents protection information destined to the own device/service/sub-unit, from a device on the first network; and a contents protection information transfer unit for transferring the contents protection information received by the contents protection information reception unit to the device/service/sub-unit on the second network, so as to selectively relay the contents protection information transparently without making any change in the contents protection information;

wherein the contents protection information is information necessary in carrying out a contents protection procedure including at least an authentication and/or a key exchange between one device/service/sub-unit on the first network and another device/service/sub-unit on the second network.

2. A relay device, comprising:

a first interface unit connected to a first network operated by a first protocol;

a second interface unit connected to a second network operated by a second protocol that is different from the first protocol;

a proxy configuration unit for disclosing each device/service/sub-unit on the first network or the second network as an own device/service/sub-unit provided on the relay device with respect to respective another network side;

a control command reception unit for receiving control command signals destined to the own device/service/sub-unit from a side of one network to which the own device/service/sub-unit is disclosed by the proxy configuration unit;

a control command transmission unit for transmitting signals corresponding to the control command signals received by the control command reception unit, to said each device/service/sub-unit on another network different from said one network;

a contents protection information reception unit for receiving contents protection information destined to the own device/service/sub-unit from a device on the first network or the second network;

a contents protection information transfer unit for transferring the contents protection information received by the contents protection information reception unit to said each device/service/sub-unit on said another network, so as to selectively relay the contents protection information transparently without making any change in the contents protection information;

a contents reception unit for receiving contents destined to the own device/service/sub-unit and protected by a contents key obtained from the contents protection information, from a device on the first network or the second network; and a contents transfer unit for transferring the contents received by the contents reception unit to said each device/service/sub-unit on said another network, so as to selectively relay the contents transparently without making any change in the contents;

wherein the contents protection information is information necessary in carrying out a contents protection procedure including at least an authentication and/or a key exchange between one device/service/sub-unit on the first network and another device/service/sub-unit on the second network.

3. The relay device of claim 2, further comprising:

a configuration information reception unit for receiving a configuration information from one device/service/sub-unit on the first network or the second network, the configuration information indicating at least a presence or absence of an authentication format for said one device/service/sub-unit; and a configuration recognition unit for recognizing a configuration of said one device/service/sub-unit according to the configuration information received by the configuration information reception unit.

4. A relay device, comprising:

a first interface unit connected to a first network operated by a first protocol;

a second interface unit connected to a second network operated by a second protocol that is different from the first protocol;

a proxy configuration unit for disclosing each device/service/sub-unit on the first network or the second network as an own device/service/sub-unit provided on the relay device with respect to respective another network side;

a control command reception unit for receiving control command signals destined to the own device/service/sub-unit from a side of one network to which the own device/service/sub-unit is disclosed by the proxy configuration unit;

a control command transmission unit for transmitting signals corresponding to the control command signals received by the control command reception unit, to said each device/service/sub-unit on another network different from said one network;

a first contents protection unit for carrying out a contents protection procedure including at least an authentication and/or a key exchange, with respect to one device/service/sub-unit on the first network;

a second contents protection unit for carrying out the contents protection procedure including at least the authentication and/or the key exchange, with respect to another device/service/sub-unit on the second network, separately from the contents protection procedure carried out by the first contents protection unit;

a contents reception unit for receiving contents destined to the own device/service/sub-unit and encrypted according to one of the first and second contents protection units; and a contents transfer unit for transferring the contents received by the contents reception unit to said each device/service/sub-unit on said another network, by encrypting the contents according to another one of the first and second contents protection units.

5. The relay device of claim 4, wherein the first contents protection unit and the second contents protection unit use different encryption schemes or identical encryption schemes based on different keys.

6. The relay device of claim 4, wherein the contents reception unit and the contents transmission unit are sealed within a single LSI.

7. The relay device of claim 4, wherein a first key information used in the contents protection procedure in the first contents protection unit and a second key information used in the contents protection procedure in the second contents protection unit are set to be identical.

8. The relay device of claim 7, wherein the contents protection procedure in said another one of the first and second contents protection units is carried out in units of contents/services/sub-units, using a prescribed key information.

9. The relay device of claim 4, further comprising:
a configuration information reception unit for receiving a configuration information from one device/service/sub-unit on the first network or the second network, the configuration information indicating at least a presence or absence of an authentication format for said one device/service/sub-unit; and
a configuration recognition unit for recognizing a configuration of said one device/service/sub-unit according to the configuration information received by the configuration information reception unit.

10. A relay device, comprising:
a first interface unit connected to a first network operated by a first protocol;
a second interface unit connected to a second network operated by a second protocol that is different from the first protocol;
a first contents protection unit for carrying out a contents protection procedure including at least an authentication and/or a key exchange, with respect to one device/service/sub-unit on the first network;
a second contents protection unit for carrying out the contents protection procedure including at least the authentication and/or the key exchange, with respect to another device/service/sub-unit on the second network, separately from the contents protection procedure carried out by the first contents protection unit;
a contents reception unit for receiving contents destined to an own device/service/sub-unit on the relay device and encrypted according to one of the first and second contents protection units, from a device on one of the first network and the second network; and
a contents transmission unit for transmitting the contents received by the contents reception unit to a device/service/sub-unit on another one of the first network and the second network, by encrypting the contents according to another one of the first and second contents protection units;
wherein a first key information used in the contents protection procedure in the first contents protection unit and a second key information used in the contents protection procedure in the second contents protection unit are set to be identical.

11. A relay device, comprising:
a first interface unit connected to a first network operated by a first protocol;
a second interface unit connected to a second network operated by a second protocol that is different from the first protocol;
a first copy protection processing unit for carrying out a prescribed contents protection procedure including at least an authentication procedure and a key exchange procedure, with respect to one device/service/sub-unit on the first network;
a second copy protection processing unit for carrying out the prescribed contents protection procedure including at least the authentication procedure and the key exchange procedure, with respect to another device/service/sub-unit on the second network, separately from the contents protection procedure carried out by the first contents protection unit;
a contents reception unit for receiving encrypted data containing specific contents from the first interface unit;
a decryption unit for decrypting the encrypted data receiving by the contents reception unit, by using a contents protection key provided by the first copy protection processing unit, to obtain decrypted data;
a conversion unit for converting the decrypted data into converted data in another coding format;
an encryption unit for encrypting the converted data, by using a contents protection key provided by the second copy protection processing unit, to obtain re-encrypted data; and
a contents transmission unit for transferring the re-encrypted data to the second interface unit.

12. The relay device of claim 11, further comprising:
a proxy configuration unit for disclosing one device/service/sub-unit on the second network as one own device/service/sub-unit provided on the relay device with respect to a first network side, and transmitting to said one device/service/sub-unit on the second network an information having a content according to information destined to said one own device/service/sub-unit that is received from a device on the first network side, while also disclosing another device/service/sub-unit on the first network as another own device/service/sub-unit provided on the relay device with respect to a second network side, and transmitting to said another device/service/sub-unit on the first network an information having a content according to information destined to said another own device/service/sub-unit that is received from a device on the second network side;
wherein when the prescribed contents protection procedure between a device on one network among the first and second networks and a device/service/sub-unit on another network among the first and second networks is to be carried out, the proxy configuration unit carries out the prescribed contents protection procedure with the device on said one network by using one of the first and second copy protection processing units, while carrying out the prescribed contents protection procedure with the device/service/sub-unit on said another network by using another one of the first and second copy protection processing units.

13. A relay device, comprising:
a first interface unit connected to a first network operated by a first protocol;
a second interface unit connected to a second network operated by a second protocol that is different from the first protocol;
a first contents protection unit for carrying out a contents protection procedure including at least an authentication procedure and a key exchange procedure, with respect to one device/service/sub-unit on the first network;

a second contents protection unit for carrying out the contents protection procedure including at least the authentication procedure and the key exchange procedure, with respect to another device/service/sub-unit on the second network, separately from the contents protection procedure carried out by the first contents protection unit;

a contents reception unit for receiving contents destined to an own device/service/sub-unit on the relay device and encrypted according to one of the first and second contents protection units, from a device on one of the first network and the second networks; and a contents transmission unit for transmitting the contents received by the contents reception unit to a device/service/sub-unit on another one of the first network and the second network, by encrypting the contents according to another one of the first and second contents protection units;

wherein said one of the first and second contents protection units carries out the authentication and/or the key exchange with a device/service/sub-unit on said one of the first network and the second network by referring to a relationship between the contents reception unit and the contents transmission unit, when there is a request for a procedure of the authentication and/or the key exchange with respect to said another one of the first and second contents protection units.

* * * * *